United States Patent [19]

Nitta et al.

[11] Patent Number: 5,708,761
[45] Date of Patent: Jan. 13, 1998

[54] FUZZY DEVELOPMENT-SUPPORT DEVICE

[75] Inventors: Yasuhiko Nitta; Narumi Sakashita; Kenichi Shimomura; Shinji Komori, all of Hyogo, Japan

[73] Assignee: Mitsubishi Denki Kabushiki Kaisha, Tokyo, Japan

[21] Appl. No.: 403,421

[22] Filed: Mar. 14, 1995

[30] Foreign Application Priority Data

Mar. 31, 1994 [JP] Japan ................... 6-063390

[51] Int. Cl.$^6$ ................................... G06F 15/00
[52] U.S. Cl. ................ 395/3; 395/76; 395/61
[58] Field of Search ................... 395/3, 76, 61, 395/900

[56] References Cited

U.S. PATENT DOCUMENTS

| | | | |
|---|---|---|---|
| 4,503,537 | 3/1985 | McAnney | 371/22.3 |
| 4,534,043 | 8/1985 | Krishnan | 375/351 |
| 4,631,598 | 12/1986 | Burkhardt et al. | 358/425 |
| 4,791,586 | 12/1988 | Maeda et al. | 364/491 |
| 5,095,521 | 3/1992 | Trousset et al. | 395/121 |
| 5,125,085 | 6/1992 | Phillips | 395/449 |
| 5,179,634 | 1/1993 | Matsunaga et al. | 395/75 |
| 5,179,671 | 1/1993 | Kelly et al. | 395/898 |
| 5,189,728 | 2/1993 | Yamakawa et al. | 395/51 |
| 5,276,767 | 1/1994 | Nakamura | 395/3 |
| 5,295,226 | 3/1994 | Yamakawa | 395/3 |

OTHER PUBLICATIONS

EDN, Jul. 6, 1992, pp. 68–76, Gary Legg, "Special Tools and Chips Make Fuzzy Logic Simple".

Fisz, "Probability Theory and Mathematical Statistics," Robert E. Krieger Publishing Company, Inc. pp. 29–36, 64–72, 147–149, 541–543, Dec. 30, 1980.

Papoulis, "Probability, Random Variables, and Stochastic Processes," 2nd Ed. McGraw–Hill Book Co. Dec. 30, 1984, pp. 407–408.

TIL Shell 3.0 descriptions (downloaded from Ortech's website), Dec. 30, 1995.

*Primary Examiner*—Tariq R. Hafiz
*Assistant Examiner*—Ji-Yong D. Chung
*Attorney, Agent, or Firm*—Oblon, Spivak, McClelland, Maier & Neustadt, P.C.

[57] ABSTRACT

A fuzzy development-support device includes a data input unit, a fuzzy-inference execution unit and a result verification unit. As an example, the data input unit includes a display unit connected to a membership function generator and a grid pitch designation unit for designating a grid pitch on a grid sheet displayed on the display unit for creation of membership functions. The grid pitch designation unit allows variation of grid pitch on the grid sheet. Thus, an operator uses the grid pitch designation unit to achieve an effective input of membership functions by generating the grid sheet with a pitch adequate for a desired shape of membership function.

17 Claims, 59 Drawing Sheets

S-TYPE

Π-TYPE

Z-TYPE

I-TYPE

Λ-TYPE

FUZZY DEVELOPMENT-SUPPORT DEVICE

BACKGROUND OF THE INVENTION

1. Field of the Invention

The present invention relates in general to a fuzzy development-support device which is a tool for efficient development of a fuzzy-inference program, and more particularly to the fuzzy development-support device having functions of generating fuzzy rules and membership functions, correcting and verifying.

2. Description of the Background Art

In recent years, there has been wide application of fuzzy control using fuzzy inference for control of electrical appliances. Fuzzy inference is one of data processing methods, which is based on fuzzy logic. This method is widely applied to various areas, particularly control area, and its effectiveness has been reported in documents such as the Nikkei Electronics, Oct. 13, 1989: "Introduction of Fuzzy into Electrical Appliances" and the Nikkei Electronics, Jul. 27, 1987: "Fuzzy Logic in Actual Use".

In application of fuzzy inference, the fuzzy inference is regarded as a black box 200 as shown in FIG. 53. The black box 200 receives a plurality of input values x0, x1 ... and determines a plurality of output values y0, y1 ... The fuzzy inference uses a plurality of fuzzy rules representing a relation between the input values x0, x1 ... and the output values y0, y1 ... in order to derive the output values y0, y1 ... from the input values x0, x1 ... Assuming that the number of inputs is n and the number of outputs is m, the fuzzy rule is generally expressed as follows:

If x0=A0 AND x1=A1 AND ... AND xn=An then y0=P0, y1=P1 ..., ym=Pm

If x0=B0 AND x1=B1 AND ... AND xn=Bn then y0=Q0, y1=Q1 ..., ym=Qm  (1)

where x0 to xn represent input values and y0 to ym represent output values. A0 to An, B0 to Bn, P0 to Pm and Q0 to Qm are fuzzy sets. The first half of the rule as below is called an antecedent:

If x0=A0 AND x1=A1 AND ... AND xn=An  (2)

The latter half of the rule as below is called a consequent:

then y0=P0, y1=P1 ..., ym=Pm  (3)

The fuzzy set is defined as a function of FIG. 54. The function is called a membership function. In this figure, the horizontal coordinate represents input value or output value. The vertical coordinate represents grade. The grade indicates the degree of truth of the equation x0=A0 as an input, or the degree of truth of the equation y0=P0 as an output, the range of which is from 0 to 1.

There are several proposed methods of performing fuzzy inference. A fuzzy-inference method using the minimum-maximum centroid method will be discussed hereinafter, taking the case of two inputs and one output. Two rules as below will be now considered:

rule 0: If x0=A0, x1=A1 then y=P rule 1: If x0=B0, X1=B1 then y=Q  (4)

FIG. 55 schematically shows a fuzzy-inference execution. In this figure, six functions A0, A1, B0, B1, P and Q are membership functions. Input data x0c and x1c are inputted as inputs x0 and x1, respectively, and an inference result yc is outputted as an output y.

Now, a procedure of the fuzzy inference will be discussed referring to FIG. 55. At first, the grade g00 of the equation x0=A0 in the rule 0 is obtained by calculating the value of the function A0 when x0=x0c. The grade g01 of the equation x1=A1 in the rule 1 is also obtained by calculating the value of the function A1 when x1=x1c. A minimum value operation, like obtaining logical product, between the grade g00 and the grade g01 is performed, taking the smaller one of the two grades, and the grade g0 is obtained as the result of the minimum value operation. The grade g0 is a rule grade of the rule 0. That is an antecedent processing of the rule 0. Likewise, a rule grade g1 of the rule 1 is obtained.

Next, a consequent processing will be discussed. At first, a function G is obtained by cutting a portion of the function P which is higher than the rule grade g0. A function H is similarly obtained by cutting a portion of the function Q which is higher than the rule grade g1. After that, a maximum value operation between the functions G and H is performed, taking the larger one of the two functions at every output y, and a function F(y) is obtained as the result of the maximum value operation. The function F(y) is called an output membership function. The output membership function represents an inference result of the fuzzy inference.

At the last processing of the inference, a centroid of the function F(y) is computed. For convenience of manipulation of the inference result, a definite value (a centroid value herein) representing the function F(y) is computed, being manipulated as inference result. The operation is called "to defuzzify". The centroid value of the function F(y) is expressed as:

$$yc = \Sigma y \cdot F(y) / \Sigma F(y) \qquad (5)$$

The centroid value yc is an ultimate inference result obtained by the fuzzy-inference execution. There may be a case where the same inference result is computed from two output membership functions of different shapes such as shown in FIGS. 56A and 56B. Therefore, the shape of the function F(y) can not be estimated from the inference result yc. In fact, however, reliability of the inference result largely depends on the shape of the function F(y).

These output membership functions of FIGS. 56A and 56B show that an output obtained from the rule using the function of the left trapezoid is y1 and an output obtained from the rule using the function of the right trapezoid is y2. As to the output membership function of FIG. 56A, a rule grade of the output y1 is high and that of the output y2 is low. Accordingly, there is no contradiction, and it is found that the inference result yc is of high reliability.

On the other hand, as to the output membership function of FIG. 56B, both of two rule grades are high. Since there arises a contradiction between the two rules, it is found that the inference result yc is of low reliability.

In order to detect such contradiction, variance centered at the centroid value is computed. The variance value is obtained as:

$$V = \Sigma (y-yc)^2 \cdot F(y) / \Sigma F(y) \qquad (6)$$

The variance value V is small in the case of the function F(y) of FIG. 56A, while the variance value V is large in the case of the function F(y) of FIG. 56B. Therefore, the variance value V is useful for determination as to reliability of the inference result.

Fuzzy control is implemented through the above fuzzy-inference processing programmed on a microprocessor.

There has been developing a fuzzy development-support device for development of the program to implement fuzzy control.

For example, a development-support tool for the Fujitsu One-Chip Fuzzy Controller MB941 Series is one of development tools. FIGS. 57 and 58 illustrate a hardware and a software, respectively, of the development tool. In FIG. 57, numeral 250 denotes a personal computer body, an emulator and a fuzzy-support software. Numeral 260 denotes an in-circuit emulator and a DUE board, and numeral 270 denotes a target system.

In FIG. 57, the personal computer 250 creates an inference program for fuzzy-inference execution. The inference program is transferred to the in-circuit emulator (ICE) 260 and implemented therein, thereby performing fuzzy control of the target system 270 which is a controlled system.

FIG. 58 shows a fuzzy-support software 300. In the fuzzy-support software 300, a membership function editor 310 creates membership functions and a rule editor 320 creates fuzzy rules using membership functions. A knowledge file 330 stores the membership functions created by the membership function editor 310 and the fuzzy rules created by the rule editor 320. A translator 350 performs code conversion of the membership functions and the fuzzy rules to generate assemblers executable on the ICE. A simulator 360 performs a fuzzy inference with input data stored in the knowledge file 330 and verifies the fuzzy rules and membership functions created by the membership function editor 310 and the rule editor 320.

Thus, the fuzzy development-support tool allows easy generation and correction of fuzzy rules and membership functions required for fuzzy inference. Moreover, simulation using the fuzzy rules allows a check of validity of the fuzzy rules.

Now, a fuzzy development-support device in the background art will be discussed referring to FIG. 59. FIG. 59 is a block diagram notionally showing a configuration of a development support device of a hardware for fuzzy-inference execution. In FIG. 59, a fuzzy development-support device 370 includes a data input unit 1 for generating input data, fuzzy rules and membership functions for fuzzy-inference execution, a fuzzy-inference execution unit 2 for executing a fuzzy inference and outputting inference results and an output unit 3 for outputting the inference results to a controlled system 4 outside the device 370 and verifying reliability of the inference results. The controlled system 4 is an object of fuzzy control. A fuzzy inference by the minimum-maximum centroid method using if-then rule as a fuzzy rule will be discussed below.

The controlled system 4 operates under the control of the fuzzy development-support device 370. From the controlled system 4, data are transmitted to the data input unit 1 in every state. The data input unit 1 performs conversion of the data transmitted from the controlled system 4 into executable data and outputs the converted data to the fuzzy-inference execution unit 2. Also, the data input unit 1 outputs fuzzy rules and antecedent membership functions and consequent membership functions corresponding to the fuzzy rules to the fuzzy-inference execution unit 2.

The fuzzy-inference execution unit 2 performs the fuzzy inference with the input data, the fuzzy rules and the membership functions and derives output data indicating inference result. The output unit 3 outputs the output data from the fuzzy-inference execution unit 2 to the controlled system 4.

FIG. 60 shows an internal configuration of the data input unit 1. An input data generator 5 performs conversion of the data transmitted from the controlled system into executable data for fuzzy-inference execution of the fuzzy-inference execution unit 2. A fuzzy rule creator 6 and a membership function generator 7 generate fuzzy rules and membership functions corresponding to the fuzzy rules, respectively.

In the background art fuzzy development-support device, the membership function is determined by defining an outline thereof through pointing on a grid sheet having uniformly-spaced grids on both vertical and horizontal axes. The grid spacing is fixed, and it is needed to input all of the grades corresponding to the discrete values of the input data and the inference results represented by the horizontal axis and grids of the grid sheet. For this reason, there is a disadvantage that a grid sheet with fine grid spacing, which allows definition of a complicated shape such as bell curve, would require consideration of a number of grids to define even a simple shape such as triangle.

Still in the background art fuzzy development-support device, the determination of function shape made by pointing the outline of the function on the grid sheet allows determination of various shapes, but requires all the points to be pointed even in determining a simple shape, resulting in poor efficiency.

Still in the background art fuzzy development-support device, the determination of function shape made by pointing the outline of the function on the grid sheet allows determination of various shapes, but when the outline of the function can be designated with a fixed-length parameter, the outline shape of such function as can be represented by the fixed-length parameter is likely to change to an outline shape of such function as can not be represented by the fixed-length parameter.

Still in the background art fuzzy development-support device, when an inference simulation which generally needs a number of input data is performed with not all of the input data, it is impossible to determine which of the input data is effective for the simulation.

Still in the background art fuzzy development-support device, there is no method of automatic determination of fuzzy rules and membership functions, causing a complicated operation.

Still in the background art fuzzy development-support device, there is no means to study an effect of the individual fuzzy rule on the inference result, and therefore, it is difficult to make an effective judgment as to correction of the individual fuzzy rule.

Still in the background art fuzzy development-support device, there is no method of studying which rule is of high frequency in use through a plurality of fuzzy-inference executions, and therefore, it is impossible to judge which rule should be altered for effective correction of the fuzzy rules.

Still in the background art fuzzy development-support device, it is necessary to display both antecedent and consequent membership functions in order to recognize a shape of the output membership function, and therefore, it is impossible to obtain the shape of the output membership function in course of a plurality of fuzzy-inference executions.

Still in the background art fuzzy development-support device, it is impossible to verify reliability of the inference result by using variance, causing difficulty in verification of the inference.

Still in the background art fuzzy development-support device, there is no method of verifying description errors of the rules. Therefore, when a description error occurs, it is difficult to draw out the description error.

Still in the background art fuzzy development-support device, there is no method of verifying whether engineering change by the development-support device is correctly made.

Still in the background art fuzzy development-support device, there is no method of performing an analysis when unexpected variation occurs in the inference result.

Still yet in the background art fuzzy development-support device, there is no function of verifying an operation of the development-support device itself, and accordingly, operation reliability of the whole tool is not ensured.

SUMMARY OF THE INVENTION

The present invention is directed to a fuzzy development-support device. According to the first aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means generates a plurality of grid points corresponding to discrete values of the membership function to be created according to data externally received and uses several specified grid points among the plurality of grid points to create the membership function.

The data input means in accordance with the first aspect of the present invention generates a plurality of grid points corresponding to the discrete variables of the membership function to be created according to the data given from outside. For example, in order to determine the respective pitches of horizontal and vertical axes, the data input means generates a plurality of grid points according to the given data regarding the number of input data and divisions of grade of the membership function. After that, the data input means creates a membership function with several grid points specified from outside among the generated grid points. For instance, the data input means displays a grid sheet like a sheet of graph paper having a plurality of grids according to information given by an operator. The operator can flexibly determine the grid pitch by changing the number of input data and/or the divisions of grade. For a simple membership function, rough grid pitch is prepared with a smaller number of input data and fewer divisions of grade, thereby reducing operation overhead in creating membership functions.

Thus, since the data input means creates membership functions by using grid points, the fuzzy development-support device in accordance with the first aspect of the present invention facilitates the inputting operation of membership function.

According to the second aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means includes display means, which displays a function shape corresponding to given coordinates and outputs coordinates corresponding to the function shape, for displaying waveforms of simple function shape to create the membership function, and the data input means joins the waveforms together according to a specification externally received, outputs a joined shape of the membership function to the display means and creates the membership function with the coordinates.

The data input means in accordance with second aspect of the present invention displays waveforms of simple function shapes on the display means. For example, the operator assigns appropriate waveforms to a screen so as to specify a desired shape of membership function. The data input means joins the assigned waveforms each showing a simple function shape together and determines the coordinates of the joined shape to define a membership function. Because of one-to-one correspondence between the input data and the grade or between the inference result and the grade of a membership function, the membership function can be simply defined by determining the coordinates with waveforms provided in advance. The inference execution means performs the fuzzy inference with input data, fuzzy rules and membership functions generated by the data input means.

Thus, since the data input means displays waveforms of simple function shapes on the display means, joins the waveforms together and determines the coordinates of the joined shape to create a membership function, the fuzzy development-support device in accordance with the second aspect of the present invention facilitates the inputting operation of membership function.

According to the third aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means includes display means for displaying a shape of the membership function; and calculator means for outputting a shape on which the membership function is based to the display means to be displayed thereon and calculating allowable coordinates to which points defining the shape of the membership function on the display means may move, pursuant to a prescribed rule, and the data input means alters the shape of the membership function by using the allowable coordinates.

With the calculator means in accordance with the third aspect of the present invention, for example, the operator can change the shape of membership function into a shape pursuant to the prescribed rule, observing the basic shape of membership function on the display means. The number of input errors can be thereby reduced. It is also possible to change the shape of membership function so that the shape might be specified by a fixed-length parameter, thereby simplifying a configuration of the device.

Thus, since the data input means includes the display means and the calculator means and allows alteration of a shape of membership function by using the allowable coordinates, the fuzzy development-support device in accordance with the third aspect of the present invention facilitates the inputting operation of membership function.

According to the fourth aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means includes input data generator means for generating the input data; detector means for detecting the input data indicating a coordinate of a point by which the gradient of the membership function changes in a prescribed manner; and extractor means for extracting the input data within a prescribed range among the input data detected by the detector means as verification input data for verifying the fuzzy inference, and outputting the verification input data to the inference execution means.

The input data generator means in accordance of the fourth aspect of the present invention generates input data. The detector means detects input data indicating a point by which the gradient of the membership function changes in a prescribed manner, for example, vertex coordinates when the membership function is of triangle or trapezoid. The extractor means outputs the detected input data within a prescribed range as simulation input data. Therefore, a simulation can be carried out with a smaller number of input data by limiting the input data, to thereby reduce in verification time of fuzzy rules.

Thus, since the data input means includes the input data means, the detector means and the extractor means and allows verification of fuzzy rules using a prescribed range of input data, the fuzzy development-support device in accordance with the fourth aspect of the present invention ensures improved efficiency in verification of the fuzzy inference.

According to the fifth aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means includes random number generator or pseud random number generator for generating random number; and extractor means for extracting a prescribed number of input data from the input data by using the random number and selectively outputting the input data based on the input data extracted therein to the inference execution means.

The extractor means in accordance with the fifth aspect of the present invention extracts a prescribed number of input data at random. The extracted input data are used for simulation. Since improved efficiency of verification is thereby achieved without using not all of the input data, verification time of fuzzy rules can be reduced.

Thus, since the data input means includes the random number generator or pseud random number generator and the extractor means, the fuzzy development-support device in accordance with the fifth aspect of the present invention ensures improved efficiency in verification of the fuzzy inference.

According to the sixth aspect of the present invention, the fuzzy development-support device of the fourth aspect or the fifth aspect further comprises data compressor means for inputting and compressing an inference result outputted from the inference execution means as the result of the fuzzy inference in sequence.

The compressor means in accordance with the sixth aspect of the present invention compresses the inference result, thereby reducing the number of data and memories used for storing data.

Thus, having the data compressor means, the fuzzy development-support device in accordance with the sixth aspect of the present invention only requires smaller storage capacity and allows downsizing of the device.

According to the seventh aspect of the present invention, the fuzzy development-support device of the sixth aspect further comprises a comparator for comparing an output from the data compressor means with compressed data of expected values obtained in advance.

The comparator means in accordance with the seventh aspect of the present invention for making comparison of the compressed data allows a check between the expected values and the inference result within the device, thereby reducing the number of memories used for storing the expected values.

Thus, having the comparator, the fuzzy development-support device in accordance with the seventh aspect of the present invention only requires smaller storage capacity and allows downsizing of the device.

According to the eighth aspect of the present invention, in the fuzzy development-support device of the fourth aspect or the fifth aspect, the data input means further includes selector means for selecting the input data of which a grade is not zero by using the membership function representing the relation between the input data and the grade as input data to be outputted to the inference execution means.

The selector means in accordance with the eighth aspect of the present invention for selecting verification input data of which a grade is not zero allows the fuzzy inference with input data causing inference result of zero, thereby reducing the simulation time.

Thus, since the data input means includes the selector means, the fuzzy development-support device in accordance with the eighth aspect of the present invention can improve verification efficiency.

According to the ninth aspect of the present invention, the fuzzy development-support device comprises: data input means for generating input data, fuzzy rules and membership functions for the fuzzy rules to be used in a fuzzy inference; and inference execution means for executing the fuzzy inference with the input data, the fuzzy rules and the membership functions generated in the data input means. In the fuzzy development-support device, the data input means includes input/output setting means for setting at least one variable for the input data and at least one variable for an inference result used for the fuzzy rule; expected value waveform setting means for setting an expected value waveform representing a relation between the input data and the inference result as an expected value of an output from the inference execution means, and fixed points on the expected value waveform; first fuzzy rule generator means for generating a fuzzy rule base by using the variable of the input data and the variable of the inference result; and second fuzzy rule generator means for generating a plurality of the fuzzy rules as much as the number of fixed points by using the fuzzy rule base generated in the first fuzzy rule generator means and the fixed points provided by the expected value waveform setting means.

The second fuzzy rule generator means in accordance with the ninth aspect of the present invention for generating fuzzy rules from the fuzzy rule base generated by the first fuzzy rule generator means and the fixed points provided by the expected value waveform setting means ensures easy generation of fuzzy rules to satisfy the expected value waveform.

Thus, since the data input means includes the input/output setting means, expected value waveform setting means, the first fuzzy rule generator means and the second fuzzy rule generator means, the fuzzy development-support device in accordance with the ninth aspect of the present invention achieves partial automation of fuzzy rule setting.

According to the tenth aspect of the present invention, in the fuzzy development-support device of the ninth aspect, the data input means further includes first membership function generator means for generating a membership function base; and second membership function generator means for generating a plurality of membership functions for the plurality of fuzzy rules generated in the second fuzzy rule generator means by using the membership function base generated in the first membership function generator means and the fixed points provided by the expected waveform setting means.

The second membership function generator means in accordance with the tenth aspect of the present invention for generating membership functions from the membership function base generated by the first membership function generator means and the fixed points provided by the expected value waveform setting means ensures easy generation of membership functions to satisfy the expected value waveform.

Thus, since the data input means includes the first membership function generator means and the second membership function generator means, the fuzzy development-support device in accordance with the tenth aspect of the present invention achieves partial automation of membership function setting.

According to the eleventh aspect of the present invention, in the fuzzy development-support device of the tenth aspect, the data input means further includes comparator means for comparing a first inference result outputted from the inference execution means with a second inference result represented by the expected value waveform; and membership function modifier means for modifying the plurality of membership functions according to a comparison result of the comparator means.

The membership function modifier means in accordance with the eleventh aspect of the present invention modifies the membership functions according to the comparison result of the comparator means. The inference execution means executes the fuzzy inference with the modified membership functions. Further, comparison between the inference result and the expected values and modification of the membership functions according to the comparison result are carried out. Such procedures are repeated, thereby obtaining the membership functions to be used in the fuzzy rule to cause inference result which is approximate to the expected value waveform provided by the expected value waveform setting means.

Thus, since the data input means includes the comparator and the membership function modifier means, the fuzzy development-support device in accordance with the eleventh aspect of the present invention facilitates generation of fuzzy rules adequate for the controlled systems.

According to the twelfth aspect of the present invention, in the fuzzy development-support device of the eleventh aspect, the data input means further includes display means for displaying the expected value waveform provided by the expected value waveform setting means and the first inference result outputted from the inference execution means on the same coordinate system.

The display means in accordance with the twelfth aspect of the present invention displays the expected value waveform and the actual inference result on the same coordinate system to give visual information regarding the difference therebetween. For example, the operator who observes the display can recognize the difference at a glance, and therefore, can grasp the present condition of the fuzzy development with ease.

Thus, since the data input means includes the display means for displaying the expected value waveform and the actual inference result, the first inference result, on the same coordinate system, the fuzzy development-support device in accordance with the twelfth aspect of the present invention facilitates generation of fuzzy rules adequate for the controlled systems.

According to the thirteenth aspect of the present invention, in the fuzzy development-support device of the twelfth aspect, the data input means further includes evaluation means for evaluating a difference between the second inference result represented by the expected value waveform provided by the expected value waveform setting means and the first inference result outputted from the inference execution means.

The evaluation means in accordance with the thirteenth aspect of the present invention shows the difference between the expected value waveform and the inference result every time the fuzzy-inference execution is repeated, modifying the membership functions, to approximate the inference result to the expected value waveform. It is thereby possible to recognize how the first inference result becomes closer to the second inference result by repeating fuzzy-inference execution and modification of the membership functions.

Thus, since the data input means includes the evaluation means for evaluating the difference between the first and second inference results, the fuzzy development-support device in accordance with the thirteenth aspect of the present invention facilitates generation of fuzzy rules adequate for the controlled systems.

According to the fourteenth aspect of the present invention, in the fuzzy development-support device of the eleventh, the data input means further includes verification input data generator means for generating verification input data for verification of the fuzzy rules; and input limitation means for selectively supplying the inference execution means with the verification input data within a prescribed range generated in the verification input data generator means.

The input limitation means in accordance with the fourteenth aspect of the present invention for limiting the range of the verification input data for simulation to a prescribed range allows only a specific part of inference result to become closer to the expected value. Therefore, it is possible to avoid a simulation using unnecessary data for the purpose of correction and thereby to reduce simulation time.

Thus, since the data input means includes the verification input data generator means and the input limitation means, the fuzzy development-support device in accordance with the fourteenth aspect of the present invention ensures effective generation of fuzzy rules adequate for the controlled systems.

According to the fifteenth aspect of the present invention, in the fuzzy development-support device of the eleventh aspect, the data input means further includes expected value waveform correction means for altering or adding the fixed points provided by the expected value setting means.

The expected value waveform correction means in accordance with the fifteenth aspect of the present invention, which changes and/or adds the fixed points to cause additional generation of fuzzy rules and membership functions in the second rule generator means and the second membership function generator means, allows an effective simulation to be performed so as to approximate the inference result to the expected value waveform in the data input means and the inference execution means.

Thus, since the data input means includes the expected value waveform correction means, the fuzzy development-support device in accordance with the fifteenth aspect of the present invention facilitates generation of fuzzy rules adequate for the controlled systems.

According to the sixteenth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, each of the membership functions generated in the data input means includes an antecedent membership function corresponding to an antecedent of the fuzzy rule and a consequent membership function corresponding to a consequent of the fuzzy rule, the data input means includes input data generator means for generating verification input data for verification of the plurality of fuzzy rules, and the result verification means includes fuzzy rule grouping means for grouping the plurality of fuzzy rules in a plurality of rule sets by classifying an intermediate result during the inference execution process and the inference result obtained by the fuzzy inference using the verification input data, pursuant to a prescribed standard.

The fuzzy rule grouping means in accordance with the sixteenth aspect of the present invention classifies the intermediate result and the inference result of the fuzzy inference performed by the inference execution means, for example, the grade of the consequent membership function with respect to the inference result or the input data according a prescribed standard to group all of the rules in several rule sets consisting of rules of common nature. That allows a check as to how individual rule contributes to the inference result.

Thus, since the data input means includes the input data generator means and the result verification means including the fuzzy rule grouping means, the fuzzy development-support device in accordance with the sixteenth aspect of the present invention facilitates development of fuzzy rules adequate for the controlled systems.

According to the seventeenth aspect of the present invention, in the fuzzy development-support device of the sixteenth aspect, the fuzzy rule grouping means includes rule extractor means for extracting the fuzzy rules which contribute to the inference result among the plurality of fuzzy rules outputted from the inference execution means as the result of the fuzzy inference using any of the input data.

The rule extractor means in accordance with the seventeenth aspect of the present invention extracts fuzzy rules which contribute to the inference result in the fuzzy-inference execution. Checking only the extracted fuzzy rules, the fuzzy development becomes easier.

Thus, since the fuzzy rule grouping means includes the rule extractor means, the fuzzy development-support device in accordance with the seventeenth aspect of the present invention facilitates development of fuzzy rules adequate for the controlled systems.

According to the eighteenth aspect of the present invention, in the fuzzy development-support device of the seventeenth aspect, the inference execution means includes execution means for executing fuzzy inference by implementing minimum-maximum centroid method to output the inference result and grades of the consequent membership functions which are computed during execution of the fuzzy inference, and the rule extractor means includes extractor means for extracting the fuzzy rule which has maximum grade among the plurality of fuzzy rules by consequent membership function.

The extractor means in accordance with the eighteenth aspect of the present invention extracts said fuzzy rule which has maximum grade among the plurality of fuzzy rules by consequent membership function. The extracted fuzzy rules can contribute to the inference result in the fuzzy inference by implementing the minimum-maximum centroid method. Checking only the extracted fuzzy rules, the fuzzy development becomes easier.

Thus, since the inference execution means includes the execution means for executing the fuzzy inference by implementing the minimum-maximum centroid method to output the inference result and the grades of the consequent membership functions and the rule extractor means includes the extractor means for extracting a fuzzy rule of maximum grade by consequent membership function, the fuzzy development-support device in accordance with the eighteenth aspect of the present invention facilitates development of fuzzy rules adequate for the controlled systems.

According to the nineteenth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, each of the membership functions generated in the data input means includes an antecedent membership function corresponding to an antecedent of the fuzzy rule and a consequent membership function corresponding to a consequent of the fuzzy rule, and the result verification means includes a memory for storing grades of the consequent membership functions computed during execution of the fuzzy inference by consequent membership function of the same shape; and accumulator means for accumulating the grades of the fuzzy rules computed during execution of the fuzzy inference by consequent membership function and outputting an accumulated value to the memory.

The accumulator means in accordance with the nineteenth aspect of the present invention accumulates the grades stored in the memory by consequent membership function and outputs the accumulated value to the memory. Checking the acculated value which is stored in the memory allows evaluation as to how the fuzzy rule contributes to obtaining the inference result.

Thus, since the result verification means includes the memory and the accumulator means, the fuzzy development-support device in accordance with the nineteenth aspect of the present invention facilitates development of fuzzy rules adequate for the controlled systems.

According to the twentieth aspect of the present invention, in the fuzzy development-support device of the nineteenth aspect, the result verification means further includes a comparator for comparing the accumulated value stored in the memory with a prescribed value; and extractor means for extracting the fuzzy rules according to a comparison result outputted from the comparator.

The extractor means in accordance with the twentieth aspect of the present invention extracts the fuzzy rules according to the comparison result, for example, the fuzzy rule of which the accumulated value of grades is equal to or smaller than a prescribed value. Therefore, it becomes easier to distinguish the fuzzy rules which do not contribute to the inference result obtained by the fuzzy-inference execution.

Thus, since the result verification means includes the comparator and the extractor means, the fuzzy development-support device in accordance with the twentieth aspect of the present invention facilitates development of fuzzy rules adequate for the controlled systems.

According to the twenty-first aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result and output membership functions used for the fuzzy inference; and result verification means for verifying the inference result including a fuzzy-inference execution process done by the inference execution means. In the fuzzy development-support device, each of the membership functions generated in the data input means includes an antecedent membership function corresponding to an antecedent of the fuzzy rule and a consequent membership function corresponding to a consequent of the fuzzy rule, and the result verification means includes range designation means for designating a range of inference result as a variable of the consequent membership function; and warning means for giving a warning depending on a comparison result obtained by comparing a grade of the output membership function with a prescribed value within the range.

Depending on whether the warning means in accordance with the twenty-first aspect of the present invention gives warning or not, it is possible to distinguish the relation between the inference result within the designated range and the prescribed value.

Thus, since the result verification means includes the range designation means and the warning means, the fuzzy development-support device in accordance with the twenty-first aspect of the present invention facilitates generation of fuzzy rules adequate for the controlled systems.

According to the twenty-second aspect of the present invention, in the fuzzy development-support device of the twenty-first aspect, the range designation means includes memory means for storing a plurality of the ranges, the prescribed value includes a plurality of prescribed values within the plurality of ranges, respectively, and the result verification means further includes threshold value memory means for storing the plurality of prescribed values corresponding to the plurality of ranges, respectively, for comparison with the grade of output membership function and outputting the prescribed values to the warning means; and control means for giving an instruction to the threshold value memory means and the memory means of the range designation means for switching between output data from the threshold value memory means and output data from the memory means of the range designation means in response to the input data used for the fuzzy inference performed in the inference execution means.

The control means in accordance with the twenty-second aspect of the present invention switches between the data in the threshold value memory means and the data in the memory means of the range designation means to be used, and therefore, it becomes possible to specify a more detailed shape of the inference result and the grade of the output membership function.

Thus, since the result verification means includes the range designation means having the memory means, the threshold value memory means and the control means, the fuzzy development-support device in accordance with the twenty-second aspect of the present invention facilitates generation of fuzzy rules adequate for the controlled systems.

According to the twenty-third aspect of the present invention, in the fuzzy development-support device of the twenty-first aspect, the result verification means further includes analysis means for outputting the inference result as a variable of the output membership function within the range designated by the range designation means and a grade corresponding to the inference result when the warning is given; and display means for displaying the inference result and the grade outputted from the analysis means.

The display means in accordance with the twenty-third aspect of the present invention displays the inference result and the grade corresponding thereto analyzed in the analysis means. Consideration of the displayed inference result and the grade in combination with the warning given by the warning means allows specification of a more detailed shape of the grade of the output membership function.

Thus, since the result verification means includes the analysis means for outputting the inference result and the grade when the warning is given and the display means for displaying the inference result and the grade outputted from the analysis means, the fuzzy development-support device in accordance with the twenty-third aspect of the present invention facilitates generation of fuzzy rules adequate for the controlled systems.

According to the twenty-fourth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, each of the membership functions generated in the data input means includes an antecedent membership function corresponding to an antecedent of the fuzzy rule and a consequent membership function corresponding to a consequent of the fuzzy rule, the inference execution means includes calculator means for calculating a variance value from an output membership function representing a relation between the inference result as a variable of the consequent membership function and a grade corresponding to the inference result as a variable obtained by executing the fuzzy inference, and the result verification means includes variance error detector means for detecting a variance error depending on whether the variance value exceeds a prescribed value; and analysis means for analyzing the cause of the variance error.

The calculator means in accordance with the twenty-fourth aspect of the present invention calculates a variance value. The variance error detector means detects a variance error by checking the variance value calculated by the calculator means and the analysis means analyzes the cause of the variance error. Therefore, it becomes possible to generate fuzzy rules which are unlikely to cause variance errors, and to achieve a fuzzy control of high reliability.

Thus, since the inference execution means includes the calculator means for calculating a variance value and the result verification means includes the variance error detector means and the analysis means, the fuzzy development-support device in accordance with the twenty-fourth aspect of the present invention achieves improved reliability.

According to the twenty-fifth aspect of the present invention, in the fuzzy development-support device of the twenty-fourth aspect, the result verification means further includes display means for displaying the output membership function when the variance error is detected.

The display means in accordance with the twenty-fifth aspect of the present invention displays the output membership functions when the variance error is detected, thereby facilitating the analysis of the cause of the variance error.

Thus, since the result verification means includes the display means for displaying the output membership functions when the variance error is detected, the fuzzy development-support device in accordance with the twenty-fifth aspect of the present invention facilitates generation of fuzzy rules adequate for the controlled systems.

According to the twenty-sixth aspect of the present invention, in the fuzzy development-support device of the twenty-fourth aspect, the result verification means further includes a memory for storing the inference result outputted from the inference execution means and the input data used for the fuzzy inference to obtain the inference result when the variance error is detected.

The memory in accordance with the twenty-sixth aspect of the present invention stores the inference result and the input data when the variance error is detected, thereby facilitating the analysis of the cause of the variance error.

Thus, since the result verification means includes the memory for storing the inference result and the input data when the variance error is detected, the fuzzy development-support device in accordance with the twenty-sixth aspect of the present invention facilitates generation of fuzzy rules adequate for the controlled systems.

According to the twenty-seventh aspect of the present invention, in the fuzzy development-support device of the twenty-sixth aspect, the result verification means further includes output means for outputting a prescribed constant as the inference result when the variance error is detected.

The output means in accordance with the twenty-seventh aspect of the present invention outputs a prescribed constant as the inference result to prevent the inference result which should not be outputted because of occurrence of the variance error from being outputted.

Thus, since the result verification means includes the output means for outputting a prescribed constant when the variance error is detected, the fuzzy development-support device in accordance with the twenty-seventh aspect of the present invention achieves improved reliability by preventing malfunctions.

According to the twenty-eighth aspect of the present invention, in the fuzzy development-support device of the twenty-fourth, the result verification means further includes prescribed value calculator means for calculating the prescribed value for comparison with the variance value from a waveform inputted to represent a relation between the inference result and the grade of the output membership function which are expected to be outputted from the inference execution means.

The prescribed value calculator means in accordance with the twenty-eighth aspect of the present invention calculates the prescribed value from the waveform. That allows input of the prescribed value in the form of waveform, thereby ensuring easy inputting operation of the prescribed value.

Thus, since the result verification means includes the prescribed value calculator, the fuzzy development-support device in accordance with the twenty-eighth aspect of the present invention facilitates development of fuzzy rules.

According to the twenty-ninth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, the result verification means includes variable extractor means for extracting at least one variable of the input data and at least one variable of the inference result described in the fuzzy rules; and display means for displaying the variables extracted in the variable extractor means by fuzzy rule.

The variable extractor means in accordance with the twenty-ninth aspect of the present invention extracts a variable of the input data and a variable of the inference result, and the display means displays the extracted variables so as to clarify the correspondence therebetween, thereby facilitating detection of description error in the fuzzy rules.

Thus, since the result verification means includes the variable extractor means and display means, the fuzzy development-support device in accordance with the twenty-ninth aspect of the present invention can detect errors in the fuzzy rules to thereby facilitate generation of fuzzy rules.

According to the thirtieth aspect of the present invention, in the fuzzy development-support device of the twenty-ninth aspect, the data input means further includes input data generator means for generating verification input data for verification of a plurality of the fuzzy rules, the result verification means includes a data memory for storing the input data when the grade of the consequent membership function outputted from the inference execution means is zero, and the input data stored in the data memory is displayed on the display means.

The data memory in accordance with the thirtieth aspect of the present invention stores the input data which causes the consequent membership function of which the grade is zero through the fuzzy-inference execution. Checking the range of the inference result corresponding to the input data stored in the data memory through a simulation of the whole range using the verification input data allows detection of description error in the fuzzy rules with ease.

Thus, since the data input means includes the input data generator means for generating verification input means and the result verification means includes the data memory for storing the input data when the grade of the consequent membership function is zero and displays the stored input data on the display means, the fuzzy development-support device in accordance with the thirtieth aspect of the present invention facilitates generation of fuzzy rules.

According to the thirty-first aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, the result verification means includes an input data memory for storing the input data used for the fuzzy inference performed in the inference execution means pursuant to a prescribed rule.

The input data memory in accordance with the thirty-first aspect of the present invention allows collection of the input data which reveal the data use.

Thus, since the result verification means includes the input data memory for storing the input data pursuant to a prescribed rule, the fuzzy development-support device in accordance with the thirty-first aspect of the present invention facilitates development of fuzzy rules adequate for the controlled systems.

According to the thirty-second aspect of the present invention, in the fuzzy development-support device of the thirty-first aspect, the input data memory includes an LRU (Least Recently Use)-system memory.

The input data memory of LRU system in accordance with the thirty-second aspect of the present invention allows collection of the input data of high frequency in use.

Thus, since the input data memory is of LRU system, the fuzzy development-support device in accordance with the thirty-second aspect of the present invention facilitates development of fuzzy rules adequate for the controlled systems.

According to the thirty-third aspect of the present invention, in the fuzzy development-support device of the thirty-third, the input data memory includes an FIFO (First In First Out)-system memory.

The input data memory of FIFO system in accordance with the thirty-third aspect of the present invention allows collection of the input data of recent use.

Thus, since the input data memory is of FIFO system, the fuzzy development-support device in accordance with the thirty-third aspect of the present invention facilitates development of fuzzy rules adequate for the controlled systems.

According to the thirty-fourth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means to output an inference result; and result verification means for verifying the inference result including a fuzzy-inference execution process done by the inference execution means. In the fuzzy development-support device, the result verification means includes inference verification means for verifying the inference result by checking the plurality of inference results and a variation ratio of the inference results obtained by using the input data which cause the inference result.

The result verification means in accordance with the thirty-fourth aspect of the present invention can verify the inference result with the variation ratio of the inference results. For example, verification of the inference result using the variation ratio in combination with the inference result value allows many-sided evaluation of the fuzzy rules and the like.

Thus, since the result verification means includes the inference verification means, the fuzzy development-support device in accordance with the thirty-fourth aspect of the present invention facilitates development of fuzzy rules of high reliability.

According to the thirty-fifth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means to output an inference result; and result verification means for verifying the inference result including a fuzzy-inference execution process done by the inference execution means. In the fuzzy development-support device, the result verification means verifies the inference result by checking a variation ratio of the inference results and a variation ratio of the input data.

The result verification means in accordance with the thirty-fifth aspect of the present invention can verify the inference result by checking the variation ratio of the inference results and the variation ratio of the input data. For example, verification of the inference result using these variation ratios in combination with the inference result value allows many-sided evaluation of the fuzzy rules and the like.

Thus, since the result verification means verifies the inference result by checking the variation ratio of the inference results and the variation ratio of the input data, the fuzzy development-support device in accordance with the thirty-fifth aspect of the present invention facilitates development of fuzzy rules of high reliability.

According to the thirty-sixth aspect of the present invention, in the fuzzy development-support device of the thirty-fourth aspect or the thirty-fifth, the result verification means includes verification means for verifying the fuzzy inference by comparing the variation ratio of the inference results with a prescribed data; and a memory for storing the input data depending on a comparison result of the verification means.

The result verification means in accordance with the thirty-sixth aspect of the present invention compares the variation ratio of the inference results with the prescribed value to detect the inference result of large variation, thereby facilitating verification of the inference result.

Thus, since the result verification means verifies the fuzzy inference by comparing the variation ratio of the inference results with prescribed value, the fuzzy development-support device in accordance with the thirty-sixth aspect of the present invention facilitates development of fuzzy rules of high reliability.

According to the thirty-seventh aspect of the present invention, in the fuzzy development-support device of the thirty-fourth aspect or the thirty-fifth aspect, the result verification means includes extractor means for extracting the input data when the variation ratio of the inference results is zero; and a memory for storing the input data extracted by the extractor means.

The extractor means in accordance with the thirty-seventh aspect of the present invention extracts the input data when the variation ratio of the inference results is zero, thereby ensuring easy judgment as to whether the fuzzy rules can generate a prescribed response or not.

Thus, since the result verification means includes the extractor means for extracting the input data when the variation ratio of the inference results is zero, the fuzzy development-support device in accordance with the thirty-seventh aspect of the present invention facilitates generation of fuzzy rules.

According to the thirty-eighth aspect of the present invention, the fuzzy development-support device comprises: data input means for generating input data, fuzzy rules and membership functions for the fuzzy rules to be used in a fuzzy inference; inference execution means for executing the fuzzy inference with the input data, the fuzzy rules and the membership functions generated in the data input means and outputting an inference result; and result verification means for verifying the inference result including a fuzzy-inference execution process done by the inference execution means. In the fuzzy development-support device, the data input means includes generator means for generating verification input data and verification fuzzy rules for verifying the fuzzy inference before executing the fuzzy inference in the inference execution means, and the result verification means includes verification means, which stores expected value of the inference result to be outputted from the inference execution means in response to the input data generated in the generator means, for comparing the inference result obtained by the fuzzy inference using the verification fuzzy rule in the inference execution means with the expected value of the inference result stored therein to verify whether the fuzzy inference is executed correctly.

The verification in accordance with the thirty-eighth aspect of the present invention means can carry out verification as to whether the inference execution means operates correctly. For example, verification as to whether the fuzzy development-support device operates correctly at the start of the operation can be carried out by comparing the inference result obtained by the fuzzy inference using the verification input data and the verification fuzzy rules with the expected value of the inference result.

Thus, since the data input means includes the generator means for generating the verification input data and the verification fuzzy rules and the result verification means includes the verification means for verifying whether the fuzzy inference is executed correctly, the fuzzy development-support device in accordance with the thirty-eighth aspect of the present invention achieves improved reliability.

An object of the present invention is to provide a fuzzy development-support device which allows easy determination of fuzzy rules and membership functions and ready grasp of fuzzy-control operation in a simulation or a control operation over a controlled system, and achieves high operation reliability.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
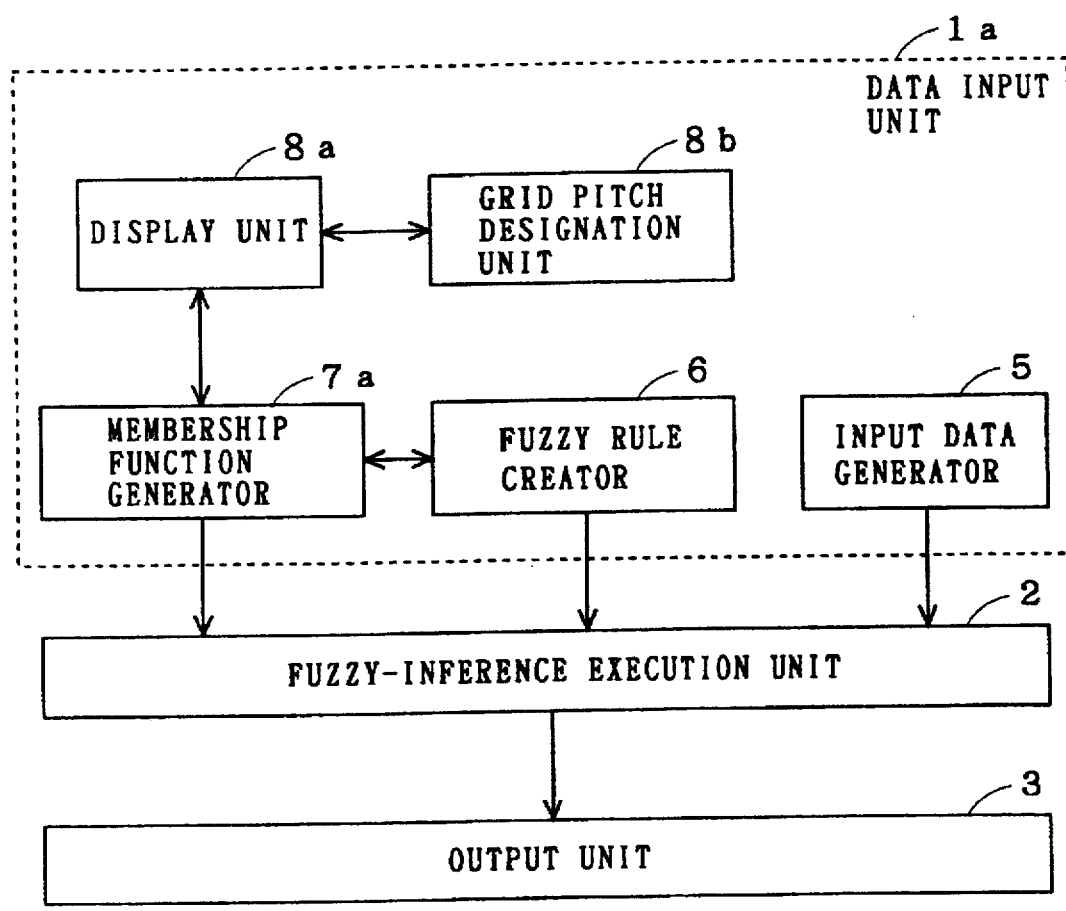
FIG. 1 is a block diagram showing a configuration of a fuzzy development-support device in accordance with a first preferred embodiment of the present invention.

The First Preferred Embodiment:

Now, a fuzzy development-support device in accordance with the first preferred embodiment of the present invention will be discussed. FIG. 1 shows a configuration of the fuzzy development-support device of the first preferred embodiment.

In the fuzzy development-support device of the first preferred embodiment, a data input unit is different from that of the background art. A data input unit 1a comprises an input data generator 5 for generating input data, a fuzzy rule creator 6 for creating fuzzy rules, a membership function generator 7a for generating membership functions, a display unit 8a for displaying the membership functions generated by the membership function generator 7a and a grid pitch designation unit 8b for designating a coordinate pitch for the membership function displayed on the display unit 8a.

Figure 59:
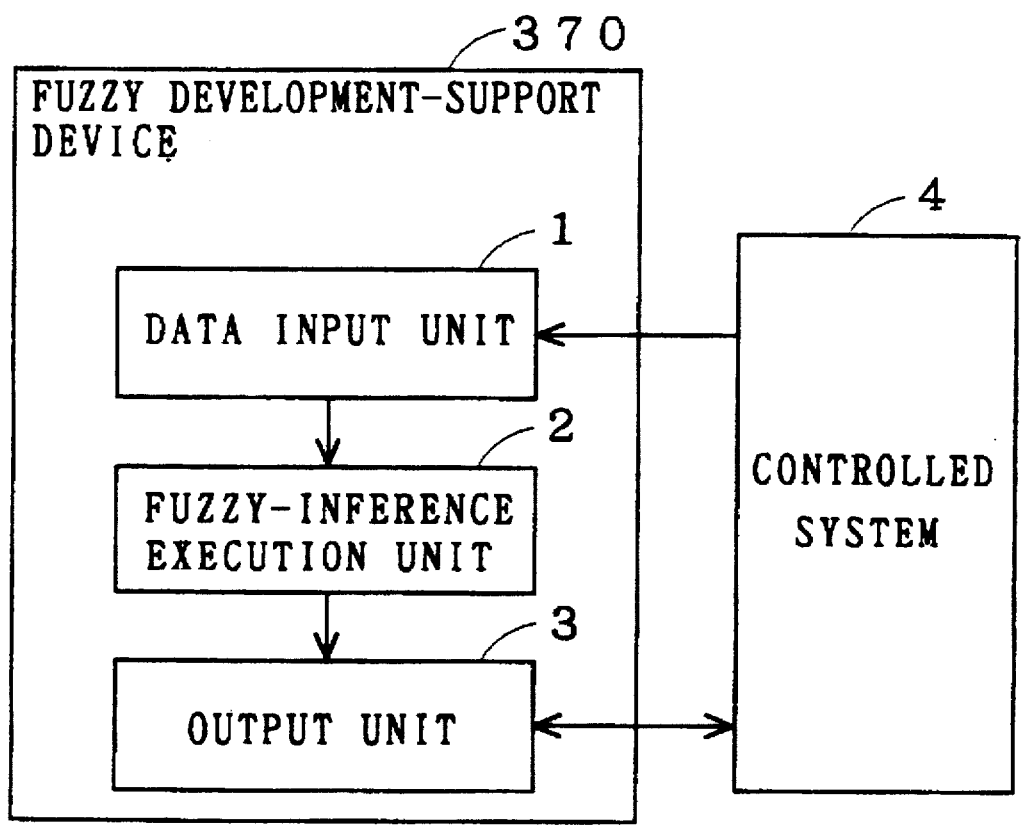
FIG. 59 is a block diagram showing a configuration of a fuzzy development-support device in the background art.
Figure 60:
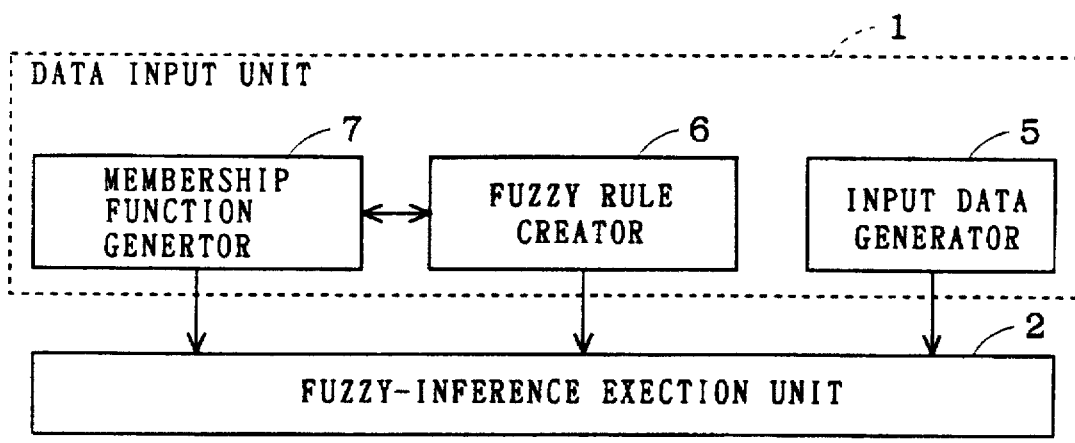
FIG. 60 is a block diagram showing a configuration of the data input unit of the fuzzy development-support device FIG. 59.

Next, an operation of the data input unit 1a will be discussed. The input data generator 5 generates input data. There are two types of input data, i.e., those which are generated on the basis of the data given by the controlled system 4 (shown in FIG. 59) and those which are automatically generated inside the input data generator 5.

In the fuzzy development-support device, fuzzy control is performed with the input data on the basis of the data from the controlled system 4 and a simulation is performed with the input data automatically generated inside the input data generator 5 for the purpose of verification of the fuzzy rules and the like.

The fuzzy rule creator 6 and the membership function generator 7a create fuzzy rules and membership functions, respectively. The membership function generator 7a generates antecedent membership functions corresponding to the antecedent of the fuzzy rules and consequent membership functions corresponding to the consequent of the fuzzy rules.

Figure 2A:
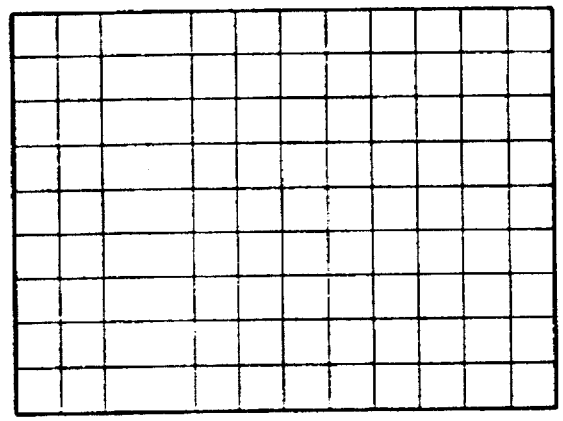
FIGS. 2A to 2C illustrate examples of grid sheets employed in the first preferred embodiment of the present invention.

In the membership function generator 7a, the membership functions are created by using a grid sheet like a sheet of graph paper as shown in FIG. 2A. In this figure, the vertical axis of the grid sheet represents grade and the horizontal axis represents input data or inference result. The data input unit 1a is connected to an input device (not shown) and includes the display unit 8a. The grid sheet is displayed on the display unit 8a.

An operator inputs the data regarding a pitch of the horizontal and vertical axes with the input device in order to determine a grid pitch. For example, the number of input data and divisions of grade of the input data should be inputted in order to determine a pitch of the horizontal and vertical axes for the antecedent membership function. Also, the number of inference results and divisions of grade of the inference result should be inputted in order to determine a pitch of the horizontal and vertical axes for the consequent membership function.

In the grid pitch designation unit 8b, the respective pitches of the horizontal and vertical axes of the membership function are determined according to the data inputted as above. That ensures flexible determination of the grid pitch on the grid sheet. In general, the grid pitch is determined fine when a shape of function to be created is complicated and requires high precision, whereas the grid pitch is determined coarse when a shape of function to be created is simple and requires facility rather than precision.

When the grid pitch is determined, vertical lines perpendicular to the horizontal axis of the grid sheet, corresponding to the input data, appear on the display unit 8a so as to input the data in agreement with the grid pitch, and horizontal lines perpendicular to the vertical axis of the grid sheet, corresponding to the grade, also appear on the display unit 8a.

The membership function generator 7a receives only the data which correspond to grid points of the grid sheet on the display unit 8a. When the operator inputs the membership function by moving the cursor with a mouse on the grid sheet, observing the grid sheet displayed on the display unit 8a, the membership function generator 7a reads the input data and the grade represented by the grid point which is the closest to the cursor position of mouse click as inputted data. If the mouse button is clicked out of the grid points, data out of the grid points is prevented from being inputted by rounding the values of cursor position, and the like.

The membership function generator 7a interpolates straight lines between the designated grid points to complete the membership function.

Figure 2B:
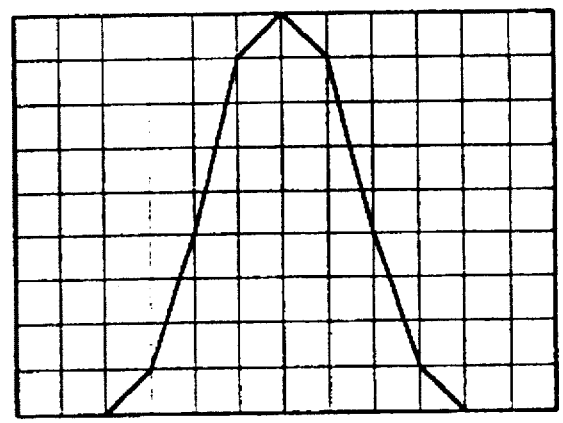
Figure 2C:
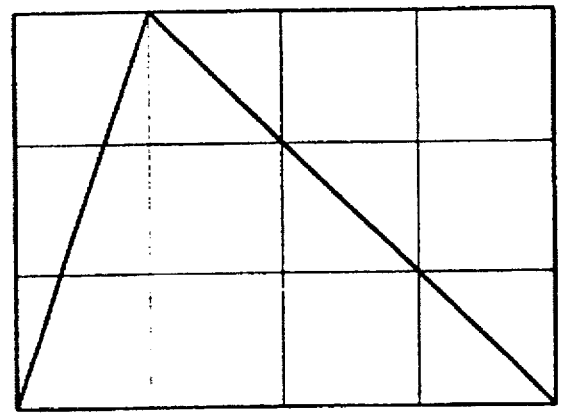

FIG. 2B shows a case of generating a membership function of bell curve with fine pitch, while FIG. 2C shows a case of generating a membership function of triangle with coarse pitch.

In FIG. 2B, the grid sheet of 9 grids high by 12 grids wide allows 130 points to be designated, while in FIG. 2C, the grid sheet of 3 grids high by 4 grids wide allows only 20 points to be designated.

Thus, the fuzzy development-support device of the first preferred embodiment generates the membership functions with a grid sheet and allows flexible determination of the pitch of the grid sheet by the grid pitch designation unit 8b. The grid pitch of the grid sheet indicated by the membership function generator 7a can be arbitrarily determined according to the data regarding the number of input data and divisions of grade which the operator inputs to the grid pitch designation unit 8b. When a simple shape such as triangle is designated as a membership function, coarse grid pitch with a smaller number of input data and decreased divisions of grade allows reduction in the number of the grid points to be taken into account for creating the membership function, thereby achieving good efficiency in creation of membership functions and reduction in the number of input errors.

In the first preferred embodiment, if-then rule has been discussed. As a fuzzy rule, however, any rule using membership functions may be used to produce the same effect.

Furthermore, although the fuzzy inference by the minimum-maximum centroid method has been discussed, any inference method using membership functions may be used to produce the same effect.

Figure 3:
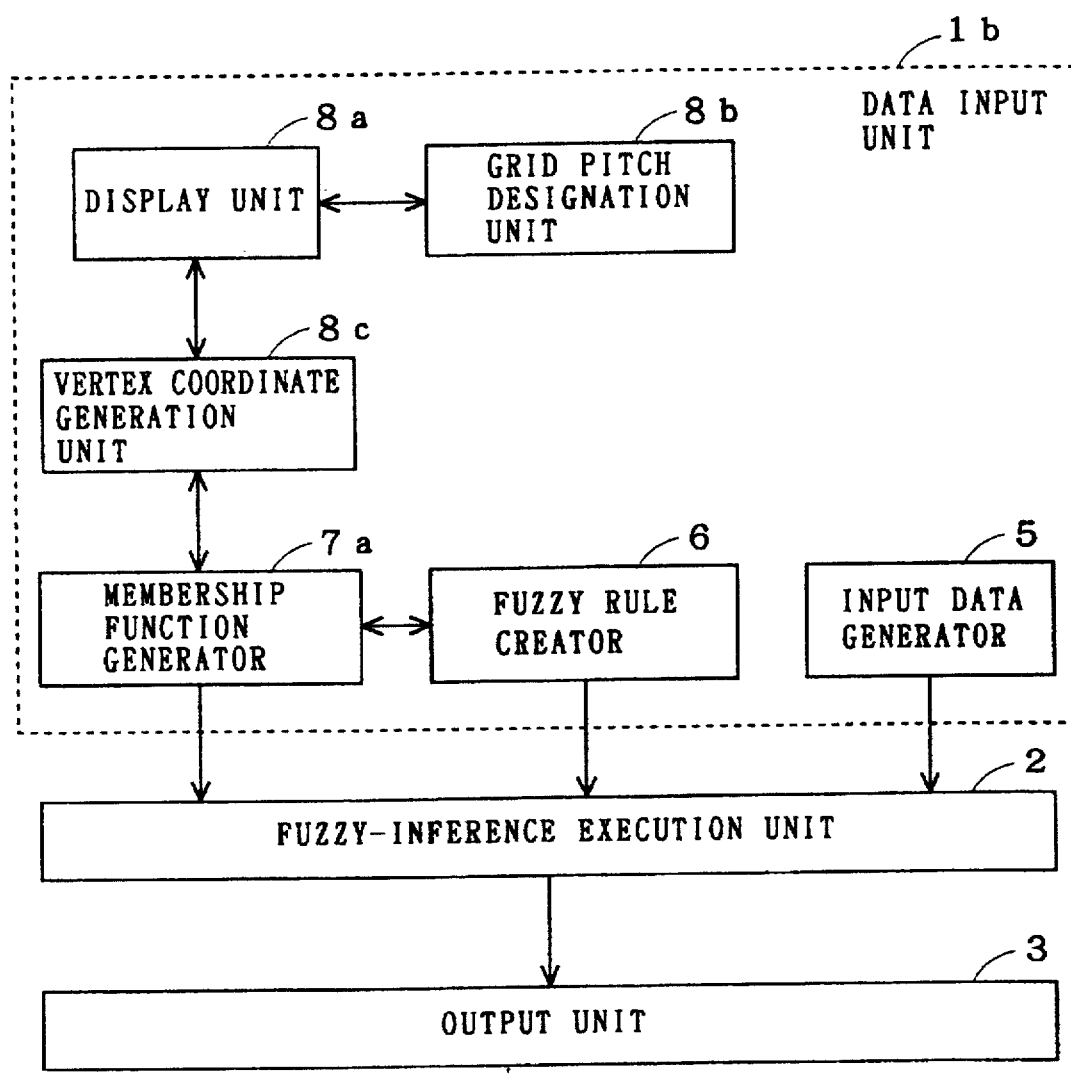
FIG. 3 is a block diagram showing a configuration of a fuzzy development-support device in accordance with a second preferred embodiment of the present invention.

The Second Preferred Embodiment:

A fuzzy development-support device in accordance with the second preferred embodiment of the present invention will be discussed. In the fuzzy development-support device of the second preferred embodiment, a data input unit is different from that of the background art. FIG. 3 is a block diagram showing a configuration of a data input unit 1b of the second preferred embodiment.

In the data input unit 1b of the second preferred embodiment, only difference from the data input unit 1a of the first preferred embodiment lies in a function of inputting for generating membership functions. Accordingly, an input data generator 5 and a fuzzy rule creator 6 of FIG. 3 are the same as those of FIG. 1. Also the relation between the fuzzy rule creator 6 and a membership function generator 7a of FIG. 3 is the same as that of FIG. 1. A vertex coordinate generation unit 8c for generating coordinates indicating the vertices of membership function is further provided in the data input unit 1b of the second preferred embodiment, which is different from the data input unit 1a of the first preferred embodiment. The data input unit 1b of the second preferred embodiment is also connected to an input device (not shown) and includes a display unit, like in the first preferred embodiment.

Next, the membership function generator 7a of the second preferred embodiment will be discussed. As shown in FIG. 3, the data input unit 1b comprises a display unit 8a, a grid pitch designation unit 8b for designating a grid pitch and a vertex coordinate generation unit 8c for generating vertex coordinates of membership function to be displayed on the display unit 8a. The input device such as a mouse is connected to the vertex coordinate generation unit 8c. The membership function generator 7a generates membership functions corresponding to fuzzy rules.

Figure 4:
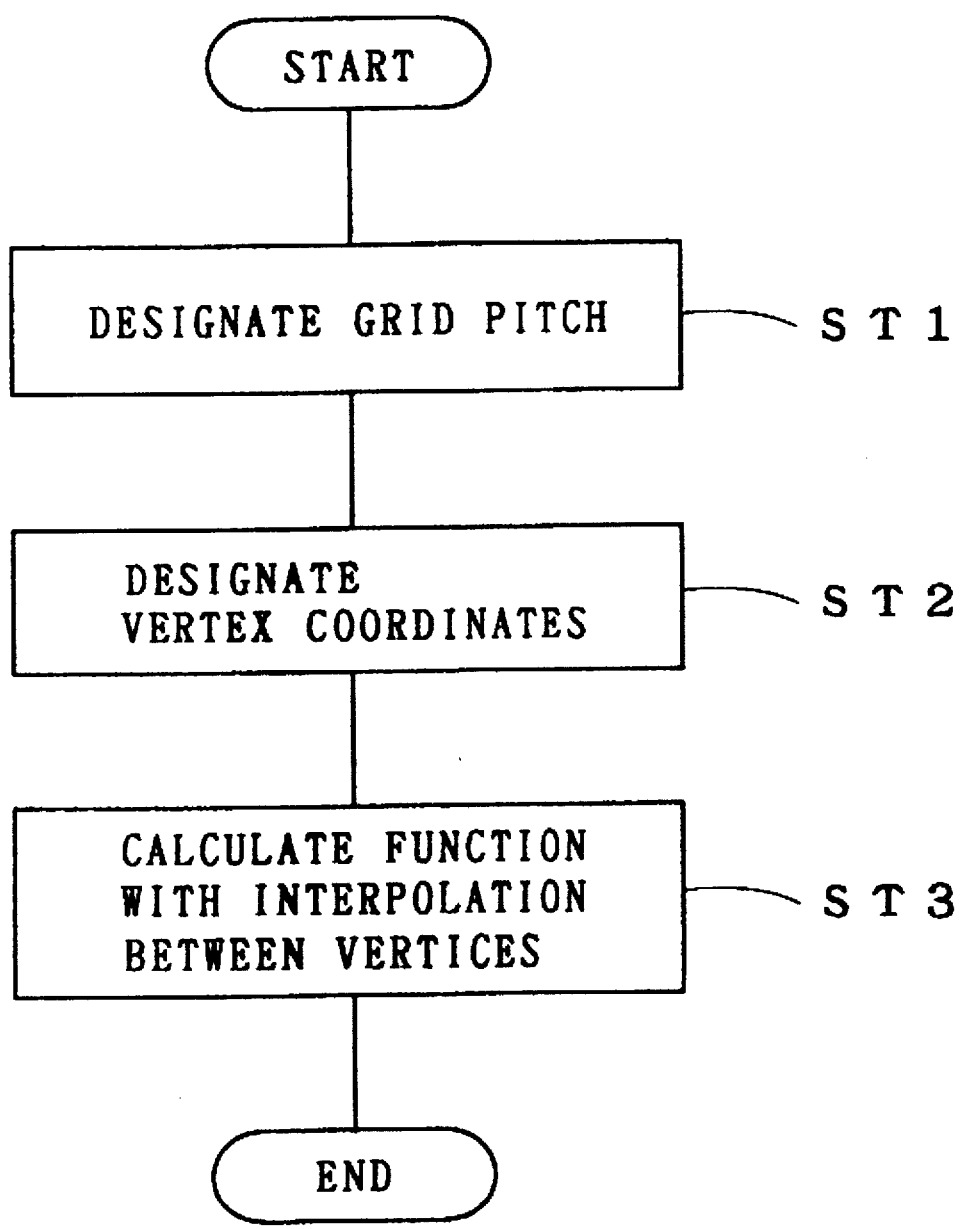
FIG. 4 is a flow chart showing an operation of the fuzzy development-support device in accordance with the second preferred embodiment of the present invention.

This procedure will be discussed referring to FIG. 4. In step ST1, the membership function generator 7a creates a grid sheet and an auxiliary sheet according to the grid pitch which the operator designates with the grid pitch designation unit 8b and gives the grid sheet and the auxiliary sheet to the display unit 8a to be displayed thereon.

Figure 5A:
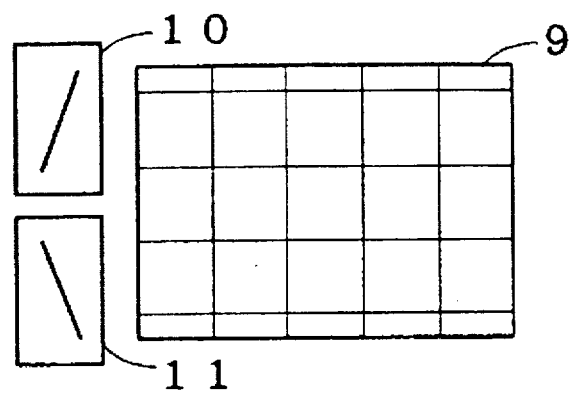
FIGS. 5A to 5D illustrate an example of using a grid sheet and auxiliary sheets in accordance with the second preferred embodiment of the present invention.

For example, a shape of membership function is created with a grid sheet like a sheet of graph paper and two auxiliary sheets, as shown in FIG. 5A. FIG. 5A shows a grid sheet 9 and auxiliary sheets 10 and 11. The vertical axis of the grid sheet 9 represents grade and the horizontal axis represents input data or inference result. On the auxiliary sheet 10, a straight line is drawn upward to the right in advance, while on the auxiliary sheet 11, a straight line is drawn downward to the right in advance.

Figure 5B:
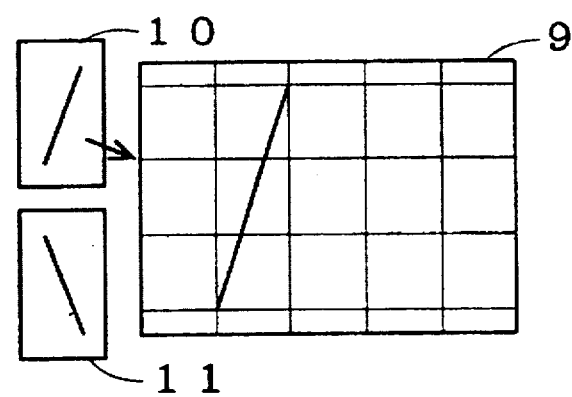
Figure 5C:
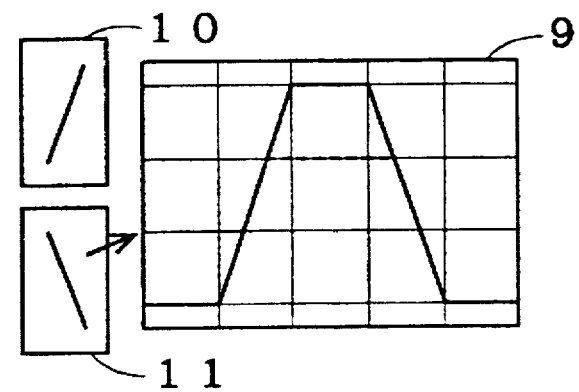
Figure 5D:
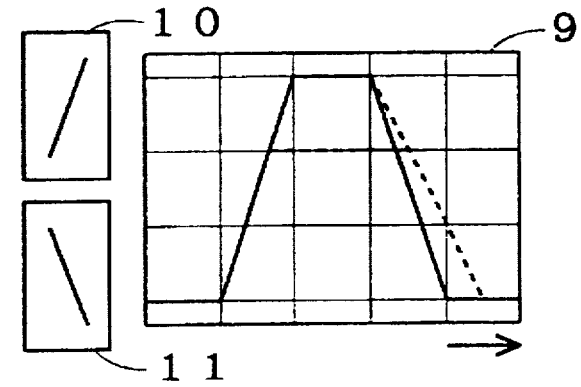
Figure 6A:
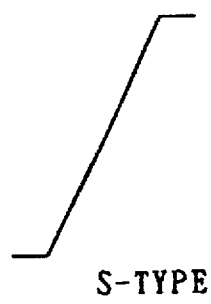
FIGS. 6A to 6E are concept views showing shapes of membership functions.
Figure 6D:
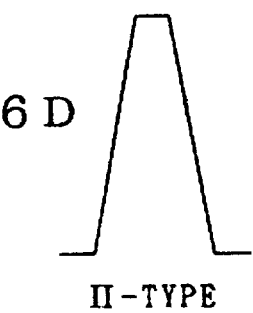
Figure 6B:
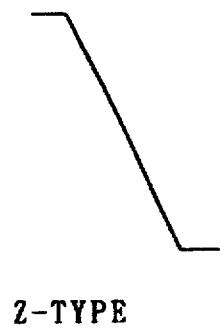
Figure 6E:
Figure 6C:
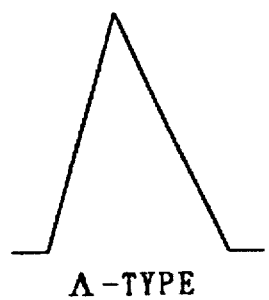

In order of FIGS. 5B to 5D, creating operation of the shape of membership function proceeds. As shown in FIG. 5B, the straight line upward to the right on the auxiliary sheet 10 is copied to the grid sheet 9, for example, with a mouse clicking on the auxiliary sheet 10 and the grid sheet 9 alternately, thereby determining the left side of membership function. At this time, the vertex coordinate generation unit 8c generates two coordinates of the vertex determined by the left side and the upper base and the vertex determined by the left side and the lower base in a trapezoid. On the grid sheet 9, a part of the membership function (the left side of trapezoid) is displayed on the basis of the two coordinates.

As shown in FIG. 5c, the straight line downward to the right on the auxiliary sheet 11 is copied to the grid sheet 9 like in FIG. 5B. The vertex coordinate generation unit 8c generates two coordinates of the vertex determined by the right side and the upper base and the vertex determined by the right side and the lower base in a trapezoid. The upper base of trapezoid is on a grade level of "1" and the lower base is on a grade level of "0". On the grid sheet 9, a part of the membership function (the right side of trapezoid) is further displayed on the basis of the two coordinates.

Finally, the vertical position of trapezoid is redetermined. Cutting upper portions of the two straight lines upward to the right and downward to the right beyond a newly prescribed grade level of "1" completes the membership function of trapezoid. The vertex coordinate generation unit 8c alters the coordinates of the two vertices on both ends of the upper base.

As shown in FIG. 5D, modification of the shape of membership function may be done by moving some of the vertices of trapezoid, followed by redetermination of the vertical position. The vertex coordinate generation unit 8c alters the coordinate of the moved vertex and the coordinates of the two vertices on both ends of the upper base. The vertex coordinate generation unit 8c outputs the respective vertex coordinates of the membership function to the display unit 8a. The display unit 8a displays the whole shape of the membership function on the grid sheet 9 on the basis of the vertex coordinates. In creation of membership function, the fuzzy development-support device of the second preferred embodiment needs consideration of the grid pitch of the grid sheet 9 only when the shape of membership function is altered.

The membership function generator 7a interpolates straight lines between the designated grid points to complete the membership function. Accordingly, all of the membership functions required for the fuzzy inference can be created by a simple operation such as provides coordinates of the membership function with auxiliary sheets representing partial waveforms prepared in advance.

FIGS. 6A to 6E show standard shapes of membership functions. FIGS. 6A, 6B, 6C, 6D and 6E show S-type, Z-type, Λ-type, Π-type and I-type, respectively. A trapezoid (Π-type) is regarded herein as a basic shape of membership function to create membership functions. The reason is as follows: Λ-type (triangle) may be considered essentially a trapezoid with an upper base of length zero. S-type may be considered essentially a trapezoid with a right side perpendicular to the horizontal axis and in agreement with the maximum value of the input data. Z-type may be considered essentially a trapezoid with a left side perpendicular to the horizontal axis and in agreement with the minimum value of the input data. In these cases, the auxiliary sheets provide the right and left sides of trapezoid.

Thus, the fuzzy development-support device of the second preferred embodiment determines inclined sides of triangle or trapezoid with auxiliary sheets. That allows generation of a shape of membership function without consideration of the grid pitch of the grid sheet 9, thereby reducing operation overhead.

In the second preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

In the above discussion, two auxiliary sheets are used. Any number of auxiliary sheets, however, may be used. Use of a plurality of auxiliary sheets having different slopes can also produce the same effect. Moreover, not only a sloped straight line but also a curve for a bell function and rectangular may be employed in the auxiliary sheet to produce the same effect.

Instead of being designated with auxiliary sheets, the basic shape of membership function may be generated in advance and then altered by moving the vertex coordinates thereof, to produce the same effect.

Figure 7:
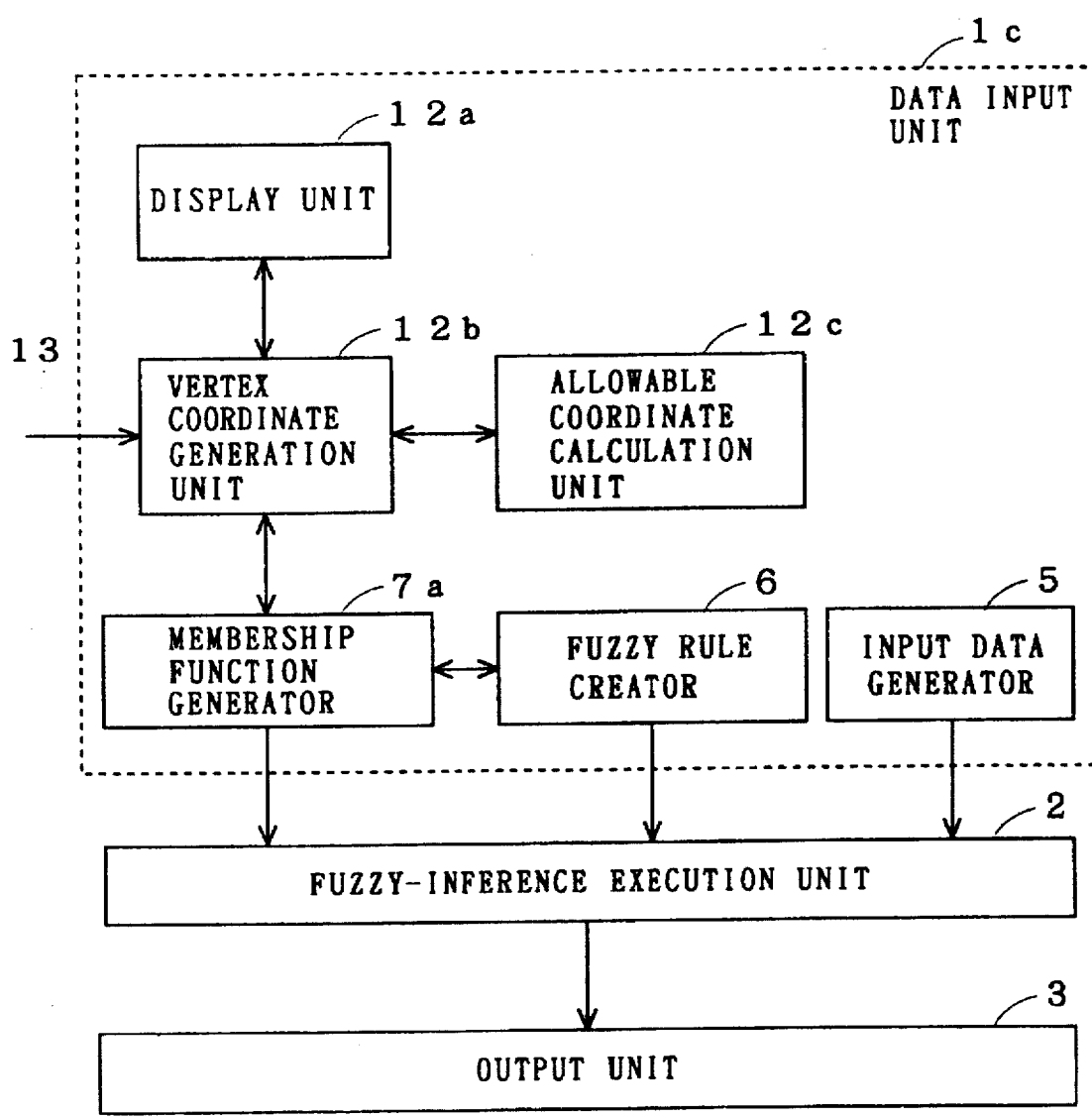
FIG. 7 is a block diagram showing a configuration of a fuzzy development-support device in accordance with a third preferred embodiment of the present invention.

The Third Preferred Embodiment:

A fuzzy development-support device in accordance with the third preferred embodiment of the present invention will be discussed. FIG. 7 is a block diagram showing a configuration of a data input unit 1c of the fuzzy development-support device of the third preferred embodiment. In the fuzzy development-support device of the third preferred embodiment, the data input unit 1c is different from the data input unit 1 of the background art. An input data generator 5 and a fuzzy rule creator 6 in the data input unit 1c, a fuzzy-inference execution unit 2 and an output unit 3 are the same as those of the background art, and description thereof will be omitted.

As shown in FIG. 7, the data input unit 1c comprises a membership function generator 7a, a display unit 12a for displaying the membership function generated by the membership function generator 7a, a vertex coordinate generation unit 12b for generating coordinates indicating the vertices of membership function displayed on the display unit 12a and an allowable coordinate calculation unit 12c for calculating a position to which the vertices of membership function can move.

Figure 8A:
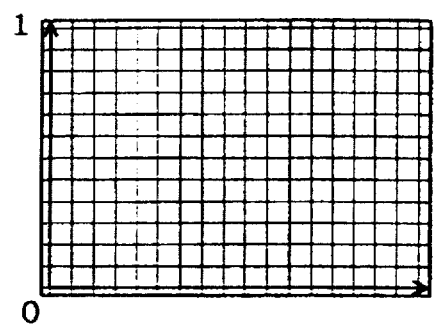
FIGS. 8A to 8D illustrate an example of using a grid sheet in accordance with the third preferred embodiment of the present invention.

The membership function generator 7a generates membership functions required for fuzzy rules. A shape of membership function is created with a grid sheet like a sheet of graph paper, as shown in FIG. 8A.

The vertical axis of the grid sheet represents grade and the horizontal axis represents input data or inference result. The grade on the vertical axis is divided by 12 and the horizontal axis is divided by 17.

A case where the membership function used in the fuzzy development-support device is restricted to a shape which can be represented by a fixed-length parameter will be considered.

Figure 8B:
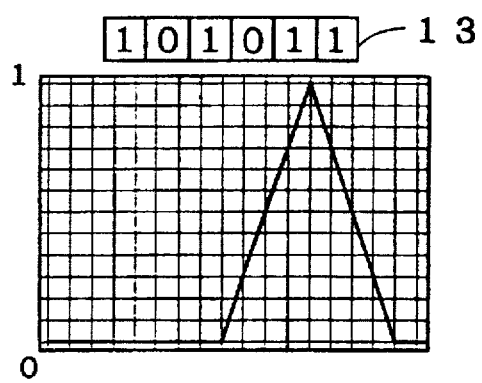

A fixed-length parameter 13 with six bits of FIG. 8B is now used. The parameter 13 serves as a parameter for creating a membership function of triangle. The two bits in the highest-order position designate the slope of left side. The following two bits designate the slope of right side. The two bits in the lowest-order position designate the center position of triangle. The slope of each side is defined by "the value indicated by the two bits in binary representation+1" and the center position is defined by "(the value indicated by the two bits in binary representation+1)×3".

For example, when the parameter 13 indicates "101011", the slope of left side is "2+1=3", the slope of right side is "2+1=3" and the center position is "(3+1)×3=12", resulting in the shape as shown in FIG. 8B.

The membership function generator 7a receives the parameter 13, analyzes the parameter 13 and outputs an analysis result to the vertex coordinate generation unit 12b. The vertex coordinate generation unit 12b generates the respective divisions of vertical and horizontal axes of the grid sheet and the respective coordinates indicating the vertices of the membership function according to the analysis result, and outputs them to the display unit 12a.

Figure 8C:
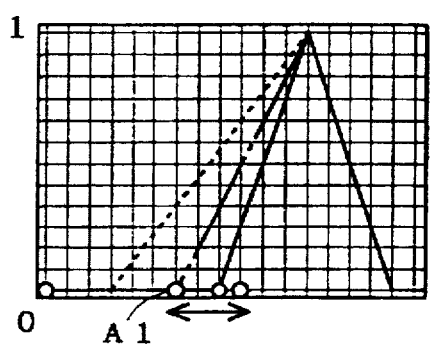

Next, alteration of the shape of membership function displayed on the display unit 12a, as shown in FIG. 8B will be discussed. The altering operation is performed by designating the vertices of triangle with the grid points of the grid sheet. The designation of the grid points is made by clicking on a vertex of the triangle and clicking on a grid point to which the vertex is to be moved with a mouse connected to the vertex coordinate generation unit 12b. Referring to FIG. 8C, altering operation of the sloped left side will be discussed. For alteration of the left side, the first click is made on the left vertex of the triangle.

At this time, the allowable coordinate calculation unit 12c calculates allowable positions to which the clicked vertex may move, as indicated by a blank circle (○). The calculation using the two bits in the highest-order position of the fixed-length parameter is performed. Then, a cursor is moved to the position to which the vertex is to be moved, where the second click is made.

When the second click is out of the allowable positions, the vertex coordinate generation unit 12b decides not to move the vertex and waits the next click. When the click is on one of the allowable positions, the vertex is moved. For instance, when the second click is on an allowable position A1, the left side is altered as indicated by the chain line. The vertex coordinate generation unit 12b rewrites the parameter 13 with the coordinate of the vertex A1 into "011011". Similar calculation of allowable positions is performed for alteration of the right side.

Figure 8D:
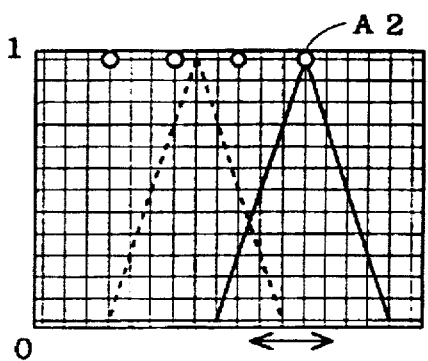

FIG. 8D shows a parallel displacement of the triangle. For parallel displacement of the triangle, a click is made on the center vertex. When a click is made on a vertex A2, the allowable coordinate calculation unit 12c calculates allowable positions to which the vertex A2 may move and then the vertex coordinate generation unit 12b outputs the allowable positions to the display unit 12a to be displayed thereon. The calculated allowable positions are indicated by blank circles (○) of FIG. 8D. The calculation of allowable positions for alteration of the right side uses the two bits in the middle position of the parameter 13, and the calculation of allowable positions for parallel displacement of the triangle uses the two bits in the lowest-order position.

This method ensures that the altered membership function can be also represented by the fixed-length parameter 13. Then, the membership function generator 7a creates the membership function by using the fixed-length parameter 13 outputted from the vertex coordinate generation unit 12b.

Thus, the fuzzy development-support device of the third preferred embodiment calculates allowable positions to which the membership function may be altered, and restricts movement of the vertices of membership function to any of the allowable positions. It is ensured that the altered membership function can be also represented by a fixed-length parameter, thereby reducing operation overhead caused by alteration of membership functions to a shape which can not be determined.

In the third preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

In the third preferred embodiment, membership functions of any shape as well as triangle can produce the same effect.

Also, the allowable positions may not be displayed. Pointing a position to which the vertex is to be moved can be done with tab-key of a keyboard and the like as well as with mouse click.

Figure 9:
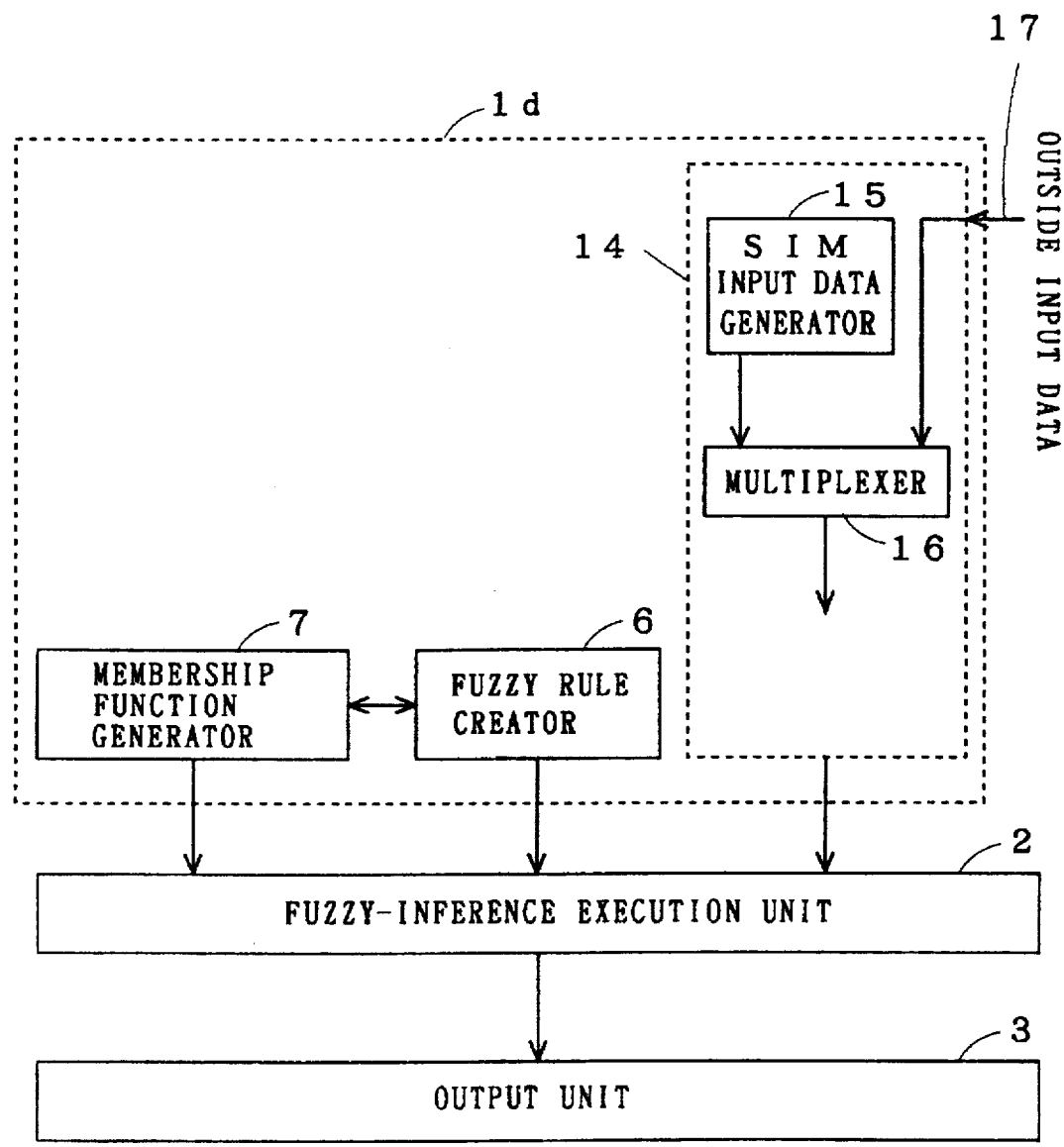
FIG. 9 is a block diagram showing a configuration of a fuzzy development-support device in accordance with a fourth preferred embodiment of the present invention.

The Fourth Preferred Embodiment:

A fuzzy development-support device in accordance with the fourth preferred embodiment of the present invention will be discussed. FIG. 9 is a block diagram showing a configuration of the fuzzy development-support device of the fourth preferred embodiment. The fuzzy development-support device of the fourth preferred embodiment is characterized by a data input unit 1d.

In FIG. 9, a fuzzy rule creator 6 and a membership function generator 7 in the data input unit 1d, a fuzzy-inference execution unit 2 and an output unit 3 are the same as those of the background art. The difference of the fuzzy development-support device of FIG. 9 from that of the background art lies in a configuration of an input data generator 14 for generating input data.

In FIG. 9, the input data generator 14 comprises an SIM input generator 15 for generating input data for simulation and a multiplexer 16 for switching between outside input data 17 and the simulation input data. The outside input data 17 are given from a controlled system 4 (shown in FIG. 59) disposed outside the fuzzy development-support device.

An operation of the fuzzy development-support device of FIG. 9 will be discussed. The fuzzy development-support device allows both fuzzy control over the controlled system 4 and a simulation for verifying fuzzy rules. When the fuzzy control over the controlled system 4 is performed, the multiplexer 16 selects the outside input data 17.

Then, the fuzzy-inference execution unit 2 receives an output from the data input unit 1d and outputs an inference result calculated therein as a control signal to the controlled system 4.

Next, the simulation for verifying fuzzy rules will be discussed, taking a case of verification of the fuzzy rules as below and the membership functions of FIGS. 10A and 10B:

rule 0: If x0=A0 and x1=B0 then y=P0 rule 1: If x0=A1 and x1=B1 then y=P1  (7)

where x0 and x1 represent input data and y represents output data. A0, A1, B0, B1, P0 and P1 represent membership functions. As shown in FIGS. 10A and 10B, all the membership functions A0, A1, B0 and B1 are triangular.

Figure 10A:
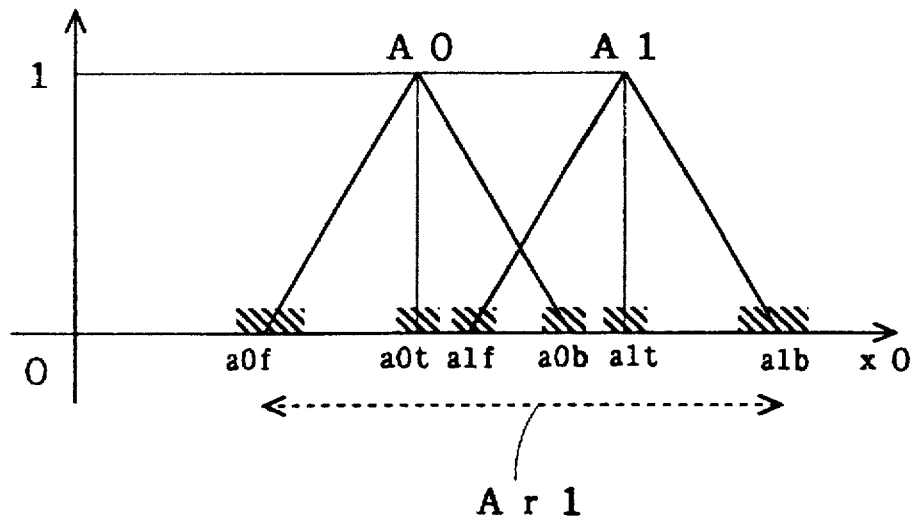
FIGS. 10A and 10B are graphs illustrating shapes of membership functions employed in the fourth preferred embodiment of the present invention.
Figure 10B:
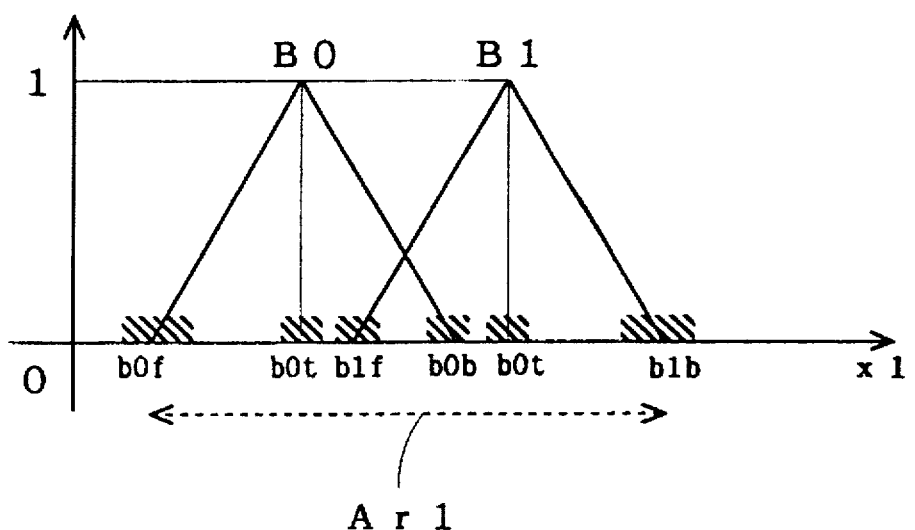

In FIGS. 10A and 10B, a0t, a1t, b0t and b1t represent abscissas of the center vertices of the membership functions A0, A1, B0 and B1, respectively, and a0f, a1f, b0f and b1f and a0b, a1b, b0b and b1b are abscissas of the left vertices and right vertices.

In performing the simulation, the SIM input data generator 15 calculates input data around the three vertices of each membership function of triangle as simulation input data.

The input data around each of the three vertices lie within a range of "the abscissa of the vertex±an offset". For example, when the offset is defined as 1, the input data x0 generated in the SIM input data generator 15 are indicated by the shaded portions of FIG. 10A (a0f−1, a0f, a0f+1, a0t−1, a0t, a0t+1, a0b−1, a0b, a0b+1, a1f−1, a1f, a1f+1, a1t−1 a1t, a1t+1, a1b−1, a1b and a1b+1) and the input data x1 are indicated by the shaded portions of FIG. 10B (b0f−1, b0f, b0f+1, b0t−1, b0t, b0t+1, b0b−1, b0b, b0b+1, b1f−1, b1f, b1f+1, b1t−1 b1t, b1t+1, b1b−1, b1b and b1b+1).

The simulation is carried out by calculating inference results from these input data and the fuzzy rules in the fuzzy-inference execution unit 2. The calculated inference results are not directly outputted to the controlled system 4, but are outputted to a display unit (not shown), thereby being notified to an operator.

The calculated inference results provide only a part of the whole relations between the input data and the inference results. Since the membership functions A0, A1, B0 and B1 are triangular, there is monotonically increasing function or monotonically decreasing function between each pair of two vertices. Therefore, the inference results can be determined based on the calculated inference results from the input data around the vertices, and thus the operator can grasp the whole response from the simulation results.

Figure 11:
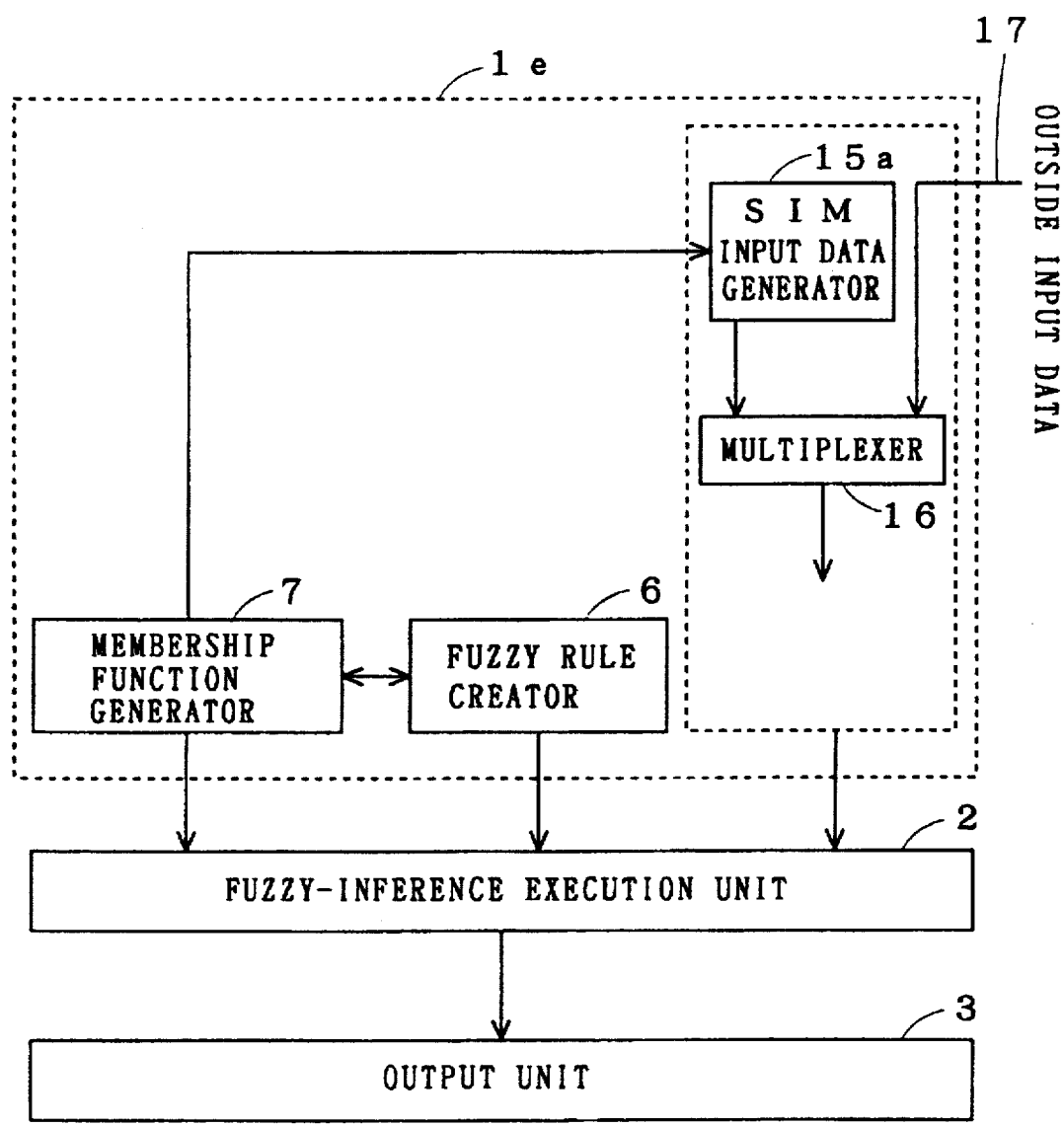
FIG. 11 is a block diagram showing a configuration of a fuzzy development-support device in accordance with a second aspect of the fourth preferred embodiment of the present invention.
Figure 12:
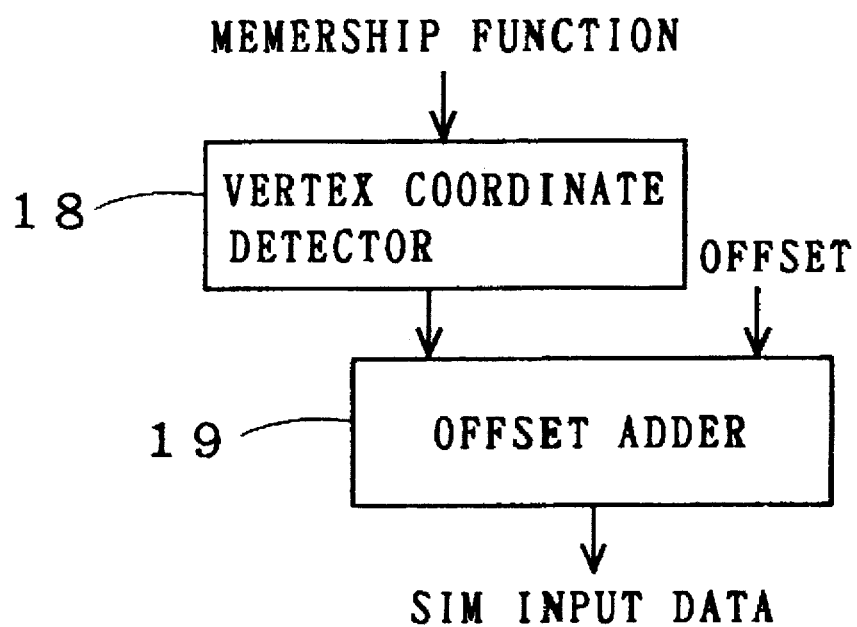
FIG. 12 is a block diagram showing a configuration of the SIM input data generator of FIG. 11.

FIG. 11 shows a data input unit 1e comprising an SIM input data generator 15a for generating SIM input data by using the membership functions. The SIM input data generator 15a has such a configuration as shown in FIG. 12. A vertex coordinate detector 18 inputs a membership function and detects coordinates indicating its vertices. Then, the vertex coordinate detector 18 outputs the detected vertex coordinates to an offset adder 19. The offset adder 19 also receives a signal representing an offset from outside. Then, the offset adder 19 adds the offset to the vertex coordinates detected by the vertex coordinate detector 18 and outputs the addition results as SIM input data.

Figure 13:
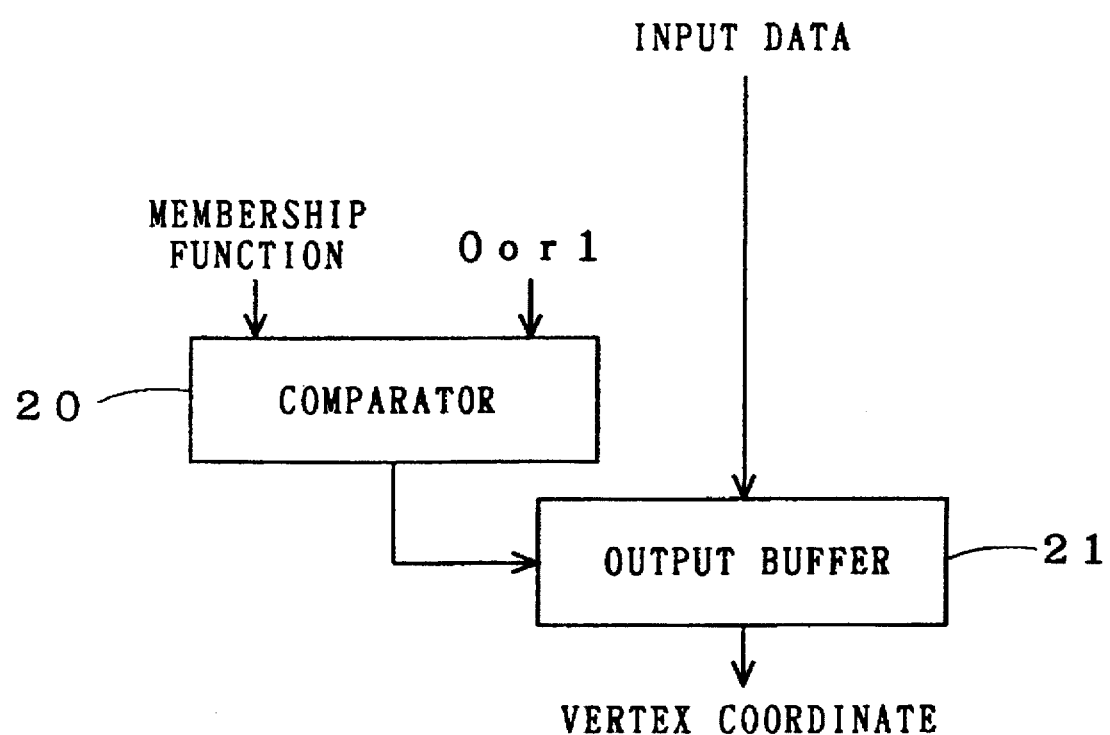
FIG. 13 is a block diagram showing a configuration of the vertex coordinate detector of FIG. 12.

FIG. 13 is a block diagram showing a configuration of the vertex coordinate detector 18 for detecting vertex coordinates. As shown in FIG. 13, an output buffer 21 receives input data in sequence. A comparator 20 receives the membership functions. The comparator 20 compares the grade of the membership function corresponding to the input data inputted into the output buffer 21 with "0" and with "1". When the grade is "0" or "1", the comparator 20 gives a notifying signal to the output buffer 21. Receiving the signal from the comparator 20, the output buffer 21 selectively outputs the input data as vertex coordinate.

Figure 14:
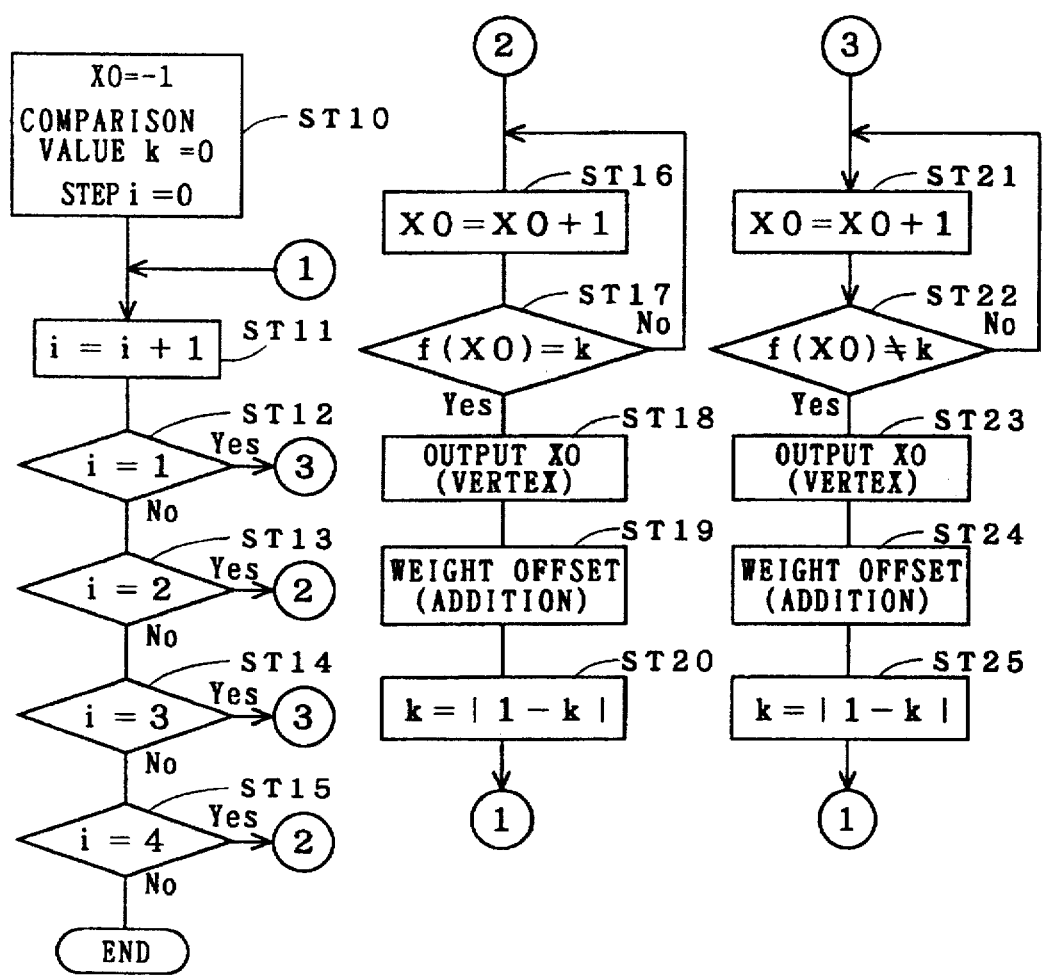
FIG. 14 is a flow chart showing an operation of the SIM input data generator of FIG. 11.

Referring to a flow chart of FIG. 14, a procedure of generating vertex coordinates of a trapezoid will be discussed. At first, in step ST10, input data value X0, comparison value K and comparison step i are set to respective initial values. In step ST11, the comparison step i is incremented by 1. Since a trapezoid has four vertices, detection of vertex coordinates needs four steps. When i=1, step ST12 is followed by step ST21. In steps ST21 and ST22, incrementing input data value X0 by 1, detection of input data value X0 of which grade is not "0" is performed. When detected, the detected input data value is outputted as a vertex coordinate (step ST23). A weight offset is added to the vertex coordinate (step ST24). Then, the value k is changed from "0" to "1" (step ST25). The comparison step i is incremented by 1 (step ST11), and the processing further goes. When i=2, step ST13 is followed by step ST16. In steps ST16 and ST17, incrementing input data value X0 by 1, detection of input data value X0 of which grade is "1" is performed. When detected, the detected input data value is outputted as a vertex coordinate (step ST18). The weight offset is added to the vertex coordinate (step ST19). Then, the value k is changed from "1" to "0" (step ST20). The comparison step i is incremented by 1 (step ST11), and the processing further goes. When i=3 and i=4, like processings are performed.

The fuzzy development-support device of the fourth preferred embodiment comprises the SIM input data generator 15 for generating simulation input data, where the input data around the vertices of triangle are generated as simulation input data, and achieves a verification of fuzzy rules through a simulation with a small number of input data, thereby reducing verification time.

Moreover, selection of input data is made depending on the rule shape, thereby improving efficiency in verification with a small number of data.

In the fourth preferred embodiment, if-then rule has been discussed. As a fuzzy rule, however, any rule using membership functions may be used to produce the same effect.

Furthermore, although the fuzzy inference by the minimum-maximum centroid method has been discussed, any inference method using membership functions may be used to produce the same effect.

Also, the case of a membership function of a trapezoid is the same as above except the number of vertices is four instead of three.

Figure 15:
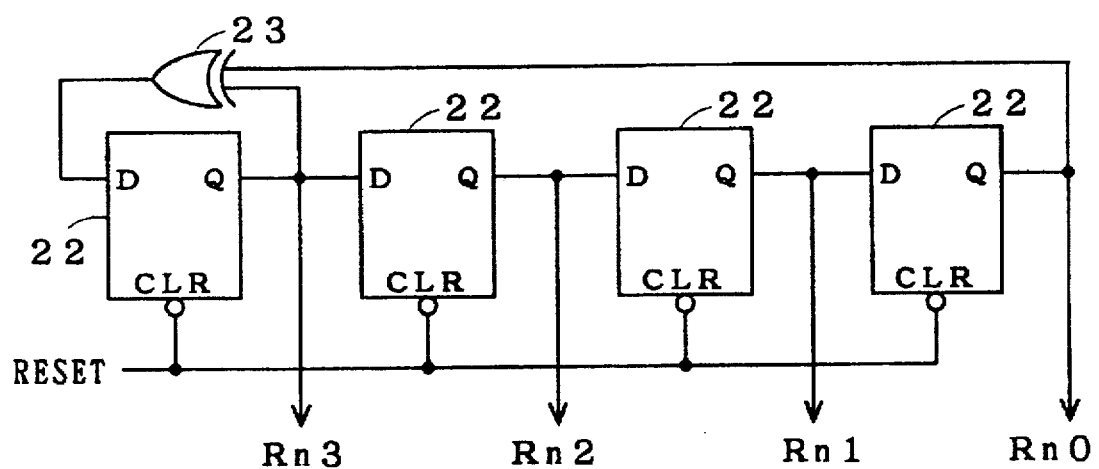
FIG. 15 is a circuit diagram showing an example of the SIM input data generator of FIG. 9.

As input data, random numbers or pseudo random numbers may be used. FIG. 15 shows a configuration of a random number generator. In FIG. 15, the random number generator comprises D latches 22 and EOR gates 23. The random number generator of FIG. 15 generates 4-bit input data. Employing the random number generator as SIM input data generator 15 of FIG. 9 can reduce simulation time.

Figure 16:
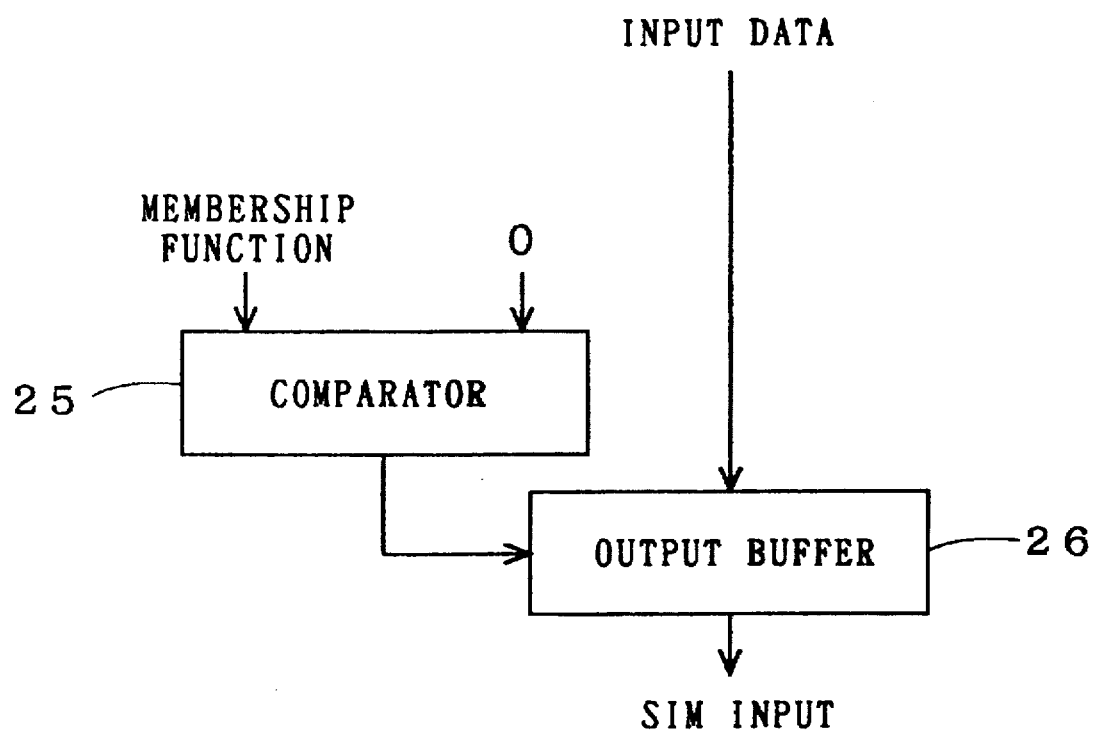
FIG. 16 is a block diagram showing a configuration of a detector.
Figure 17:
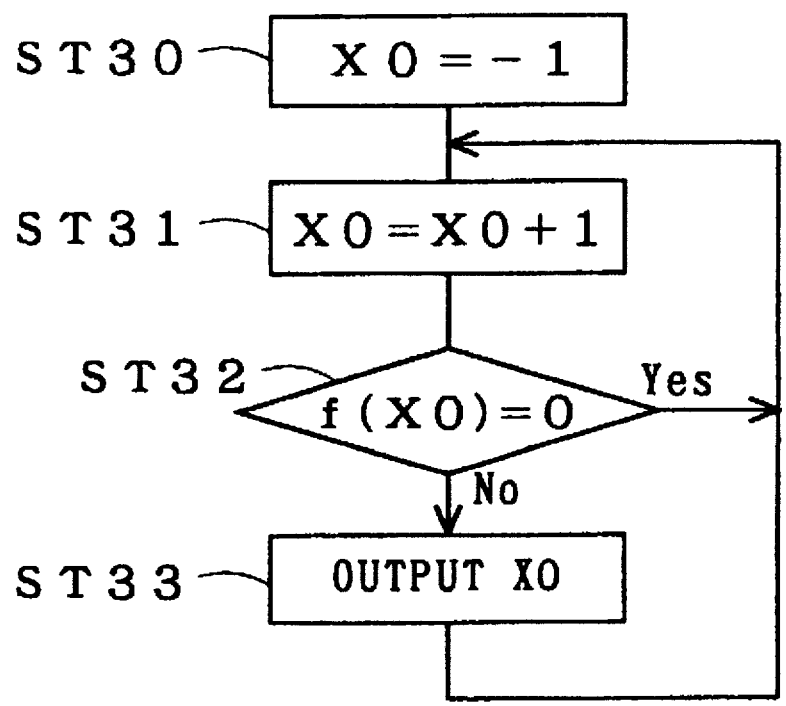
FIG. 17 is a flow chart showing an operation of the detector of FIG. 16.

Although input data around vertices have been discussed, input data of which the grade is not "0" as indicated by the arrow AR1 of FIG. 10B may be used as simulation input data to carry out a verification with a small number of input data. FIG. 16 illustrates a configuration of a detector for outputting input data of which goodness of fit is not "0". FIG. 17 is a flow chart showing an operation of the detector. At first, the input data x0 is set to the initial value (step ST30). As shown in FIG. 16, input data are sequentially inputted to an output buffer 26. Grades corresponding to the input data are inputted to a comparator 25. The comparator 25 performs a comparison between the grade of the membership function corresponding to the input data inputted into the output buffer 26 with "0" (step ST32). When the grade is "0", the comparator 25 gives a signal indicating that the grade is "0" to the output buffer 26. Receiving the signal, the output buffer 26 selectively outputs the input data as vertex coordinate (step ST33). Omission of the input data of which the grade is "0" allows a simulation to be performed for only significant data, thereby reducing the simulation time.

Figure 18:
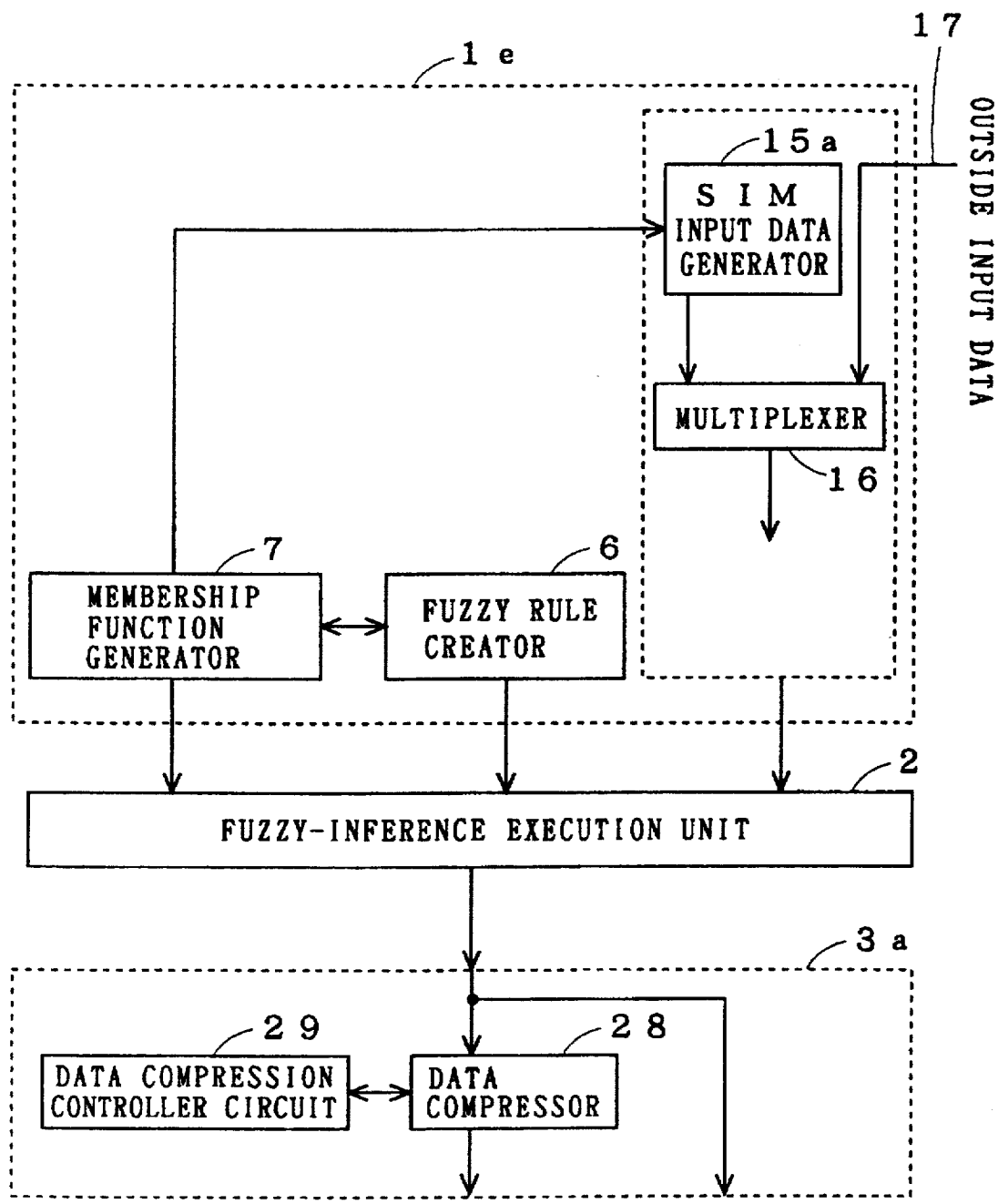
FIG. 18 is a block diagram showing a configuration of a fuzzy development-support device in accordance with a third aspect of the fourth preferred embodiment of the present invention.
Figure 19:
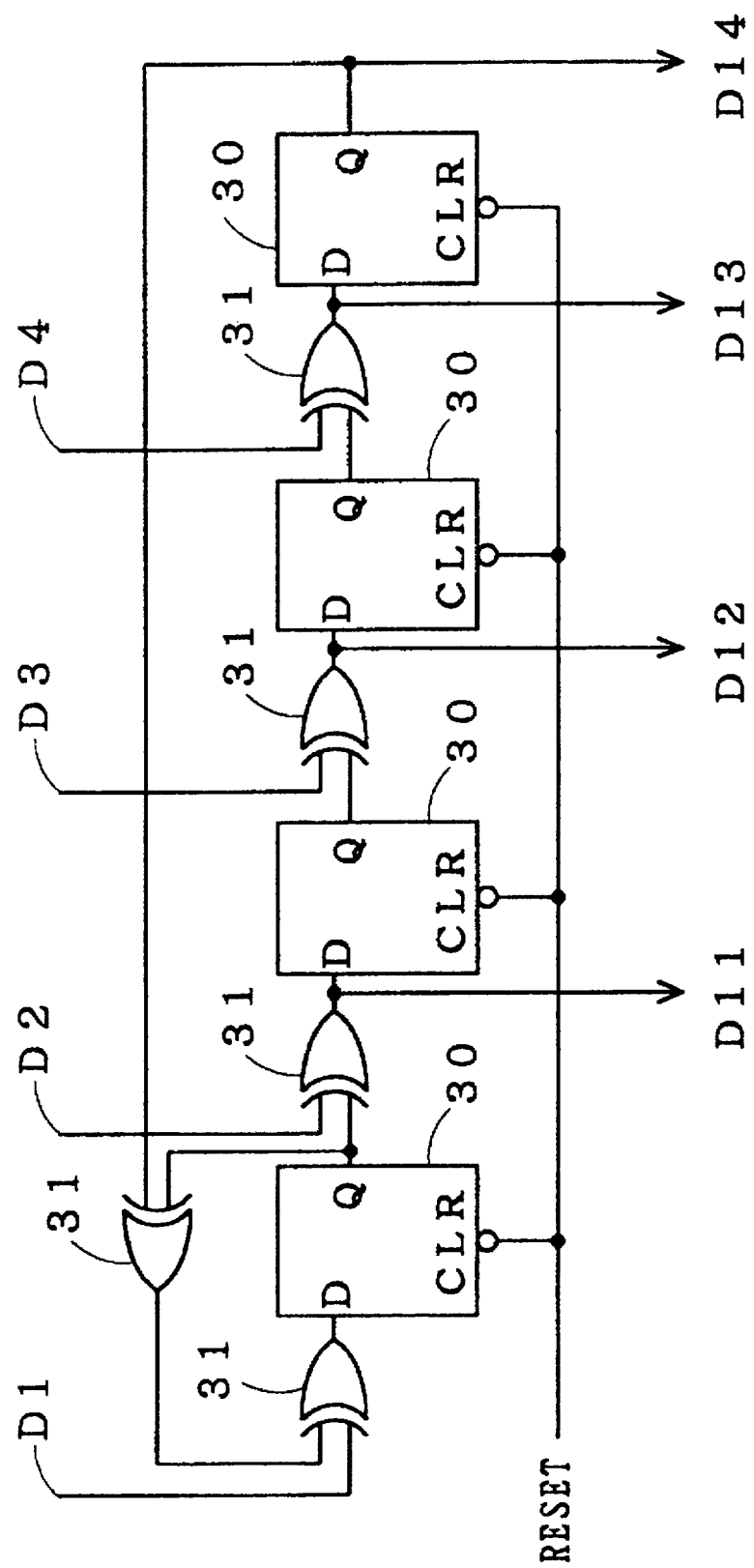
FIG. 19 is a circuit diagram showing a configuration of a data compressor.

Moreover, in the fourth preferred embodiment, there may be a case where the simulation results are compressed before being outputted, reducing the amount of the output data. FIG. 18 is a block diagram showing a configuration of a fuzzy development-support device including a data compressor. In FIG. 18, an output unit 3a includes a data compressor 28 for performing data compression of the inference results outputted from the fuzzy-inference execution unit 2 and a data compression controller circuit 29 for controlling the data compressor 28. When the outside input data are processed, the data compression controller circuit 29 controls the data compressor 28 not to operate. FIG. 19 shows an example of the data compressor 28. The data compressor 28 of FIG. 19 comprises D latches 30 and EOR gates 31, and performs data compression of 4-bit data D1 to D4.

Figure 20:
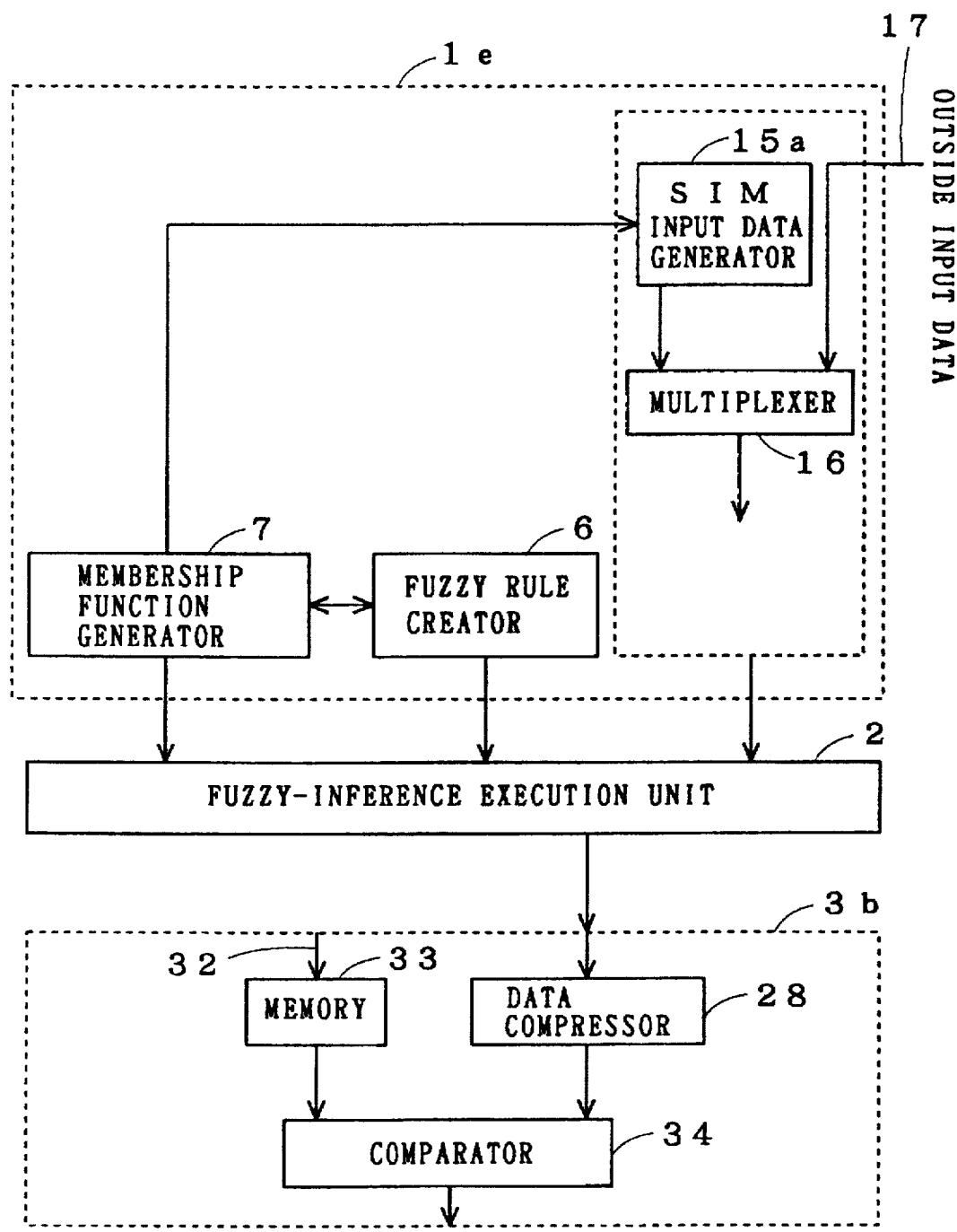
FIG. 20 is a block diagram showing a configuration of a fuzzy development-support device in accordance with a fourth aspect of the fourth preferred embodiment of the present invention.

There may be a configuration where a comparison between the compressed data and expected value data is performed. In this case, the expected value data may be also compressed, and therefore, the amount of the expected value data can be reduced. FIG. 20 is a block diagram showing a configuration of a fuzzy development-support device comprising a data compressor and a comparator. In FIG. 20, an output unit 3b comprises a data compressor 28 for performing data compression of the inference results outputted from the fuzzy-inference execution unit 2, a memory 33 for storing expected value data 32 given from outside and a comparator 34 for comparing the compressed data outputted from the data compressor 28 with the expected value data stored in the memory 33.

Figure 21:
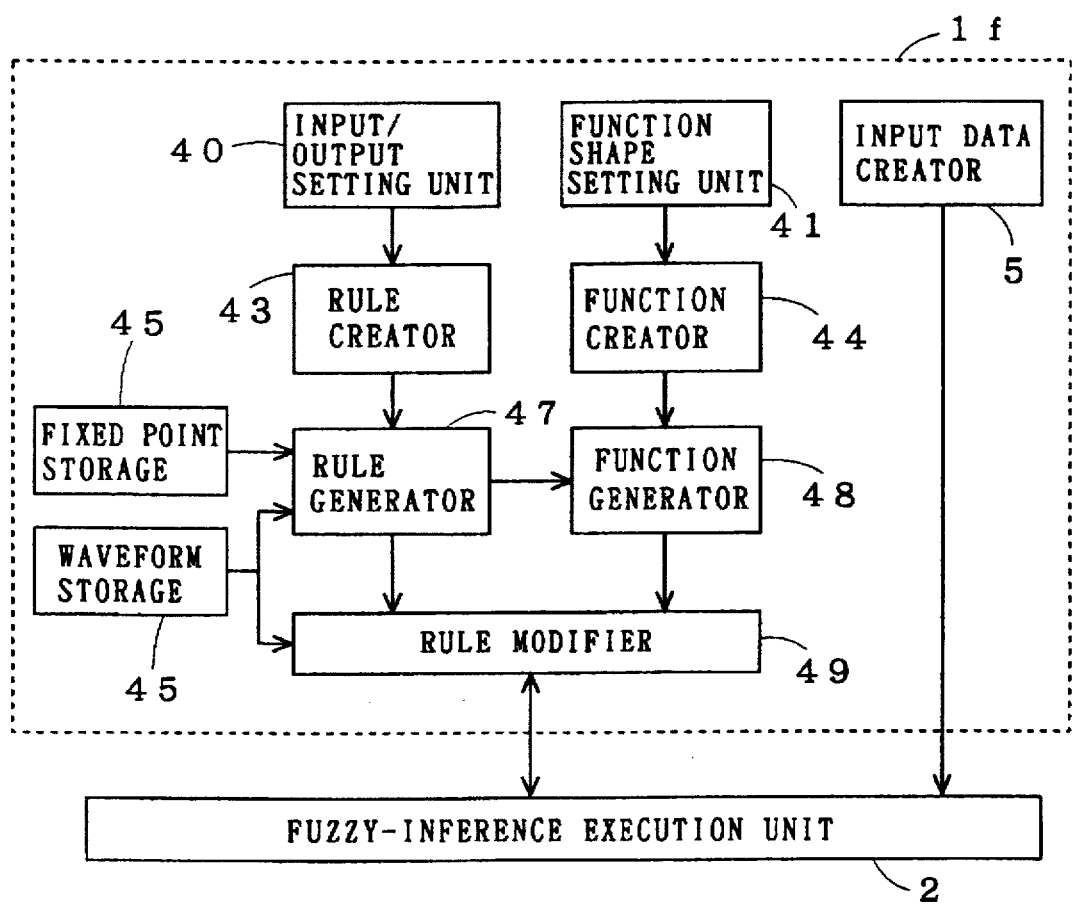
FIG. 21 is a block diagram showing a configuration of a fuzzy development-support device in accordance with a fifth preferred embodiment of the present invention.

The Fifth Preferred Embodiment:

A fuzzy development-support device in accordance with the fifth preferred embodiment of the present invention will be discussed. FIG. 21 is a block diagram showing a data input unit 1f of the fuzzy development-support device of the fifth preferred embodiment. In FIG. 21, the data input unit 1f comprises an input/output setting unit 40 for designating input data and inference results, a function shape setting unit 41 for designating a shape of membership function, a rule creator 43 for creating a fuzzy rule by using the number of input data and the number of inference results, a function creator 44 for creating the designated shape of membership function, a fixed point storage 45 for storing data of fixed points determined on the waveform, a waveform storage 46 for storing data of a waveform of expected value representing the relation between the input data and the inference results, a rule generator 47 for performing copy and alteration of the fuzzy rule, a function generator 48 for performing copy and alteration of the membership function and a rule modifier 49 for modifying the membership function so that the inference result computed by using the fuzzy rule might approximate to the waveform stored in the waveform storage 46. Furthermore, the data input unit 1f comprises the same input data generator 5 as the first preferred embodiment.

Figure 22:
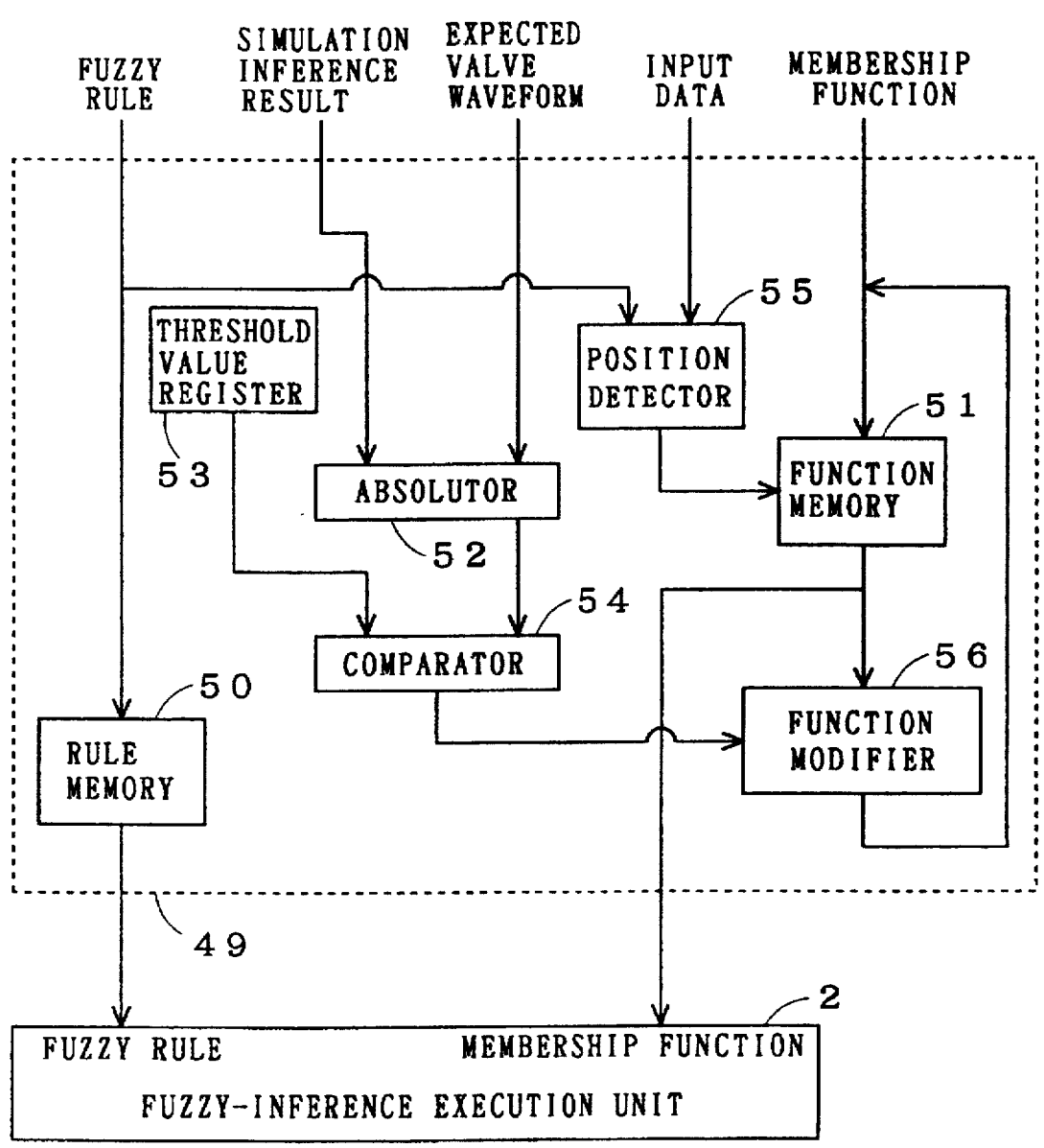
FIG. 22 is a block diagram showing a configuration of the rule modifier of FIG. 21.

FIG. 22 illustrates an internal configuration of the rule modifier 49. In FIG. 22, the rule modifier 49 includes a rule memory 50 for storing the fuzzy rule, a function memory 51 for storing the membership function, an absoluter 52 for computing the absolute value of a difference between the expected value waveform and the computed inference result, a threshold value register 53 for storing a threshold value, a comparator 54 having two inputs for comparing an output from the absoluter 52 with an output from the threshold value register 53, a position detector 55 for detecting a position of the input data and a function modifier 56 for modifying the membership function.

An operation of the fuzzy development-support device of FIG. 21 will be discussed. Initial settings are carried out with respect to input data and inference result of the fuzzy rule, a shape of membership function, an expected value waveform representing a relation between the input data and the inference result and a fixed point on the waveform.

The input data and the inference result are set in the input/output setting unit 40. In a fuzzy-inference execution using two inputs and one output, setting of "x0" and "x1" as input data and "y" as a inference result is performed. The shape of membership function is set in the function shape setting unit 41, where a value representing, for example, "triangle", "trapezoid" or the like is set.

Figure 23A:
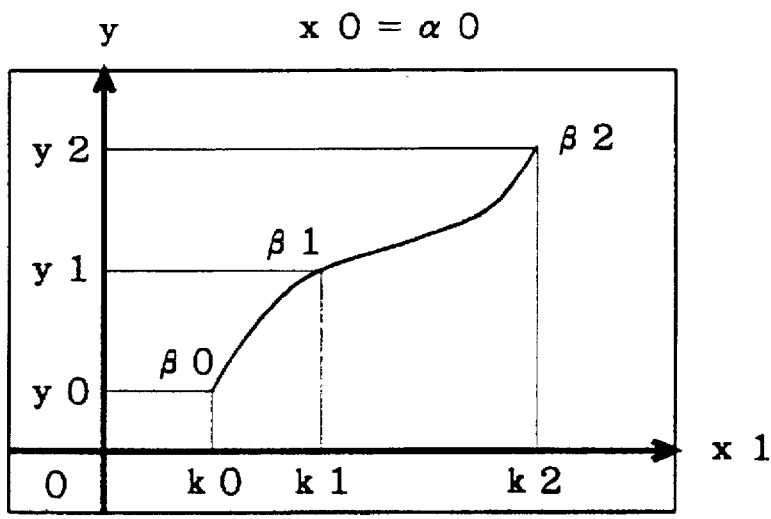
FIGS. 23A and 23B are graphs of expected value waveforms in the fifth preferred embodiment of the present invention.
Figure 23B:
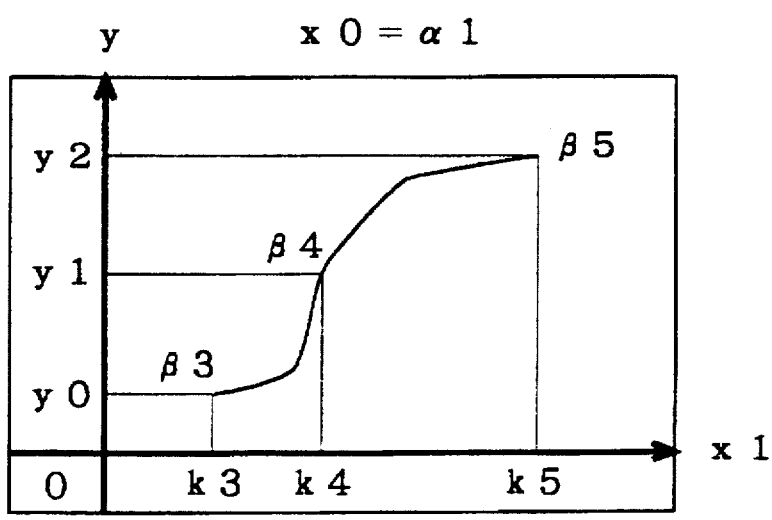

The expected waveform representing the relation between the input data and the inference result is set in the waveform storage 46. FIGS. 23A and 23B show examples of expected waveforms. The expected waveform is defined on a two dimensional coordinate system with respect to one input and one output. The other input data value is fixed to a certain value. In FIGS. 23A and 23B, the input data value x0 is fixed to a0 and a1, and a waveform representing expected values of the input data value x1 and the inference results y is defined.

The fixed points on the waveform are set in the fixed point storage 45. The fixed points are designated on the expected value waveform. The number of fixed points is in agreement with the number of the fuzzy rules which are automatically generated. When the fixed points β0, β1, β2 and β3, β4, β5 as shown in FIGS. 23A and 23B are designated, parameters β0:(a0, k0, y0), β1:(a0, k1, y1), β2: (a0, k2, y2), β3:(a1, k3, y0), β4:(a1, k4, y1) and β5:(a1, k5, y2), each consisting of the value of x0 and the coordinates of the fixed point, are set in the fixed point storage 45. Then, six fuzzy rules are determined.

Completing the initial settings as above, the hardware of FIG. 21 operates to perform automatic generation of fuzzy rules. Referring to a flow chart of FIG. 24, the operation will be discussed.

In step ST40, the rule creator 43 creates fuzzy rules satisfying the input/output relation. Now, two input data values "x0" and "x1" and one inference result "y" are set in the input/output setting unit 40. The rule creator 43 generates labels A0, B0 and P0 representing membership functions and then generates a fuzzy rule as:

$$\text{rule 0: if } x0=A0 \text{ and } x1=B0 \text{ then } y=P0 \tag{8}$$

Figure 25A:
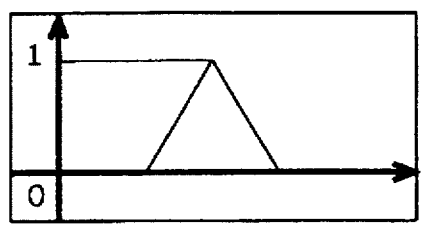
FIGS. 25A to 25E, FIGS. 26A to 26E and FIGS. 27A and 27B are graphs illustrating an operation of the fuzzy development-support device of FIG. 21.

At the same time, the function creator 44 generates membership functions (step ST41). The membership functions generated therein must satisfy the shape designated in the function shape setting unit 41. Assuming that "triangle" is designated in the function shape setting unit 41, the membership function is generated as shown in FIG. 25A.

Next, generations of a plurality of fuzzy rules and membership functions are performed. The generation of fuzzy rules is performed in the rule generator 47, and the generation of membership functions is performed in the function generator 48.

In the rule generator 47, fuzzy rules as much as the number of fixed points stored in the fixed point storage 45 are generated (step ST42). The generation of fuzzy rules is carried out by copying fuzzy rules and altering labels as A0, B0 and P0 representing membership functions are performed. The fuzzy rule of FIG. 25A in the rule creator 43 is used as an original fuzzy rule. The labels of membership functions depend on the fixed points. The stored fixed points herein are β0:(a0, k0, y0), β1:(a0, k1, y1), β2:(a0, k2, y2), β3:(a1, k3, y0), β4:(a1, k4, y1) and β5:(a1, k5, y2). There are employed two values a0 and a1 for the input data x0, six values k0 to k5 for the input data x1 and three values y0 to y2 for the inference result y. Accordingly, the labels of membership functions are A0 and A1 with respect to x0, B0 to B5 with respect to x1 and P0 to P2 with respect to y, totally being eleven. Using these labels, the following fuzzy rules are generated:

rule 0: if x0=A0 and x1=B0 then y=P0 rule 1: if x0=A0 and x1=B1 then y=P1 rule 2: if x0=A0 and x1=B2 then y=P2 rule 3: if x0=A1 and x1=B3 then y=P0 rule 4: if x0=A1 and x1=B4 then y=P1 rule 5: if x0=A1 and x1=B5 then y=P2 (9)

Figure 25B:
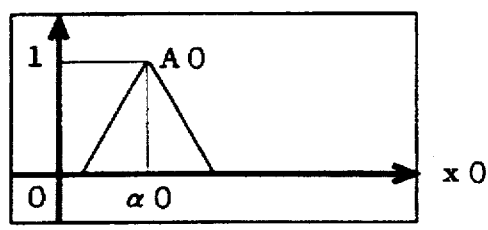
Figure 25C:
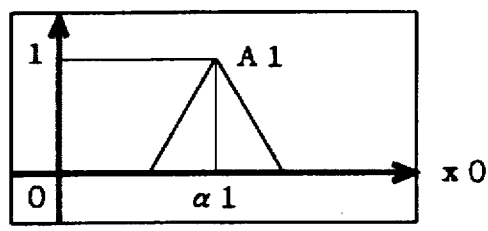
Figure 25D:
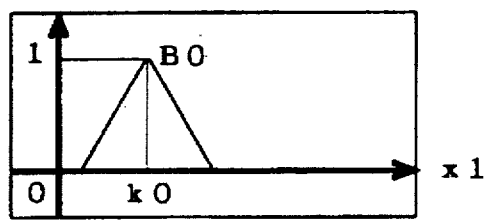
Figure 25E:
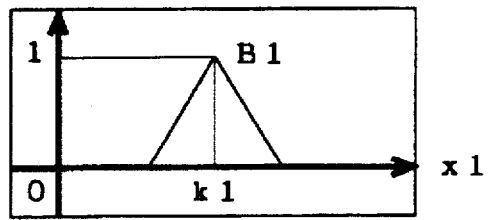
Figure 26A:
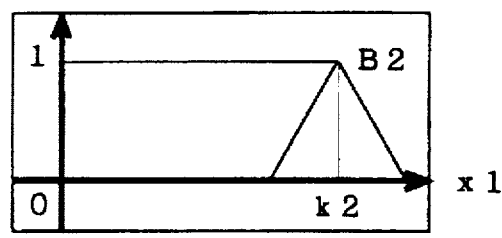
Figure 26B:
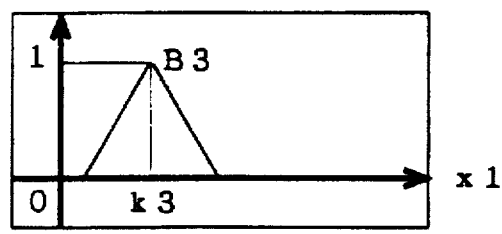
Figure 26C:
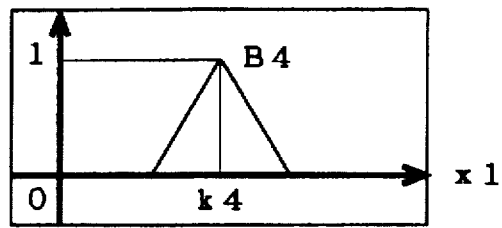
Figure 26D:
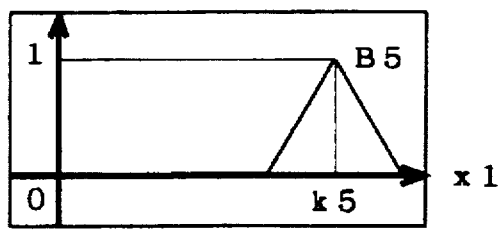
Figure 26E:
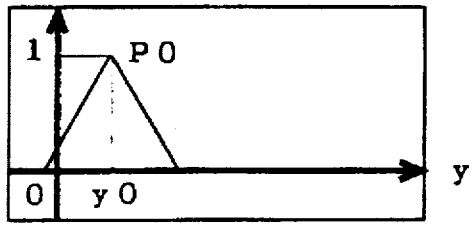
Figure 27A:
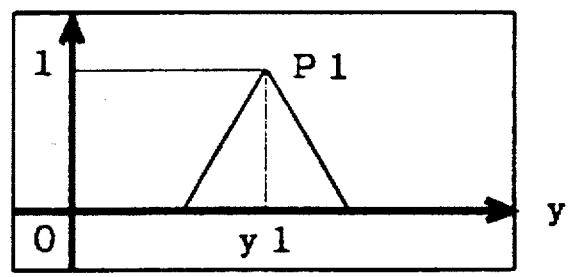
Figure 27B:
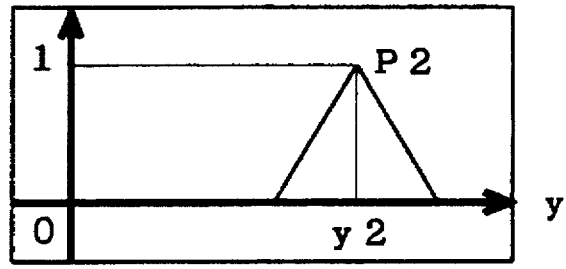

The function generator 48 generates the membership functions employed for the fuzzy rules which are completed (step ST43). FIGS. 25B to 25E, 26A to 26E and 27A to 27B show the eleven membership functions, A0 and A1, B0 to B5 and P0 to P2, respectively. The generation of these membership functions is carried out by copying the membership function created in the function creator 44 and then performing parallel displacement of the copied membership function in the direction of horizontal axis. The parallel displacement of the membership function is performed so that the center vertex of triangle should be in agreement with the abscissa of the input data value of the fixed point. For example, the abscissa of the vertex of the membership function A0 shown in FIG. 25B is "a0", and the abscissa of the vertex of the membership function B0 shown in FIG. 25D is "k0".

The rule modifier 49 modifies the membership functions so that the fuzzy inference result using the fuzzy rules should approximate to the expected value waveform. In the example discussed below, modification of the membership functions A0 and A1, B0 to B5 and P0 to P5 through simulation allows the relation between the input data and the inference result to approximate to the expected value waveform.

At first, the rule modifier 49 sets a tolerance of difference between the actual inference result and the expected value waveform (step ST44). The tolerance is stored as a threshold value in the threshold value register 53. At the same time, the fuzzy rules generated in the rule generator 47 and the membership functions generated in the function generator 48 are stored in the rule memory 50 and the function memory 51.

Then, the fuzzy inference is performed through a simulation (step St45). The fuzzy rules and the membership functions required for the simulation are provided by the rule memory 50, the function memory 51, and the input data required for the simulation are provided by the input data generator 5. The input data are also provided for the position detector 55. With the position detector 55, the membership functions to be modified are transmitted from the function memory 51 to the function modifier 56. For example, when the input data values x0=a0 and x1=k01 (k0≦k01≦k1) are provided, the inference results are expected to exist on a curve between β0 and β1 of FIG. 23A. The membership functions A0, B0, B1, P0 and P1 used for rule 0 and rule 1 in the fuzzy rules which are generated from β0 and β1 are to be modified (see FIGS. 25B, 25D, 25E, 26E and 27A).

Completing the simulation, the inference results are inputted to the absoluter 52. In the absoluter 52, the difference between the simulation result and the expected value waveform is computed. The comparator 54 checks if the difference lies within the tolerance. If the difference is out of the tolerance, the function modifier 56 modifies the membership functions A0, B0, B1, P0 and P1. The modified membership functions A0, B0, B1, P0 and P1 are stored in the function memory 51, and the position detector 55 rewrites the membership functions. In such a manner, automatic generation of fuzzy rules is carried out.

Thus, the fuzzy development-support device of the fifth preferred embodiment, which comprises the rule creator and the rule generator for cooperatively generating the fuzzy rules by using the input data and the inference results which are set in the input/output setting unit, the function creator, the function generator and the rule modifier for cooperatively generating and modifying the membership functions by using the expected value waveform, allows automatic generation of fuzzy rules by using the input data, the inference results and expected value waveforms, and thereby facilitates generation of fuzzy rules and reducing time for rule generation.

Figure 28A:
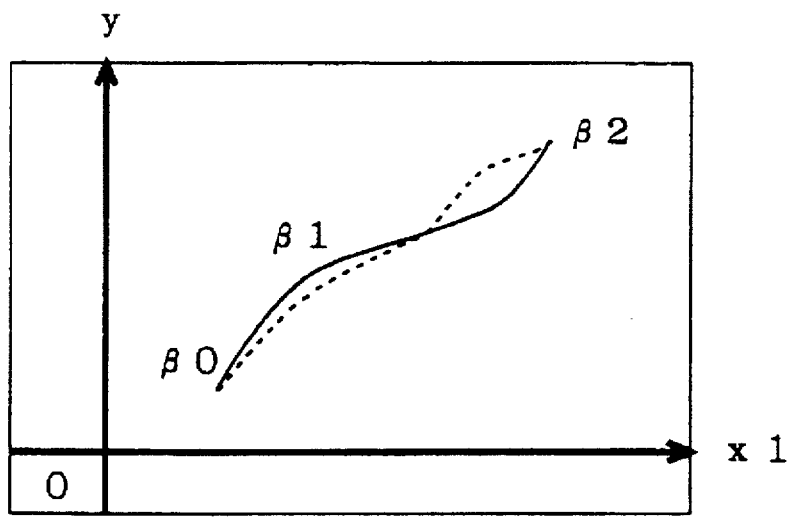
FIGS. 28A and 28B are graphs illustrating expected value waveforms and inference result waveforms in the fifth preferred embodiment of the present invention.
Figure 28B:
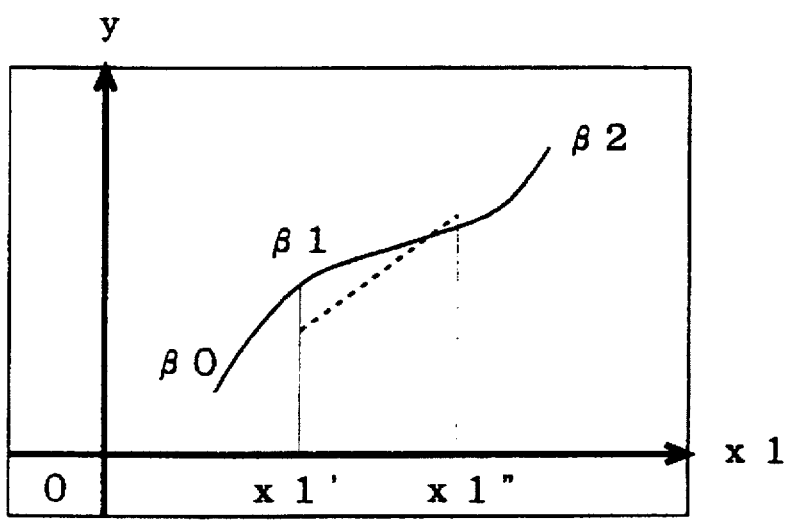

The expected value waveform can be used not only for automatic generation of fuzzy rules but also for verification of the inference results by providing the waveform storage in a result verification unit. In FIG. 28A, the expected value waveform in the waveform storage (indicated by solid line) and the inference results computed in the fuzzy-inference execution unit (indicated by dotted line) are displayed overlapping with each other. That can provide important information for tuning the fuzzy rules.

Figure 29:
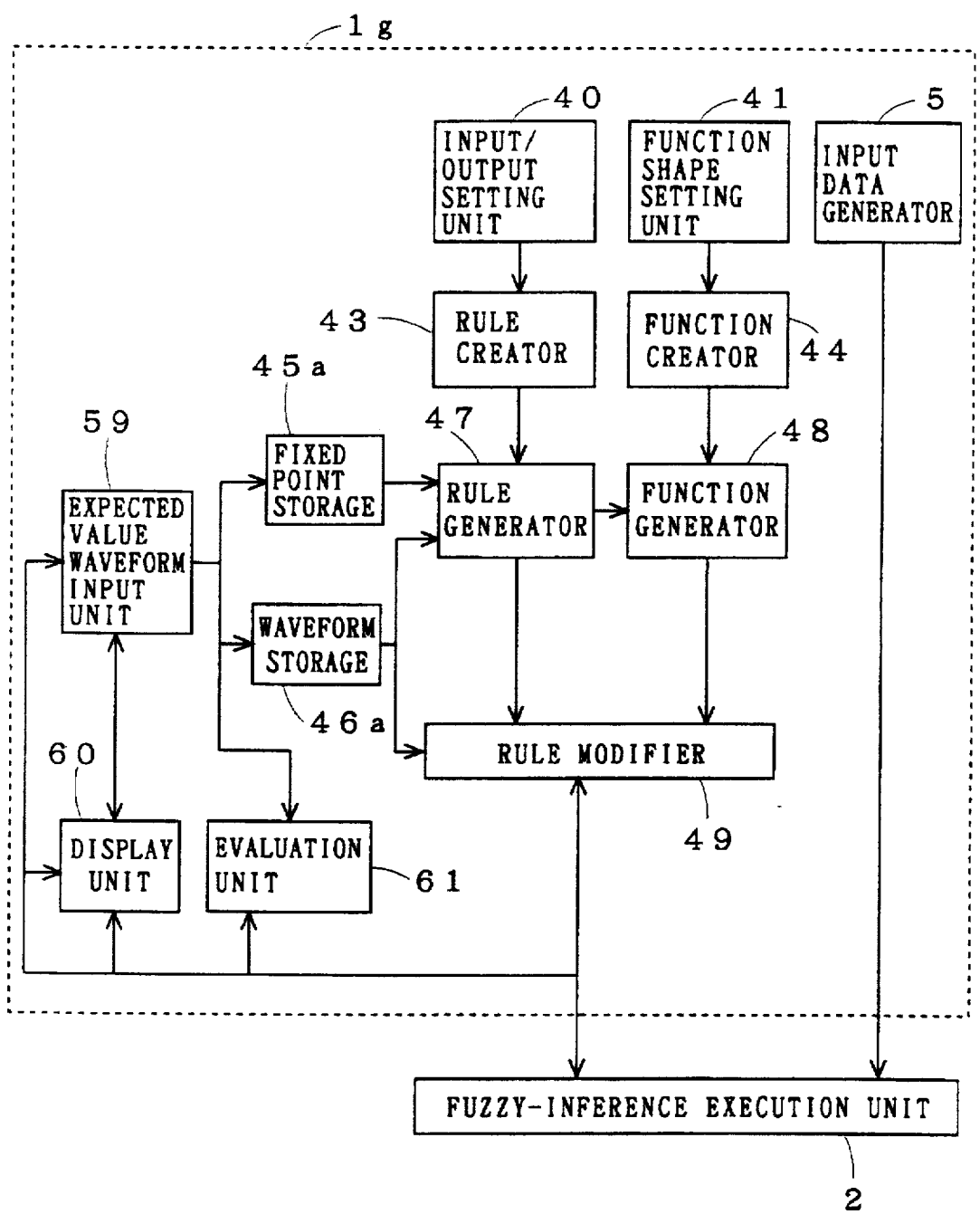
FIG. 29 is a block diagram showing a configuration of a fuzzy development-support device in accordance with a second aspect of the fifth preferred embodiment of the present invention.
Figure 30:
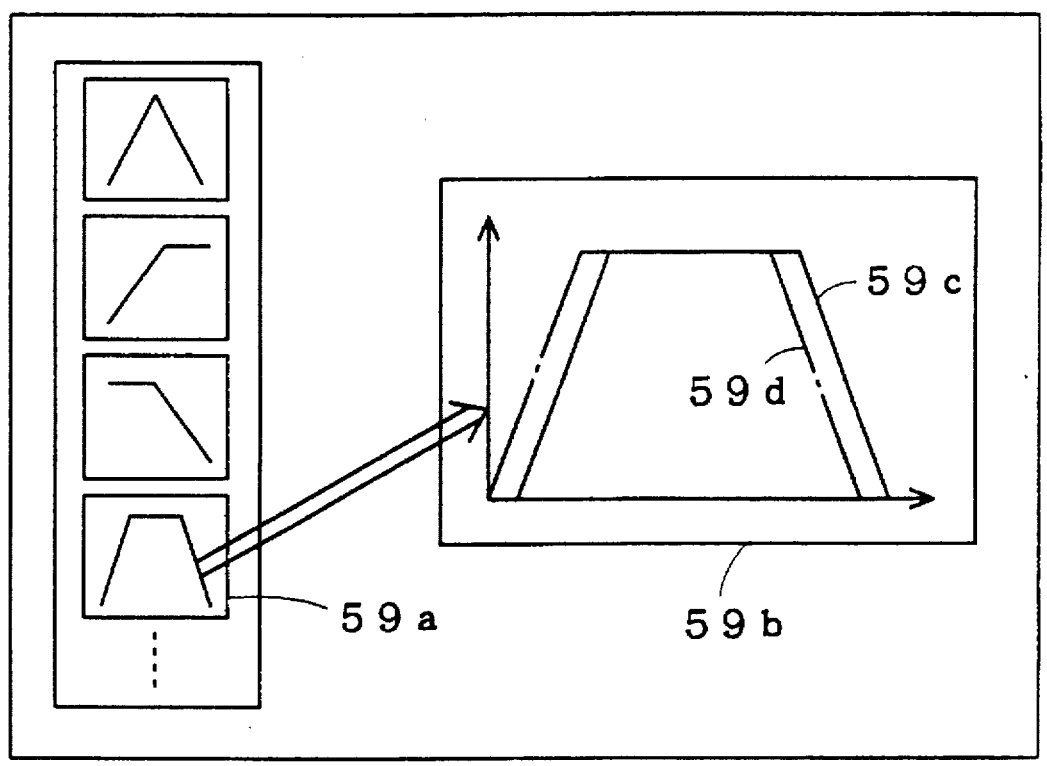
FIG. 30 is an elevation view showing a display screen of the display unit of FIG. 29.

FIG. 29 shows a configuration of a data input unit which allows the expected value waveform and the inference results to be displayed overlapping with each other. The data input unit of FIG. 29 comprises an expected value waveform input unit 59 for inputting an expected value waveform in the form of waveform, a display unit for displaying the expected value waveform received by the expected value waveform input unit 59 and an evaluation unit 61 for evaluating a difference between the expected value waveform and the inference results. FIG. 30 is an elevation view of a display of the display unit 60. It can be seen that there is a small difference between the expected value waveform 59c and the inference result waveform 59d displayed on a window 59b. If the expected value waveform has such a simple shape as is generally used, the expected value waveform 59c may be selected from the several specific function shapes which are vertically aligned on the side of the display. In this case, it is shown that a trapezoid 59a is selected.

In the fifth preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

Figure 31:
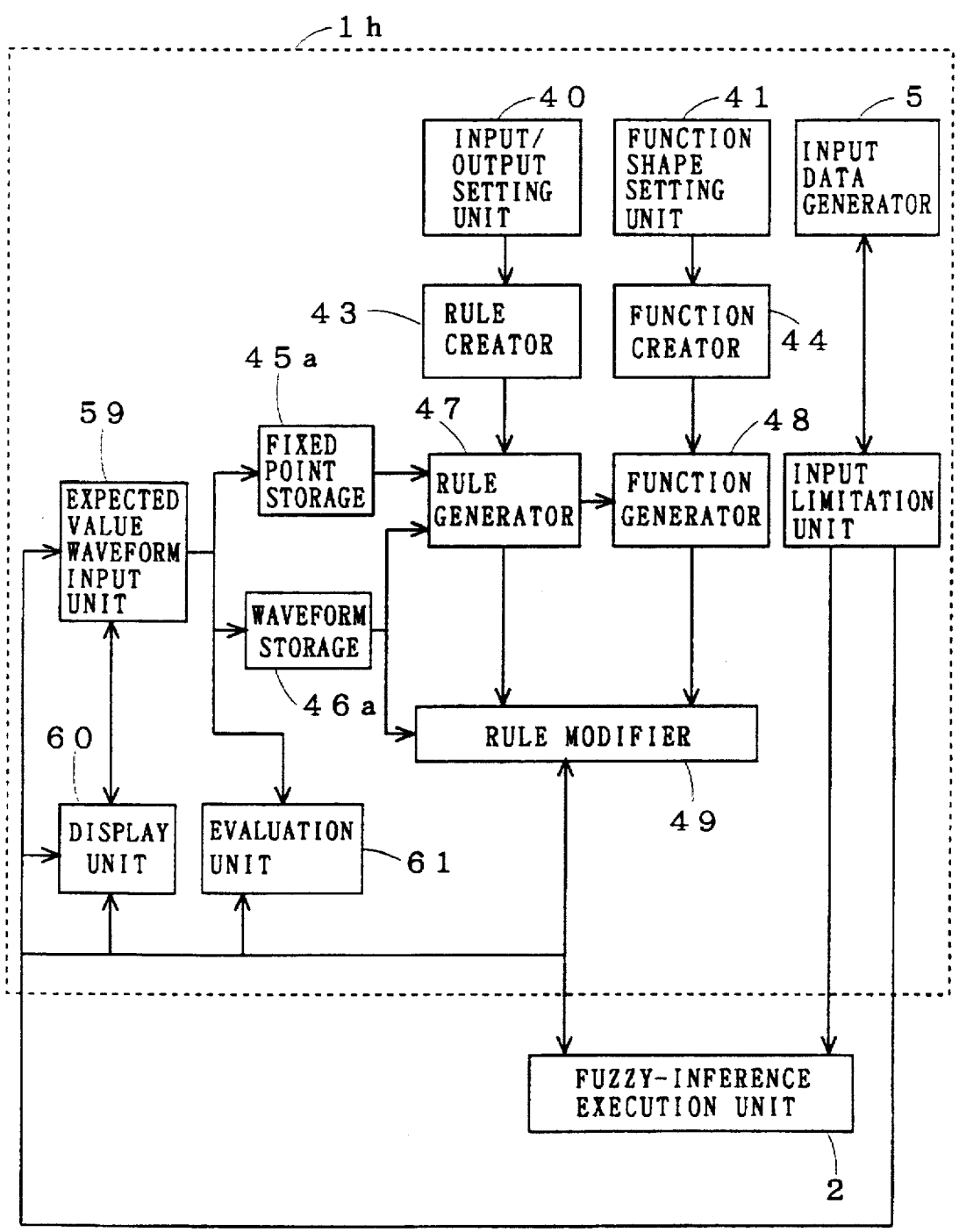
FIG. 31 is a block diagram showing a configuration of a fuzzy development-support device in accordance with a third aspect of the fifth preferred embodiment of the present invention.

In the above discussion, there has been discussed a case where the membership functions are modified with respect to all of the input data. In actuality, however, modification of membership functions may be carried out through a simulation using a part of the input data. In this case, automatic generation can be performed in shorter time compared as the above example. FIG. 31 shows a configuration of a data input 1h which allows a simulation using a part of the input data. The data input unit 1h of FIG. 31 further comprises an input limitation unit 62 for limiting the range of the input data outputted from the input data data generator 5. In FIG. 31, like reference numerals other than the above identical with those of FIG. 29 denote components identical with or corresponding to those of FIG. 29. Since the input limitation unit 62 limits the range of the input data for the simulation, it is possible to perform modification for the limited range of membership functions.

Figure 24:
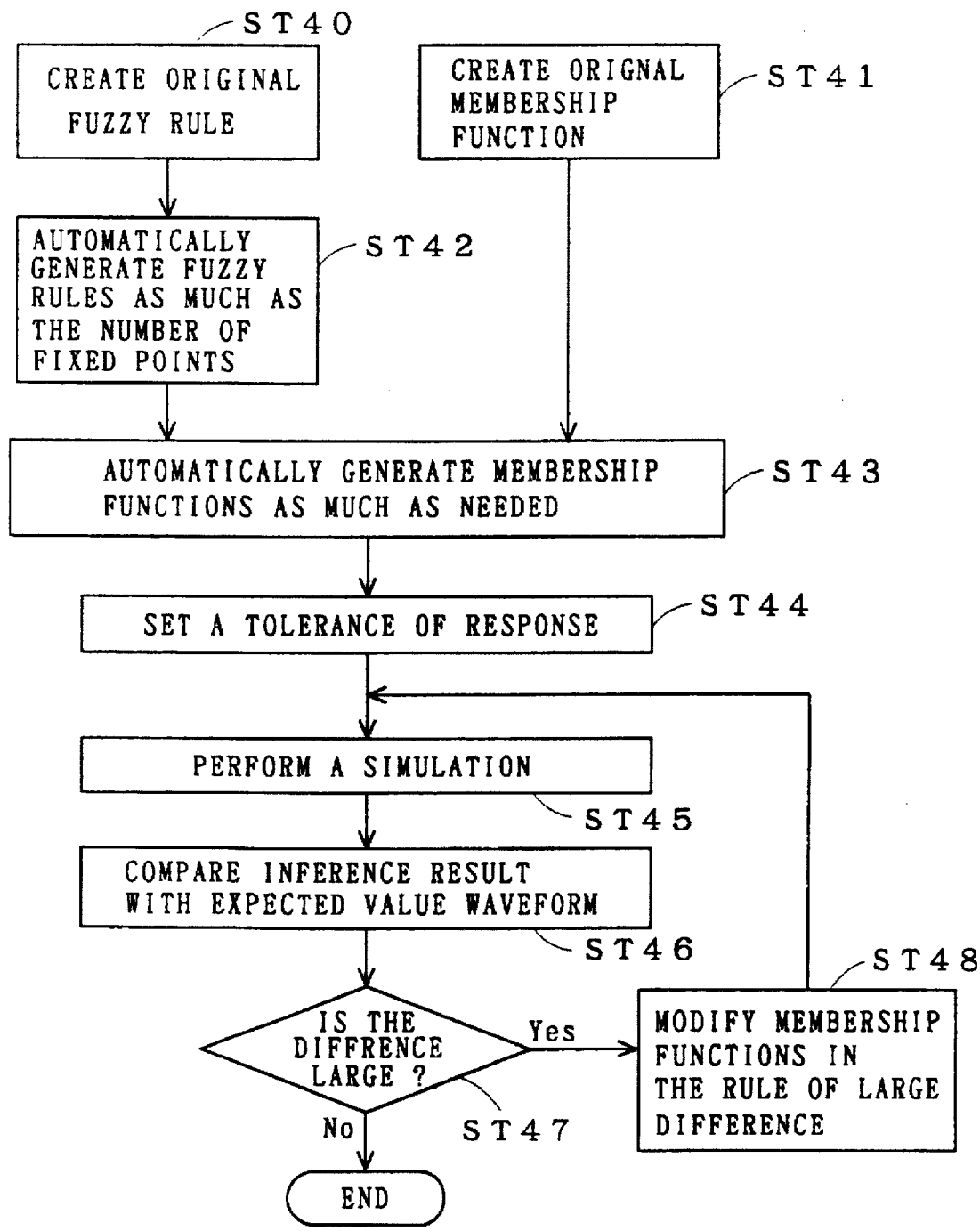
FIG. 24 is a flow chart showing an operation of the fuzzy development-support device of FIG. 21.
Figure 32:
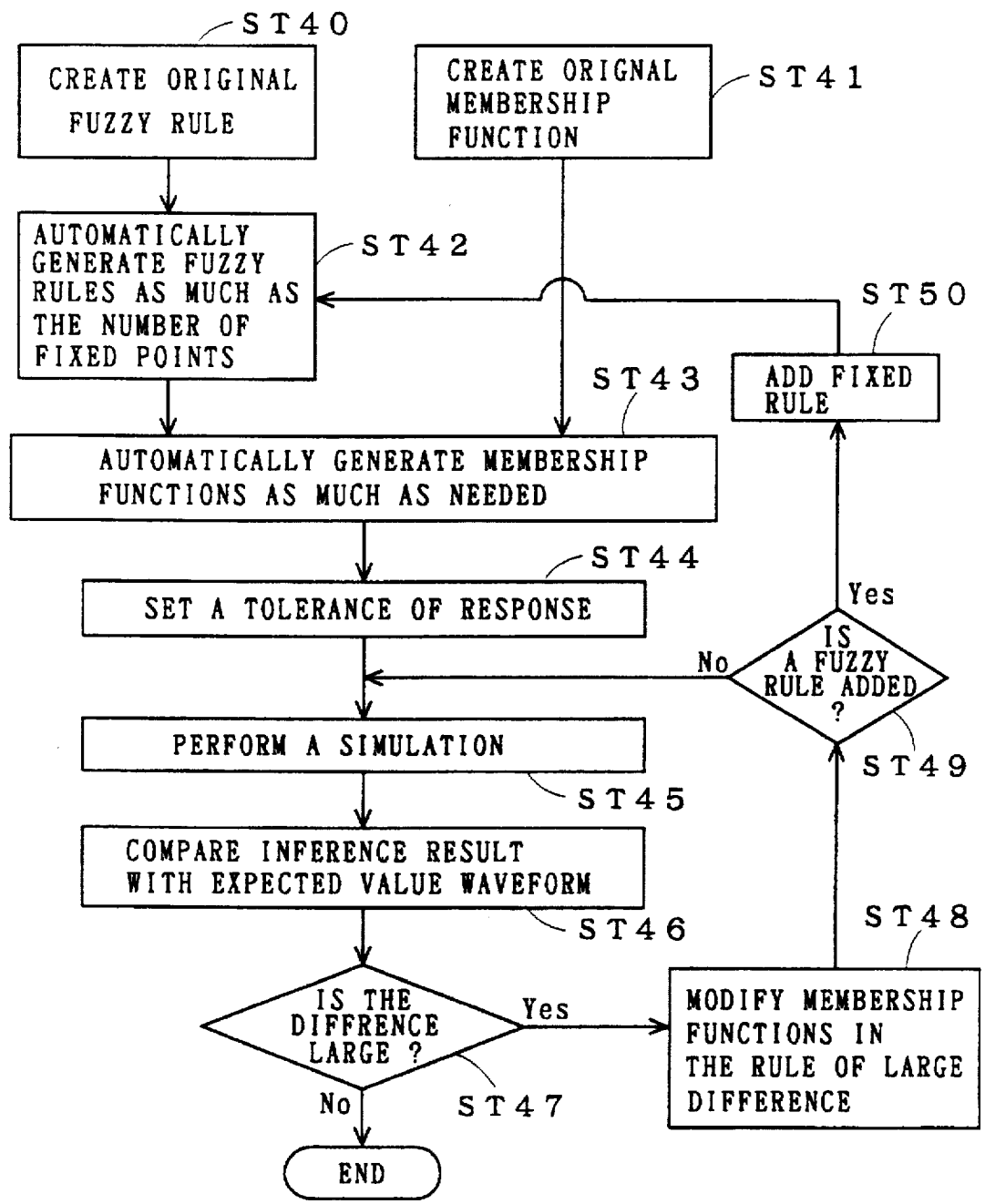
FIG. 32 is a flow chart showing an operation of the fuzzy development-support device of FIG. 31.

When a series of steps ST40 to ST48 of FIG. 24 is carried out continuously as discussed above in order to modify the fuzzy rules, there may be a case where the inference results are unlikely to approximate to the expected values due to an insufficient number of fuzzy rules. Then, addition of fixed points may be performed in additional steps ST49 and ST50 which are provided in course of the series of the steps, as shown in FIG. 32. According to a flow chart of FIG. 32, after modifying the membership functions for a rule which causes a wide difference between the expected value and the inference result, judgment as to whether fuzzy rules should be added or not is made in step ST49. When no fuzzy rule should be added, the simulation proceeds in a like manner of FIG. 24. When a fuzzy rule should be added, a fixed point is added in step ST50, followed by step ST42 where a rule is automatically generated as follows:

rule 0: if x0=A0 and x1=B0 then y=P0 rule 1: if x0=A0 and x1=B1 then y=P1 rule 2: if x0=A0 and x1=B2 then y=P2 rule 3: if x0=A1 and x1=B3 then y=P0 rule 4: if x0=A1 and x1=B4 then y=P1 rule 5: if x0=A1 and x1=B5 then y=P2 rule 6: if x0=A0 and x1=B6 then y=P3      (10)

Figure 33A:
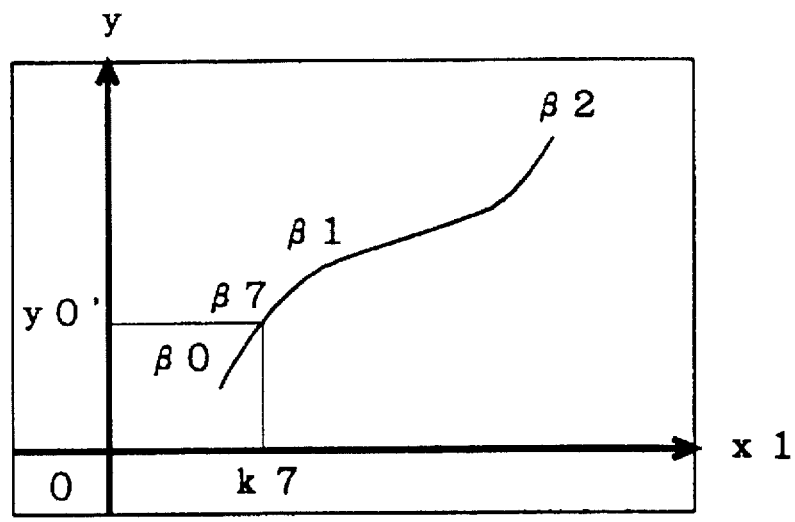
FIGS. 33A to 33C are graphs illustrating an adding operation of fixed points on the membership function generated in the fuzzy development-support device in accordance with the fifth preferred embodiment of the present invention.
Figure 33B:
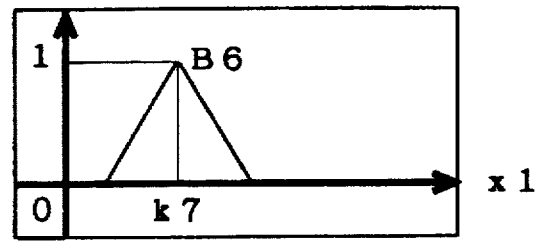
Figure 33C:
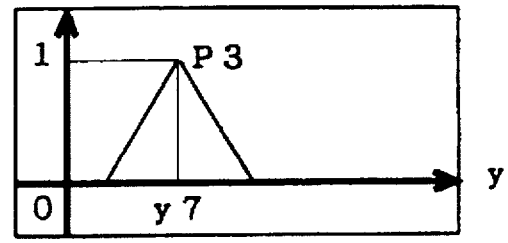

In this case, addition of the fixed point β7 as shown in FIG. 33A causes additional generation of fuzzy rule, rule 6, and the membership functions B6 and P3 as shown in FIGS. 33B and 33C, to modify functions.

Figure 34:
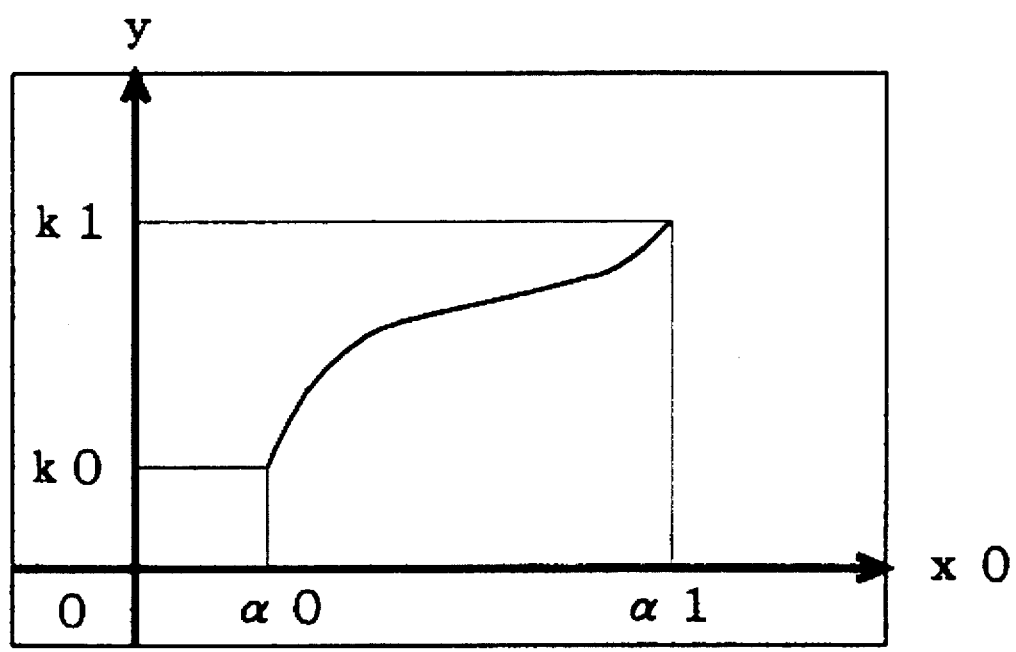
FIG. 34 is a graph of an expected value waveform used for the fifth preferred embodiment of the present invention.

Furthermore, in the above discussion, modification of functions is performed by using the expected value waveform representing x1-y (x0 is fixed). As shown in FIG. 34, however, an expected value waveform representing another combination of functions like x0-x1 may be used.

Figure 35:
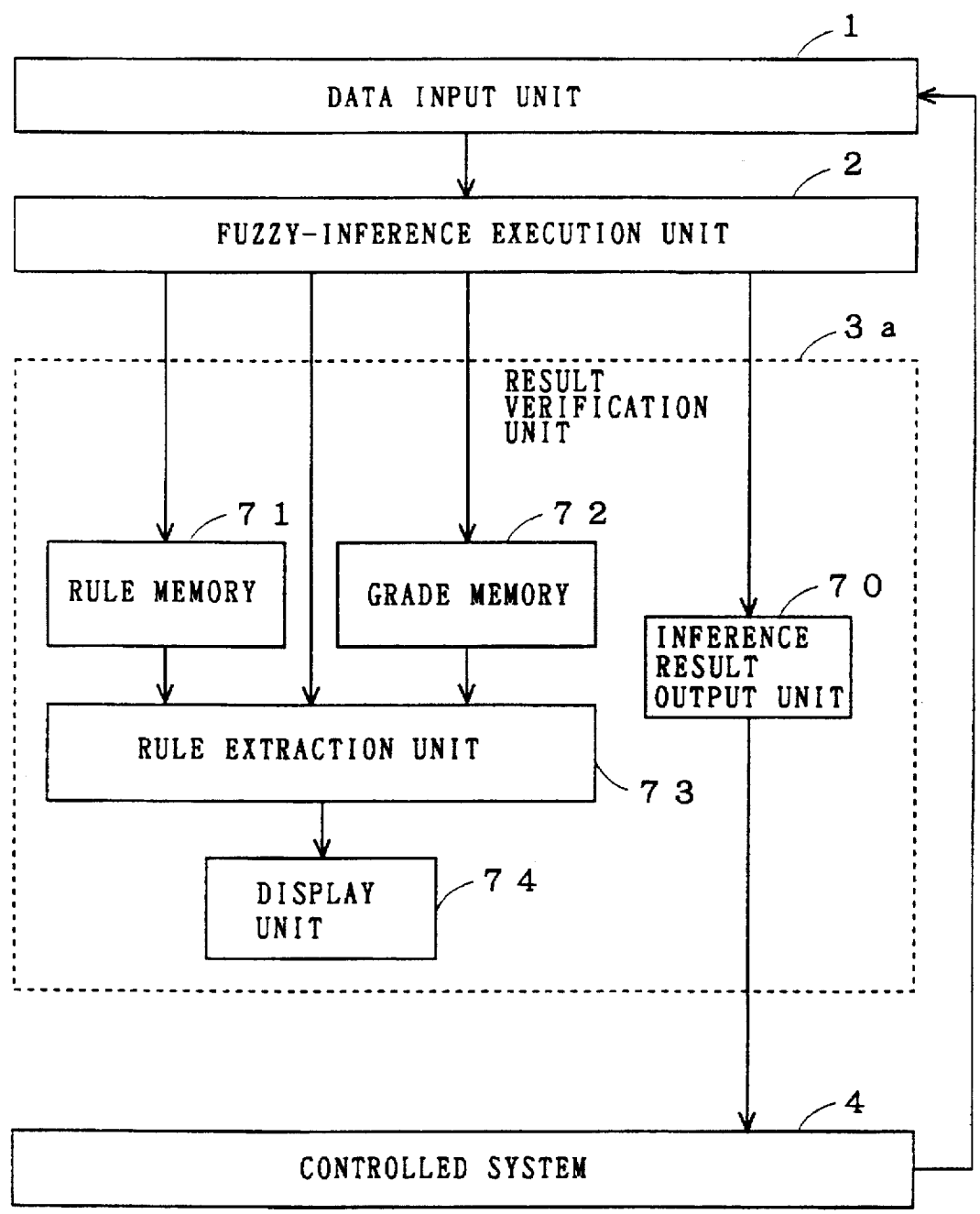
FIG. 35 is a block diagram showing a configuration of a fuzzy development-support device in accordance with a sixth preferred embodiment of the present invention.

The Sixth Preferred Embodiment:

A fuzzy development-support device in accordance with the sixth preferred embodiment of the present invention will be discussed. FIG. 35 is a block diagram showing a configuration of a part of the fuzzy development-support device of the sixth preferred embodiment. The fuzzy development-support device of FIG. 35 is characterized by a result verification unit 3a which combines a function of verifying the inference results and the function of the conventional output unit. The result verification unit 3a of FIG. 35 comprises a rule memory 71 for storing the fuzzy rules used for the fuzzy-inference execution, a grade memory 72 for storing grades generated in the course of fuzzy-inference execution, a rule extraction unit 73 for extracting fuzzy rules required for the inference based on a prescribed standard, a display unit 74 for displaying the extracted rules and an inference result output unit 70 for outputting the inference results of the fuzzy-inference execution unit 2 to the controlled system 4.

An operation of the result verification unit 3a will be discussed. The four fuzzy rules rule 0 to rule 3 as below are herein used in the fuzzy-inference execution:

rule 0: if x0=A0 and x1=B0 then y=P0:g0 rule 1: if x0=A1 and x1=B1 then y =P1:g1 rule 2: if x0=A2 and x1=B2 then y=P2:g2 rule 3: if x0=A3 and x1=B3 then y=P3:g3     (11)

Figure 36:
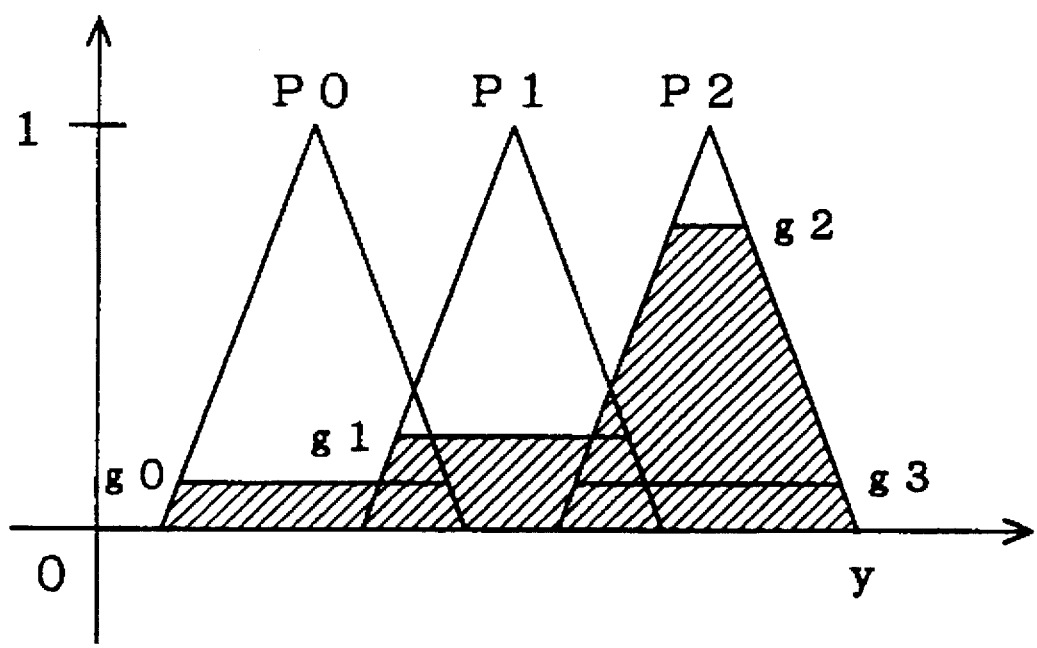
FIG. 36 is a graph of an output membership function generated in the fuzzy development-support device in accordance with the sixth preferred embodiment of the present invention.

Through the fuzzy-inference execution in the fuzzy-inference execution unit 2, the rule grades g0 to g3 are computed, and an output membership function are computed as shown in FIG. 36.

Through a centroid computation, output result G is obtained. At this time, the fuzzy rules and the rule grades below are stored in respective entries of the rule memory 71 and the grade memory 72. The inference result output unit 70 outputs the inference result G to the controlled system 4.

entry 0: if x0=A0 and x1=B0 then y=P0:g0 entry 1: if x0=A1 and x1=B1 then y=P1:g1 entry 2: if x0=A2 and x1=B2 then y=P2:g2 entry 3: if x0=A3 and x1=B3 then y=P2:g3     (12)

Next, an operation of the rule extraction unit 73 will be discussed. The rule extraction unit 73 checks consequent descriptions "y=P0", . . . of the fuzzy rules and rule grades g0 to g3 which are stored in the grade memory 72 and extracts a fuzzy rule having maximum rule grade value by consequent description. In the rules of Formula 12, the rule of the entry 0 with respect to the consequent description "y=P0" and the rule of the entry 1 with respect to the consequent description "y=P1" are extracted. With respect to the consequent description "y=P2", comparison between the grade g2 and the grade g3 is performed, and the rule of the entry 2 is extracted since the grade g2 is larger than the grade g3, as shown in FIG. 36. Accordingly, the extracted rules are as follows:

rule 0: if x0=A0 and x1=B0 then y=P0 rule 1: if x0=A1 and x1=B1 then y=P1 rule 2: if x0=A2 and x1=B2 then y=P2     (13)

Figure 37:
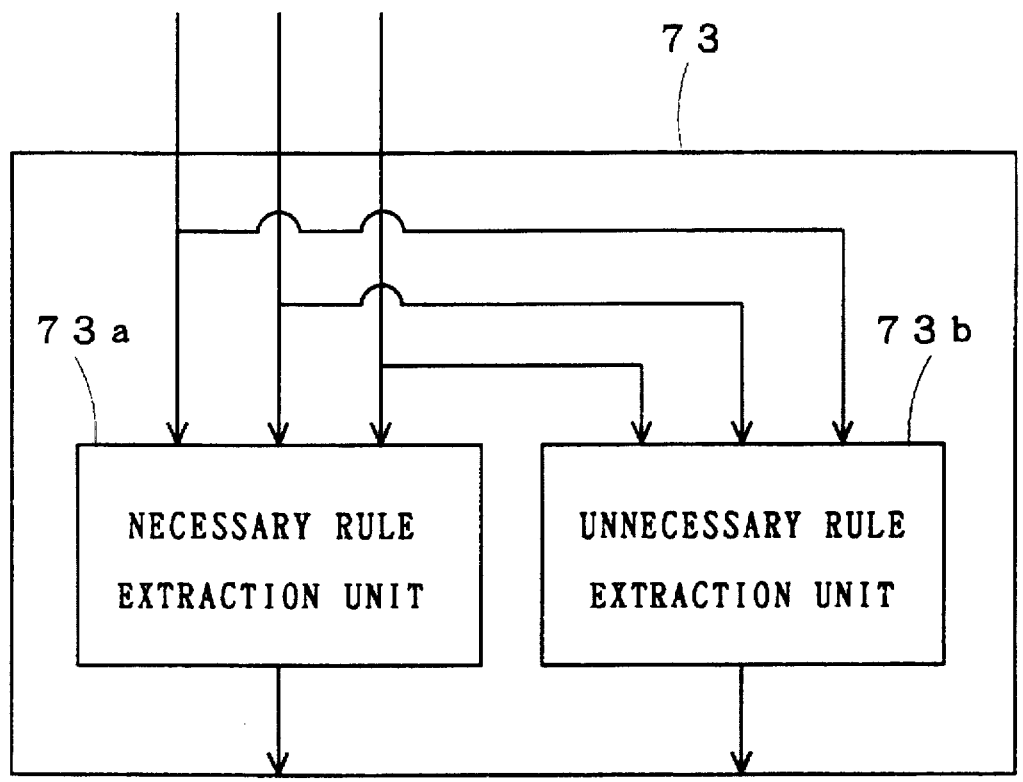
FIG. 37 is a block diagram showing an example of configuration of the rule extraction unit of FIG. 35.

The display unit 74 displays these rules. Thus, the fuzzy rules are separated into two groups of rules (rule sets), one rule set which is needed for computation of the inference result G serving as a control signal and the other rule set which is not needed. FIG. 37 shows an example of configuration of the rule extraction unit 73 for separating the rule sets. The rule extraction unit 73 of FIG. 37 includes a necessary rule extraction unit 73a for extracting necessary rules having the maximum grade among the same functions and an unnecessary rule extraction unit 73b for extracting other rules. Because of the close relation between the input data and the rule grades, them is few rules which are always unnecessary or always necessary. Therefore, storing the input data with respect to the grade of the fuzzy rule allows more detailed analysis.

Thus, the fuzzy development-support device of the sixth preferred embodiment extracts minimum rules by inference result, and therefore, clarifies the relation between the inference result and the fuzzy rules. That allows a study on the nature of individual rule, so that all of the rules may be classified into several groups of rules of common nature.

In the sixth preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

In the above discussion, extraction of minimum rules by checking the rule grades only has been discussed. In actuality, however, extraction of minimum input data by checking the grades of the input data (input data grades) in the antecedents of the rules together with the rule grades may be useful.

The display unit 74 may display the rule grades, the input grades and the output membership function as well as the rules.

Figure 38:
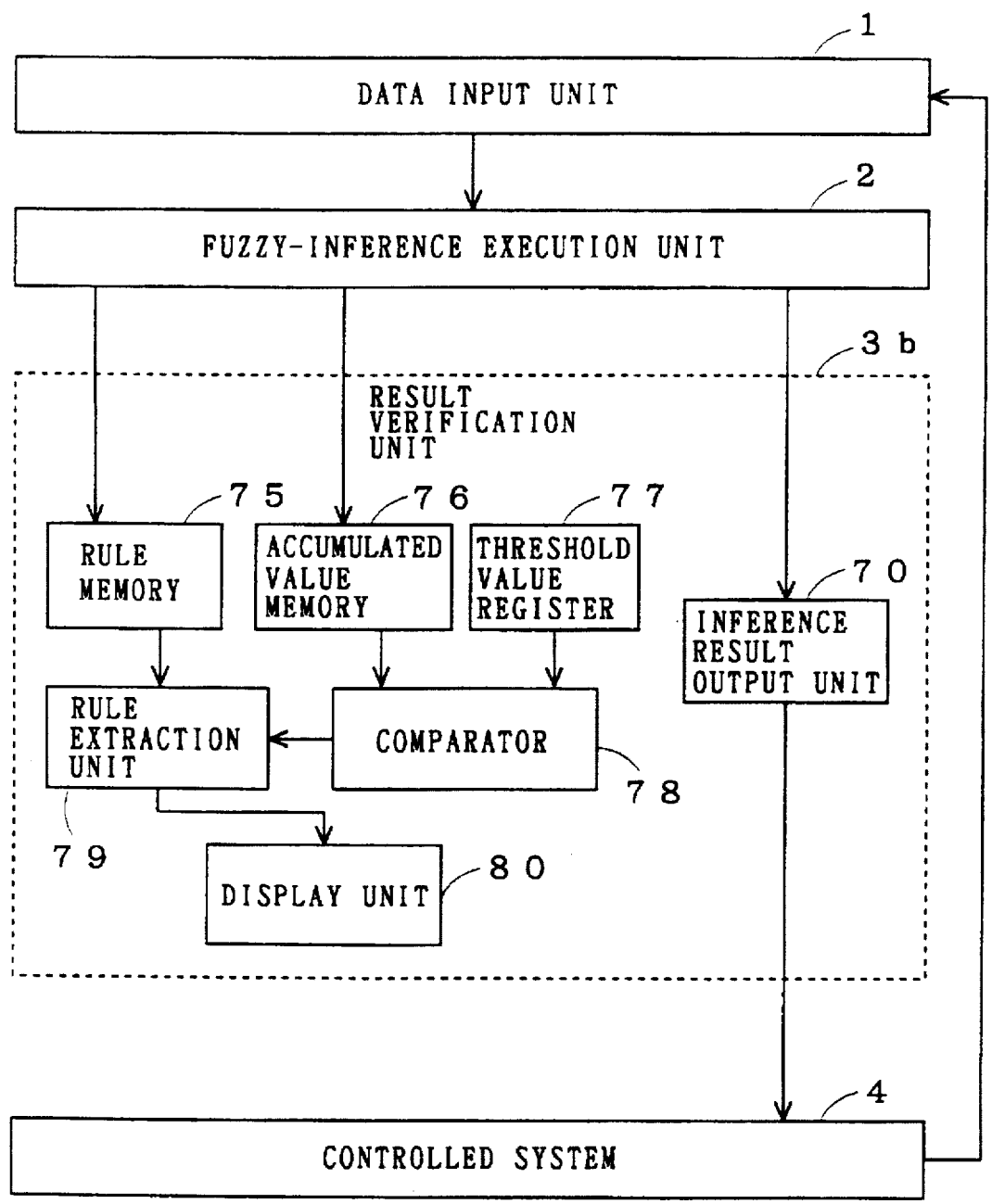
FIG. 38 is a block diagram showing a configuration of a fuzzy development-support device in accordance with a seventh preferred embodiment of the present invention.

The Seventh Preferred Embodiment:

A fuzzy development-support device in accordance with the seventh preferred embodiment of the present invention will be discussed. The fuzzy development-support device of the seventh preferred embodiment is characterized by a result verification unit 3b which combines a function of verifying the inference results and the function of the conventional output unit. FIG. 38 is a block diagram showing an internal configuration of the result verification unit 3b. The result verification unit 3b of FIG. 38 comprises a rule memory 75 for storing the fuzzy rules used for the fuzzy-inference execution, an accumulated value memory 76 for storing an accumulated value of grades, a threshold value register 77 for storing a threshold value, a comparator 78 for comparing an output from the acculated value memory 76 with an output from the threshold value register 77, a rule extraction unit 79 for extracting the fuzzy rule of which the accumulated value of the grades is smaller than the threshold value according to a comparison result of the comparator 78 and a display unit 80 for displaying the extracted rules and an inference result output unit 70 for outputting the inference results of the fuzzy-inference execution unit 2 to the controlled system 4 like the conventional output unit.

An operation of the result verification unit 3b will be discussed. The four fuzzy rules rule 0 to rule 3 as below are herein used in the fuzzy-inference execution:

rule 0: if x0=A0 and x1=B0 then y=P0:g0(k)

rule 1: if x0=A1 and x1=B1 then y=P1:g1(k)

rule 2: if x0=A2 and x1=B2 then y=P2:g2(k)

rule 3: if x0=A3 and x1=B3 then y=P3:g3(k)    (14)

where g0(k) to g3(k) represent rule grades obtained in the k-th fuzzy-inference execution.

The fuzzy rules and the accumulated values Σg0(k) to Σg3(k) of the rule grades g0(k) to g3(k) as below are stored in respective entries of the rule memory 75 and the accumulated value memory 76. The operator sets a specific threshold value.

entry 0: if x0=A0 and x1=B0 then y=P0: Σg0(k)

entry 1: if x0=A1 and x1=B1 then y=P1: Σg1(k)

entry 2: if x0=A2 and x1=B2 then y=P2: Σg2(k)

entry 3: if x0=A3 and x1=B3 then y=P2: Σg3(k)    (15)

Next, an operation of the rule extraction unit 79 will be discussed. The fuzzy rules rule 0 to rule 3 in the respective entries of the rule memory 75 are inputted to the rule extraction unit 79 and the accumulated values Σg0(k) to Σg3(k) in the respective entries of the accumulated value register 76 are inputted to the comparator 78. The comparator 78 compares the accumulated values Σg0(k) to Σg3(k) with the threshold value, respectively. When the accumulated value is smaller than the threshold value, the display unit 80 displays the fuzzy rule corresponding to the accumulated value. For example, the accumulated values Σg0(k) and Σg3(k) are smaller than the threshold value, the two rules below are displayed:

rule 0: if x0=A0 and x1=B0 then y=P0 rule 3: if x0=A3 and x1=B3 then y=P3    (16)

The rule extraction unit 79 allows extraction of rule having small grade through a plurality of fuzzy-inference executions.

Thus, the fuzzy development-support device of the seventh preferred embodiment can extract rules of low rule grade on completing a plurality of fuzzy-inference executions with the rule extraction unit 79, thereby ensuring extraction of rules of relatively low grade.

In the seventh preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

The rule grade, the input grade and the output membership function as well as the fuzzy rule may be displayed in the display unit.

Figure 39:
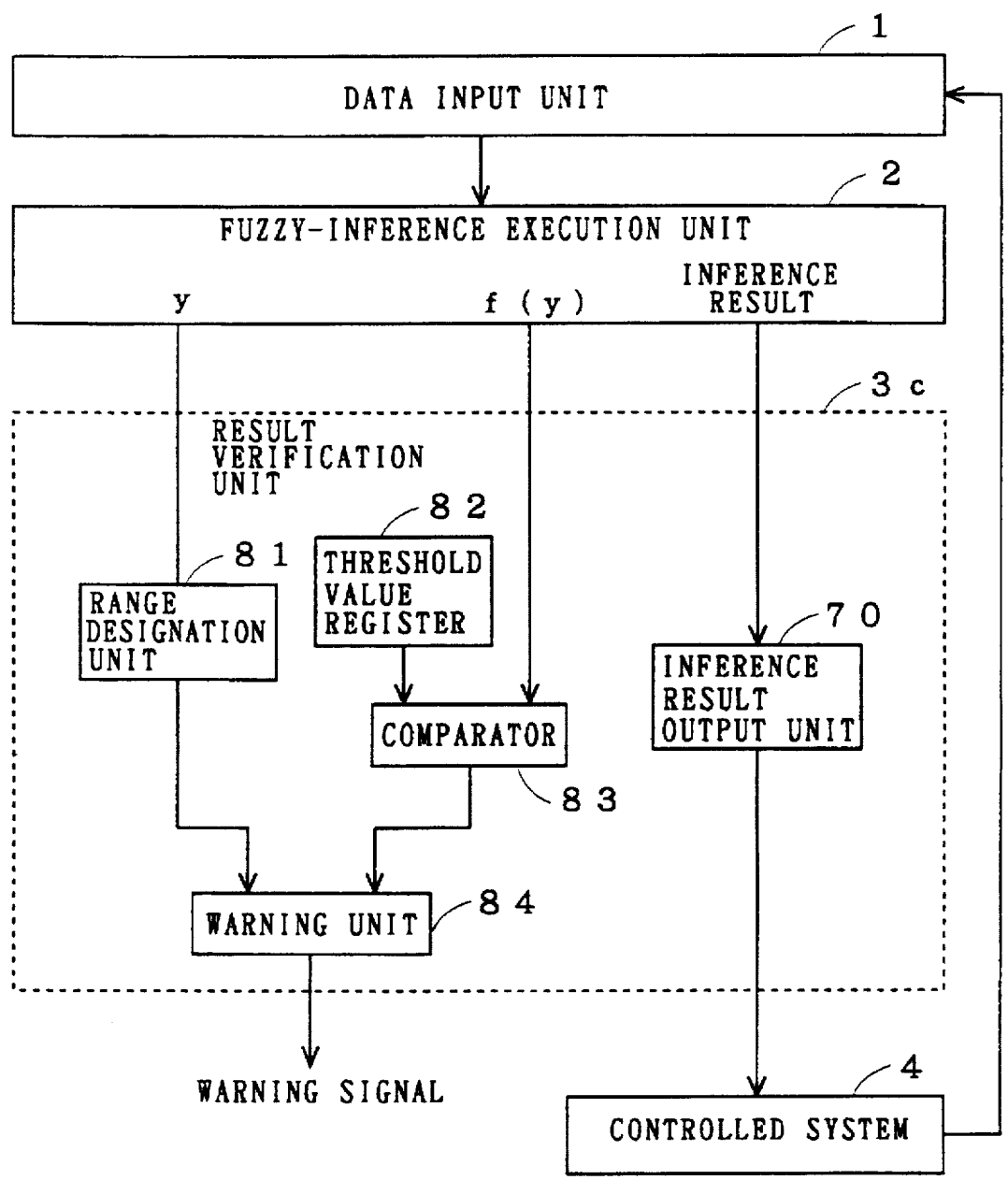
FIG. 39 is a block diagram showing a configuration of a fuzzy development-support device in accordance with an eighth preferred embodiment of the present invention.

The Eighth Preferred Embodiment:

A fuzzy development-support device in accordance with the eighth preferred embodiment of the present invention will be discussed. FIG. 39 is a block diagram showing an internal configuration of a result verification unit 3c of the eighth preferred embodiment. The result verification unit 3c of FIG. 39 comprises a range designation unit 81 for designating a range of inference results as variables of the output membership function, a threshold value register 82 for storing a threshold value of the grade of the output membership function, a comparator 83 for comparing the grade of the output membership function with the threshold value and a warning unit 84 for giving a warning signal. An inference result output unit 70 is the same as that of the sixth preferred embodiment.

Figure 40:
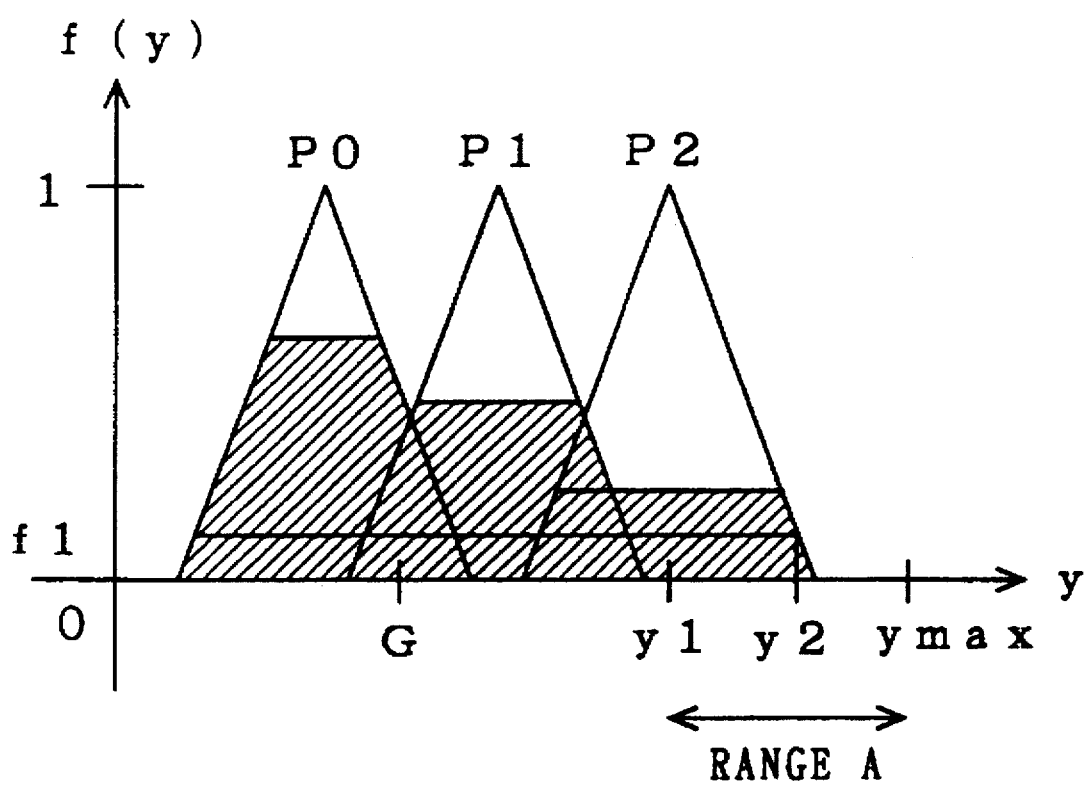
FIG. 40 is a graph of an output membership function generated the fuzzy development-support device in accordance with the eighth preferred embodiment of the present invention.

An operation of the result verification unit 3c will be discussed. The output membership function as shown in FIG. 40 is now computed. In FIG. 40, the shaded portion indicates the output membership function and y, f(y) and G represent the inference results, the grade of the output membership function and a centroid value, respectively.

Referring to FIG. 39, a threshold value f1 and a range A are designated, as shown in FIG. 40, by the threshold value register 82 and the range designation unit 81, respectively. In this case, y1 and ymax are both ends of the range A and y2 satisfies f(y2)=f1.

In the fuzzy execution unit 2, accumulations of Σf(y) and Σy·f(y) are carries out in sequence from y=0. The fuzzy execution unit 2 outputs y and f(y) under accumulation to the range designation unit 81 and the comparator 83, respectively.

The range designation unit 81 compares y with the range A, and if y≧y1, it outputs a detection signal. The comparator 83 compares f(y) with the threshold value f1, and if f1≧f(y), it outputs an agreement signal. When the detection signal and the agreement signal are applied simultaneously, the warning unit 84 gives a warning signal. In this case, when y1≦y≦y2, the warning signal arises and when y2≦y≦ymax, the warning signal goes out. Thus, the shape of the output membership function can be recognized from on/off of the warning signal.

Thus, the fuzzy development-support device of the eighth preferred embodiment ensures recognition of the shape of the output membership function by employing the warning signal, without any display device for displaying the output membership function, thereby achieving cost reduction in manufacturing the fuzzy development-support device.

In the eighth preferred embodiment, if-then rule has been discussed. As a fuzzy rule, however, any rule using membership functions may be used to produce the same effect. Furthermore, although the fuzzy inference by the minimum-maximum centroid method has been discussed, any inference method using membership functions may be used to produce the same effect.

Figure 41:
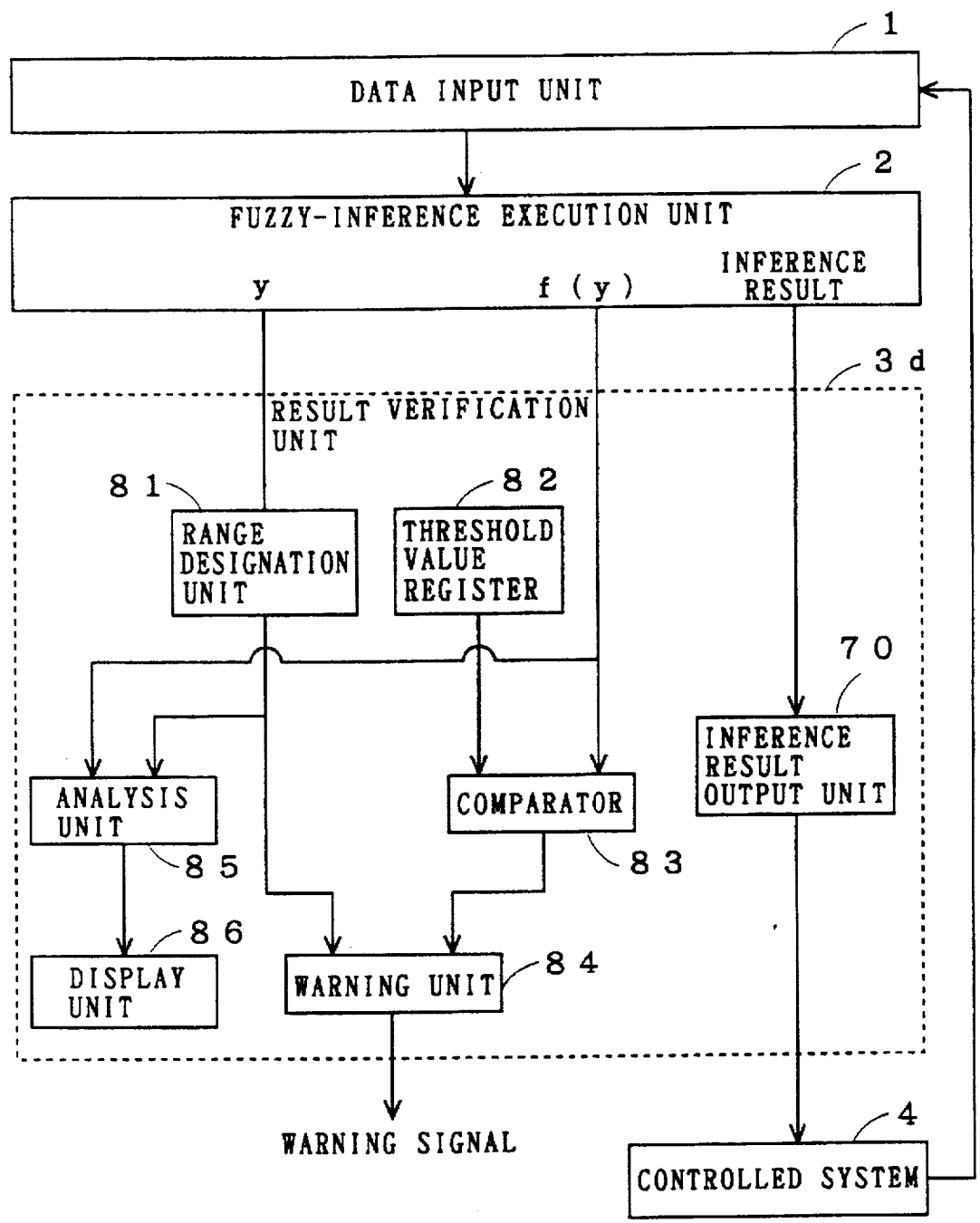
FIG. 41 is a block diagram showing a configuration of a fuzzy development-support device in accordance with a second aspect of the eighth preferred embodiment of the present invention.

There may be a configuration of a result verification unit 3d where an analysis unit 85 and a display unit 86 for displaying an analysis result are additionally provided, as shown in FIG. 41. The analysis unit 85 extracts the range A designated by the range designation unit 81, the inference result y and the grade f(y), and outputs numeric values thereof to the display unit 86 to be displayed thereon. This allows analysis of the cause of warning without stopping the system when the warning signal arises. As to the analysis mechanism, there may be a configuration, for example, where the configuration shown in either of the fifth to seventh preferred embodiments is provided in parallel, to display the output therefrom simultaneously. Such a combination of the preferred embodiments ensures more detailed analysis result.

Figure 42:
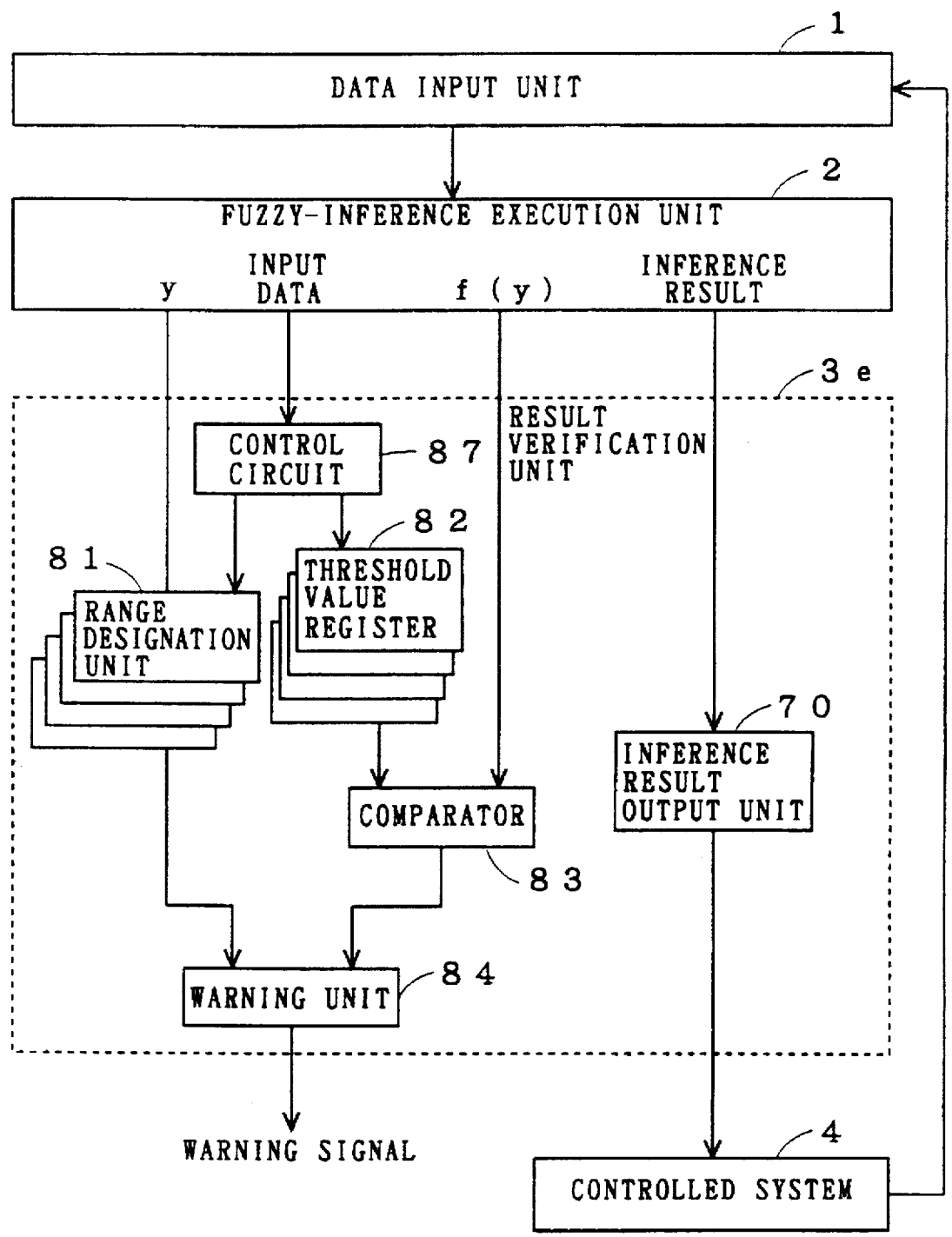
FIG. 42 is a block diagram showing a configuration of a fuzzy development-support device in accordance with a third aspect of the eighth preferred embodiment of the present invention.

There may be a configuration of a result verification unit 3e where a plurality of range designation units 81 and threshold value registers 82 and a control circuit 87 are provided, as shown in FIG. 42. In this configuration, the control circuit 87 selects one of the range designation units 81 and one of the threshold value registers 82 in response to the input data. Such a configuration ensures recognition of the shape of the output membership function in still more detailed manner.

Figure 43:
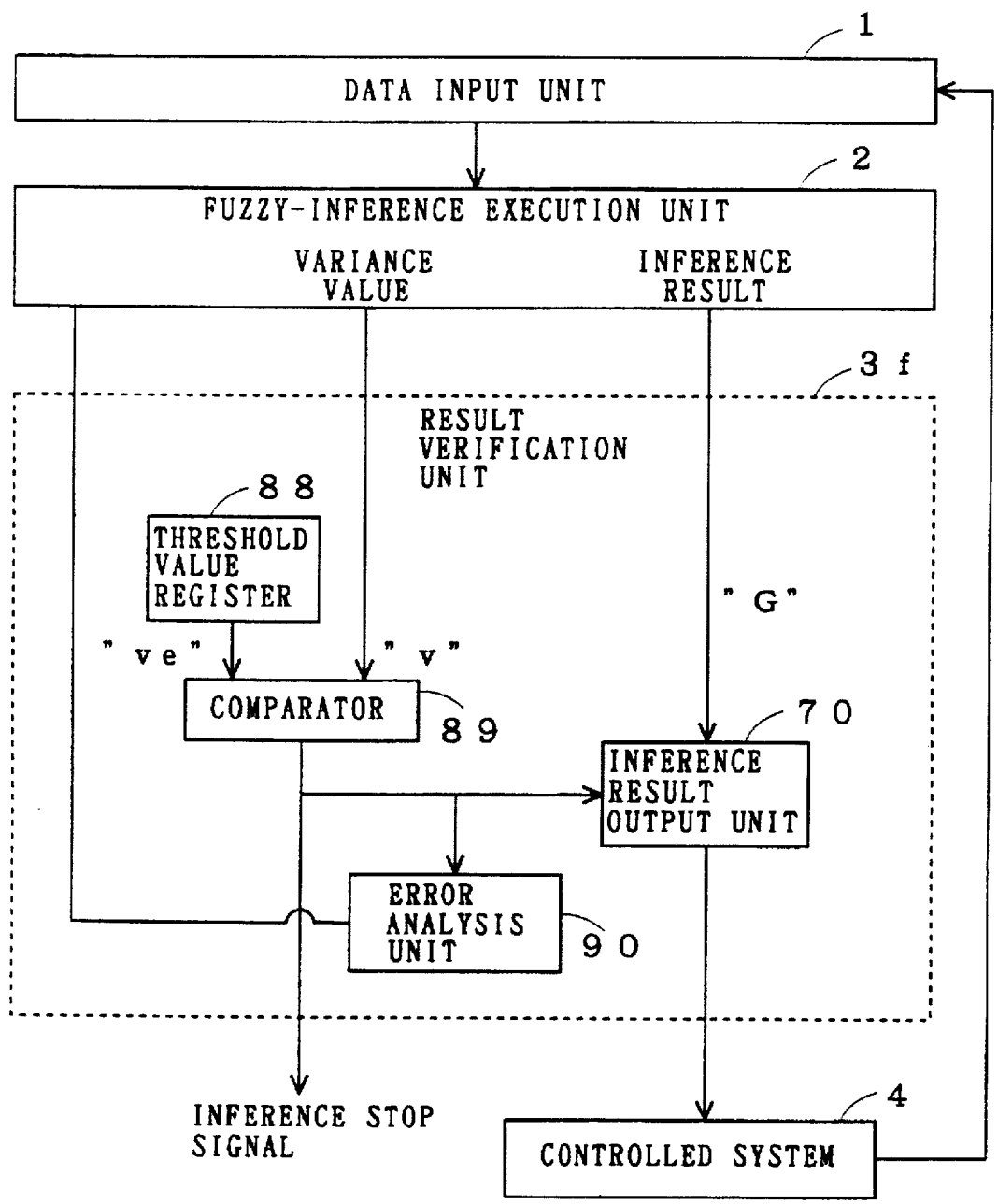
FIG. 43 is a block diagram showing a configuration of a fuzzy development-support device in accordance with a ninth preferred embodiment of the present invention.

The Ninth Preferred Embodiment:

A fuzzy development-support device in accordance with the ninth preferred embodiment of the present invention will be discussed. FIG. 43 is a block diagram showing an result verification unit 3f of the ninth preferred embodiment. The result verification unit 3f of FIG. 43 comprises a threshold value register 88 for making a judgement as to a variance error, a comparator 89 for comparing a threshold value computed in the fuzzy-inference execution unit 2 with the threshold value to output an inference stop signal depending on the comparison result to the inference result output unit 70 and an error analysis unit 90 for performing an analysis of the variance error.

An operation of the result verification unit 3f will be discussed. A threshold value ve for judgment as to the variance error is stored in the threshold register 88. The fuzzy-inference execution unit 2 computes a centroid value G and a variance v as inference result. The centroid value G is outputted through the inference result output unit 70 as inference result. The threshold value ve and the variance v are outputted to the comparator 89.

The comparator 89 compares the threshold value ve with the variance v. The comparison result of ve<v indicates detection of variance error, and then the comparator 89 outputs the inference stop signal to the inference result output unit 70 to stop the fuzzy-inference execution.

Figure 44:
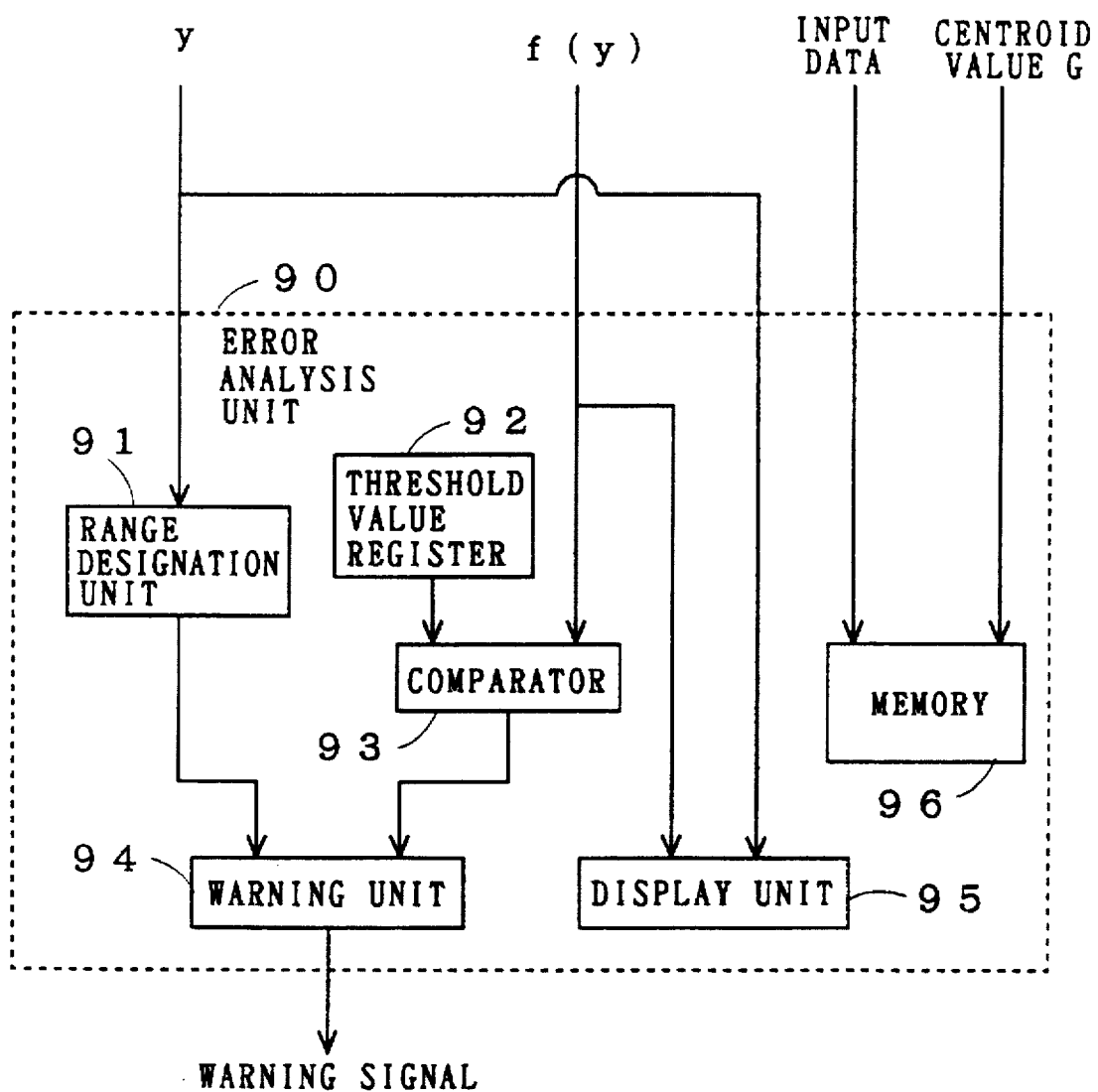
FIG. 44 is a block diagram showing an example of configuration of the error analysis unit of FIG. 43.
Figure 45:
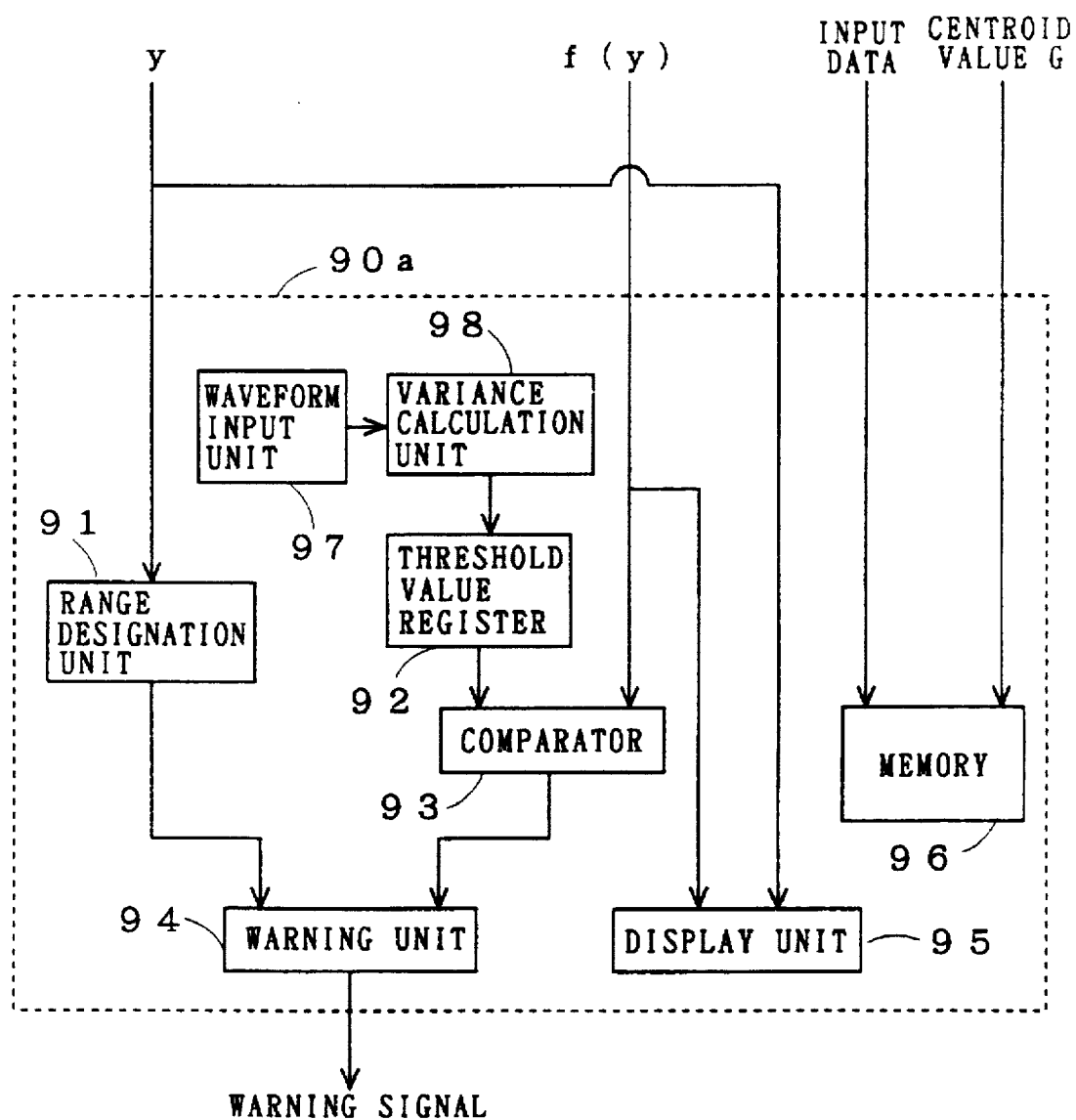
FIG. 45 is a block diagram showing another example of configuration of the error analysis unit of FIG. 43.

When the inference stop signal is outputted, the error analysis unit 90 is set in motion to analyze the variance error. FIG. 44 shows a configuration of the error analysis unit 913. The error analysis unit 90 of FIG. 44 includes a range designation unit 91, a threshold value register 92, a comparator 93 and a warning unit 94 all of which are the same as those of the eighth preferred embodiment. The error analysis unit 90 further includes a display unit 95 for displaying the output membership function and a memory 96 for storing the input data and the centroid value.

Figure 46:
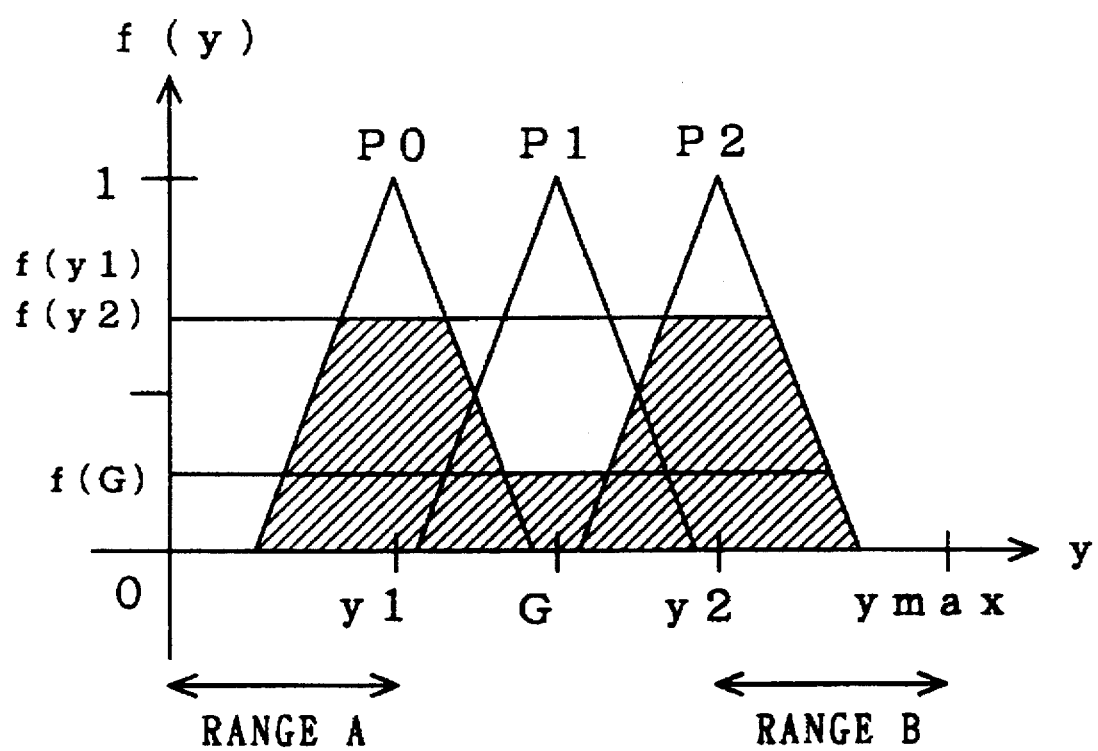
FIG. 46 is a graph of an output membership function showing an operation of the fuzzy development-support device of FIG. 43.

The error analysis unit 90 operates in three modes to analyze the variance error. The operations in three modes will be discussed referring to FIG. 46. In FIG. 46, y, f(y) and G represent the inference result, the grade of the output membership function and the centroid value, respectively. Such a shape of the output membership function of FIG. 46 show that the grade f(G) (when y=G) is relatively low and both of the grades f(y1) (when y=y1) and f(y2) (when y=y2) are higher than the grade f(G). This is a typical shape of the output membership function where variance error is likely to be detected.

In the first operation mode of the error analysis unit 90, analysis is performed by checking the grade value f(y). The operation starts with designation of a range A which includes the minimum value of y and a range B which includes the maximum value of y, as shown in FIG. 46. With respect to each of the ranges A and B, judgment is made as to whether there is any grade higher than a threshold value f1 stored in the threshold register 92. Thus, error analysis is carried out. For this operation, the range designation unit 91, the threshold value register 92, the comparator 93 and the warning unit 94 of FIG. 44 are employed. The operation of the above hardware is almost the same as that of the result verification unit 3d of the eighth preferred embodiment, and the description thereof will be omitted.

In the second operation mode, the output membership function is displayed, employing the display unit 95. The fuzzy-inference execution unit 2 outputs the output membership function to the display unit 95 during the fuzzy-inference execution. When the display unit 95 displays the output membership function when an inference end signal is given.

In the third operation mode, the input data and the centroid value are stored when the variance error occurs, employing the memory 96. The memory 96 always receives the input data and the centroid value during the fuzzy-inference execution, and writes them therein when the inference end signal is given. The input data and the centroid value stored in the memory 96 are provided outside, and error analysis is thereby performed.

By the above three operation modes, reliability verification of the inference result using variance values and variance error analysis are performed.

Thus, the fuzzy development-support device of the ninth preferred embodiment comprises an error analysis unit for analyzing the cause of variance error, thereby facilitating the variance error analysis.

In the ninth preferred embodiment, if-then rule has been discussed. As a fuzzy rule, however, any rule using membership functions may be used to produce the same effect.

In the above discussion, the fuzzy-inference execution is stopped by the inference stop signal when the variance error occurs. Without stopping fuzzy-inference execution, however, only a halt or a reset of the inference result output unit is useful so as not to supply the controlled system with the output result.

For the purpose of inputting the threshold value to the threshold value register 92, there may be a configuration of an error analysis unit 90a where a waveform input unit 97 for inputting the expected value waveform and a variance calculation unit 98 for calculating the variance values of the expected value waveform, thereby alleviating efforts for inputting the threshold value.

Figure 47:
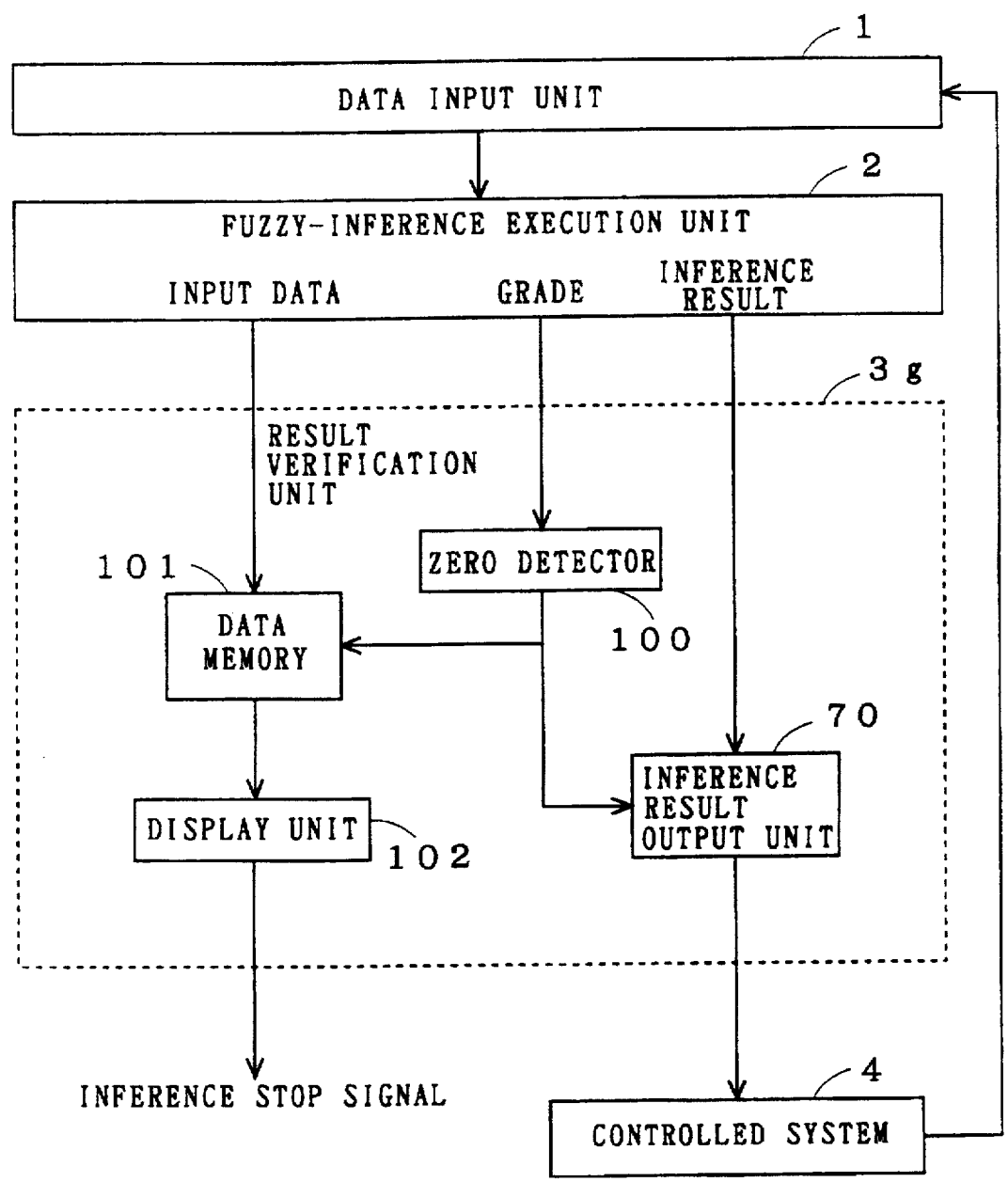
FIG. 47 is a block diagram showing a configuration of a fuzzy development-support device in accordance with a tenth preferred embodiment of the present invention.

The Tenth Preferred Embodiment:

A fuzzy development-support device in accordance with the tenth preferred embodiment of the present invention will be discussed. FIG. 47 is a block diagram showing an result verification unit 3g of the tenth preferred embodiment. The fuzzy development-support device of the tenth preferred embodiment is characterized by the result verification unit 3g which combines a function of verifying the inference results and the function of the conventional output unit. The result verification unit 3g of FIG. 47 comprises a zero detector 100 for detecting that the consequent membership function obtained in the fuzzy-inference execution is zero, a data memory 101 for storing the input data and a display unit 102 for displaying the input data stored in the data memory 101. An inference result output unit 70 is the same as that of the result verification unit 3a of the sixth preferred embodiment.

Figure 48A:
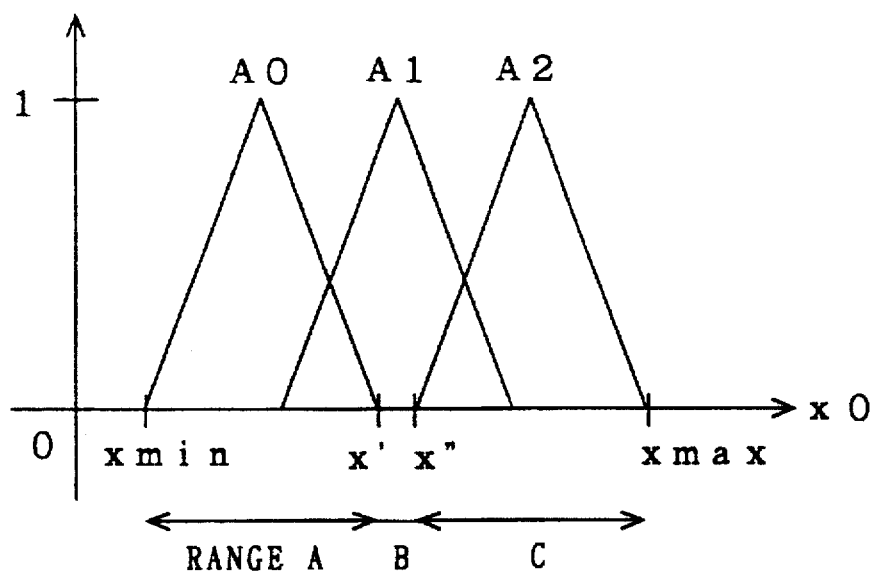
FIGS. 48A and 48B are graphs of output membership functions showing an operation of the fuzzy development-support device of FIG. 47.

An operation of the result verification unit 3g will be discussed. The discussion will be made herein using fuzzy rules of two inputs and one output as below:

rule 0: if x0=A0 and x1=B0 then y=P0 rule 1: if x0=A0 and x1=B1 then y=P1 rule 2: if x0=A2 and x1=B3 then y=P2       (17)

where x represents input data, y represents inference result, rule 0 to rule 2 represent fuzzy rules and A0, A1, A2, B0, B1, B3, P0, P1 and P2 represent membership functions. As shown in FIG. 48A, xmin, x', x" and xmax are values on the x-axis. In the rule 1 , there is a description error of x=A0, instead of x=A1.

In a fuzzy-inference execution, the zero detector 100 receives the grade f(y) of the consequent membership function. When the computed grade f(y) of the consequent membership function is zero, the zero detector 100 outputs a zero detection signal to the data memory 101. At this time, the data memory 101 writes therein the input data used for the fuzzy-inference execution. The input data written in the data memory 101 are outputted to the display unit 102, being displayed.

Figure 48B:
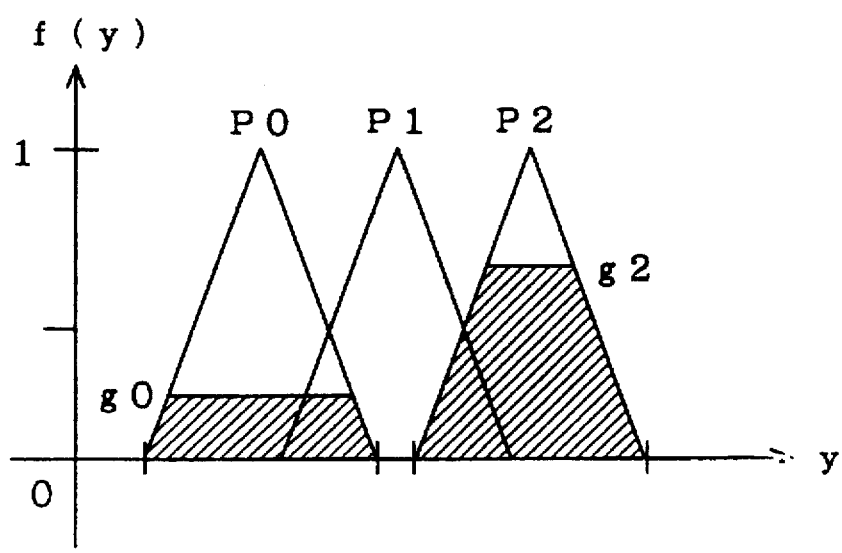
Figure 49:
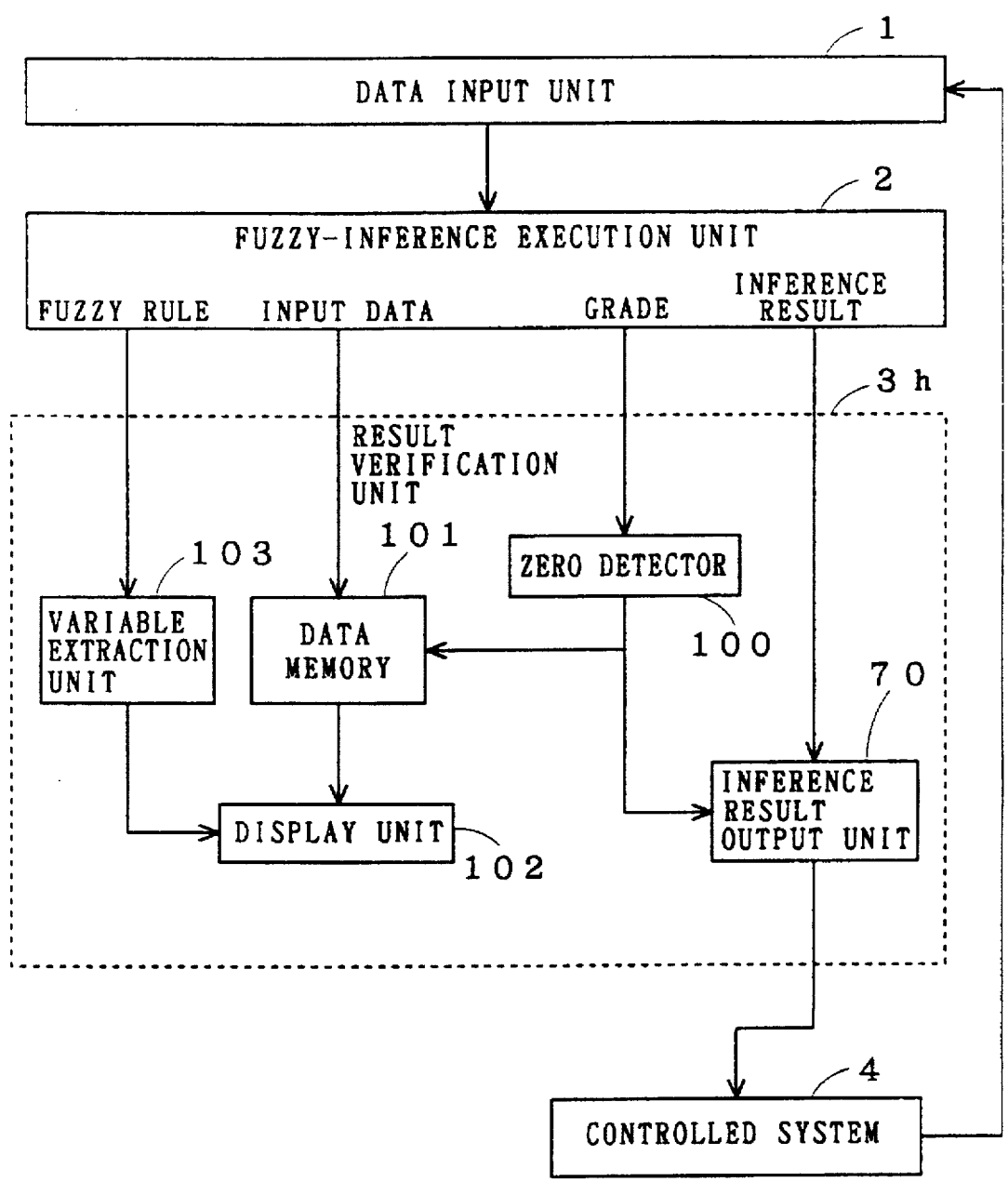
FIG. 49 is a block diagram showing a configuration of a fuzzy development-support device in accordance with another aspect of the tenth preferred embodiment of the present invention.

In the fuzzy rules, the grade f(y) is zero in the three ranges as shown in FIG. 48A, and accordingly, it is found that the input data displayed on the display unit 102 are included in either of the ranges A, B and C. For example, FIG. 48B shows the consequent membership functions of Formula 17. Then, the operator confirms that the input data included in the range Y of Formula 18 are displayed, the description error of the rule 1 of Formula 17 can be found.

range X: $x \leq xmin$ range Y: $x' \leq x \leq x''$ range Z: $xmax \leq x$ (18)

Thus, the fuzzy development-support device of the tenth preferred embodiment detects the input data which causes the consequent membership function of which the grade f(y) is zero as the result of the inference by employing the zero detector 100, and checks the detected input data, thereby revealing description errors of the rules.

In the tenth preferred embodiment, if-then rule has been discussed. As a fuzzy rule, however same le using membership functions may be used to produce the same effect.

Still, the membership functions may have any shape as well as triangle.

In the above discussion, the input data which causes consequent membership function of which the grade is zero are detected in the zero detector 100. The reference value of the grade may be other than zero. For example, detection of the input data which causes consequent membership function of which the grade is 0.2 or less can produce the same effect.

There may be a configuration of a result verification unit 3h where a variable extraction unit 103 for extracting variables of the fuzzy rules. Extraction of variables of the fuzzy rules as shown in FIG. 48A and displaying them will facilitate detection of description error of rules.

Figure 50:
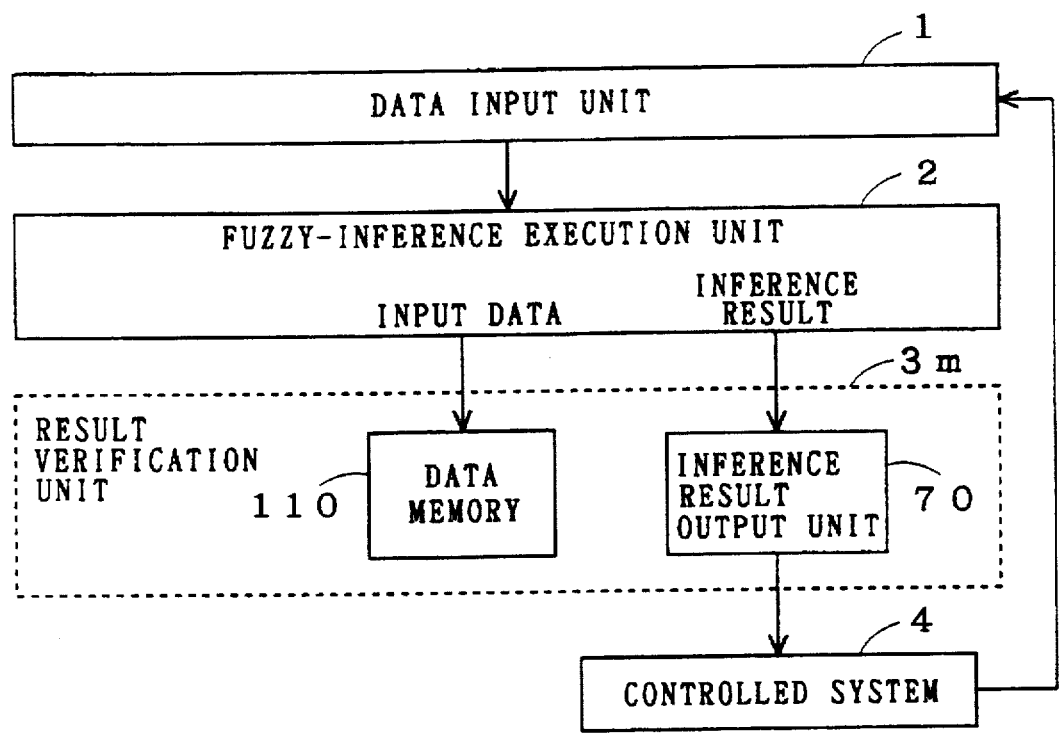
FIG. 50 is a block diagram showing a configuration of a fuzzy development-support device in accordance with an eleventh preferred embodiment of the present invention.

The Eleventh Preferred Embodiment:

A fuzzy development-support device in accordance with the eleventh preferred embodiment of the present invention will be discussed. FIG. 50 is a block diagram showing an internal configuration of an result verification unit 3m of the eleventh preferred embodiment. The result verification unit 3m of FIG. 50 comprises a data memory 110 of non-volatile type for storing the input data and updating the stored input data in LRU (Least Recently Used) mode. An inference result output unit 70 is the same as that of the result verification unit 3a of the sixth preferred embodiment.

An operation of the result verification unit 3m will be discussed. The data memory 110 writes the input data therein every fuzzy-inference execution performed in the fuzzy-inference execution unit 2. Accordingly, when the inference is implemented k times, k input data are written in the data memory 110. The Update of the input data in LRU mode prevents duplication of the input data to be stored.

In the LRU-system memory, if the amount of data over the storage capacity are written, the data of low frequency in use are first updated, and the data of high frequency remain stored therein. Therefore, check of the content in the memory reveals the frequency in use of the input data. Thus, the data memory 110 stores the input data which are actually employed in the fuzzy-inference execution as much as the number of entries thereof.

Having the data memory 110 for storing the input data, the fuzzy development-support device of the eleventh preferred embodiment can store therein the input data of high frequency in use during the actual fuzzy-inference execution.

That allows verification of use of the device by checking the input data stored in the data memory 110 in engineering change of the device associated with an upgrade of the development-support device and the like.

Furthermore, a volatile memory with battery backup as well as a non-volatile memory may be used to produce the same effect.

Still, FIFO (First In First Out)-system memory and LIFO (Last In First Out)-system memory as well as LRU-system memory may be employed for updating the input data stored in the memory.

Employment of the FIFO-system memory allows verification of recent use of the data since old data are first updated therein when the amount of stored data exceeds storage capacity.

Figure 51:
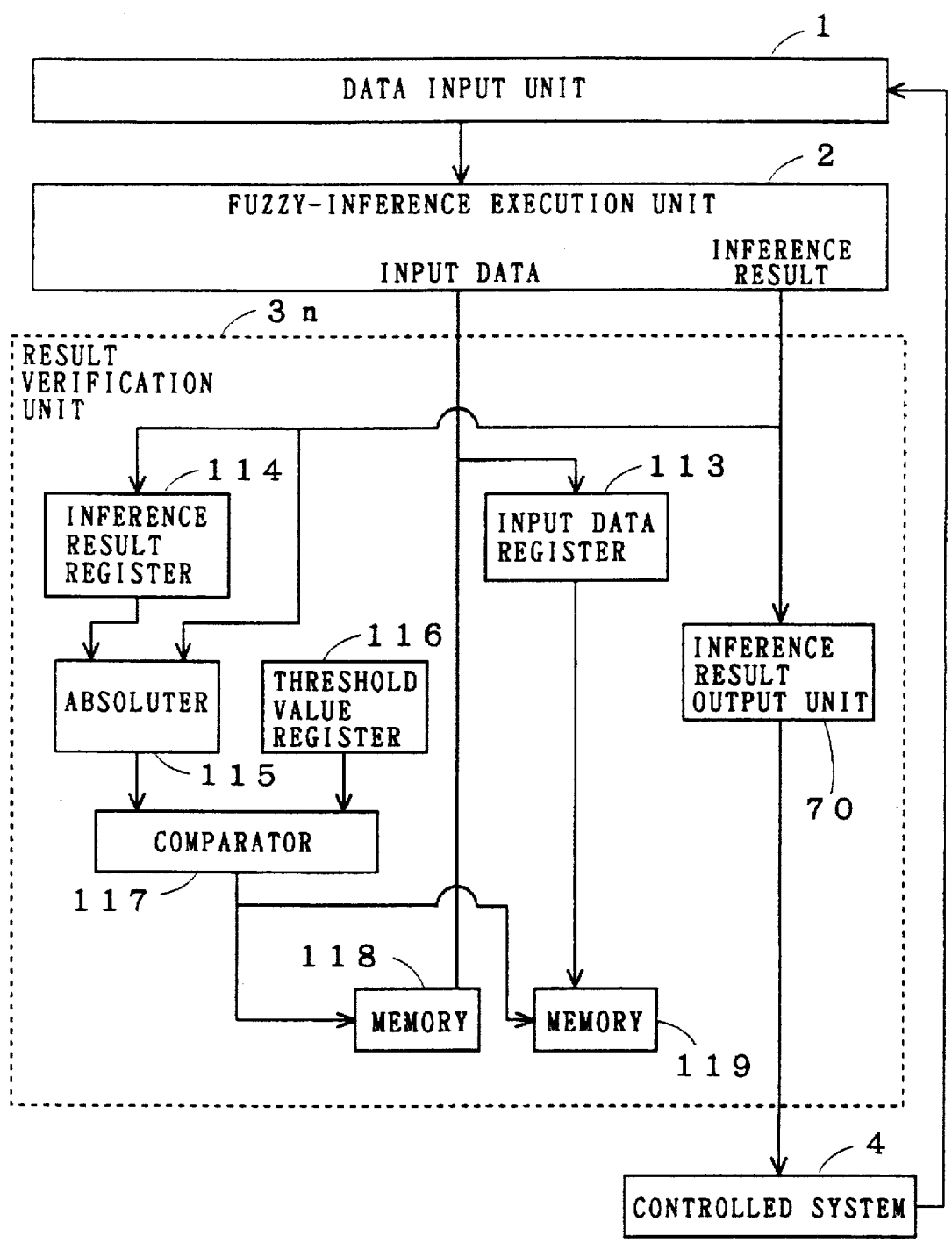
FIG. 51 is a block diagram showing a configuration of a fuzzy development-support device in accordance with a twelfth preferred embodiment of the present invention.

The Twelfth Preferred Embodiment:

A fuzzy development-support device in accordance with the twelfth preferred embodiment of the present invention will be discussed. FIG. 51 is a block diagram showing a configuration of an result verification unit 3n of the twelfth preferred embodiment. The fuzzy development-support device of the twelfth preferred embodiment is characterized by the result verification unit 3n which combines a function of verifying the inference results and the function of the conventional output unit. The result verification unit 3n of FIG. 51 comprises an input data register 113 for storing the input data, an inference result register 114 for storing the inference result, an absoluter 115 for computing the absolute value of the difference between output data from the inference result register 114 and the inference result, a threshold value register 116 for storing a threshold value, a comparator 117 for comparing the difference obtained in the absoluter 115 with the threshold value, a memory 118 for storing the input data and a memory 119 for storing output data from the input data register 113. An inference result output unit 70 is the same as that of the result verification unit 3a of the sixth preferred embodiment.

An operation of the result verification unit 3n will be discussed. At first, a threshold value is set in the threshold value register 116. The threshold value is a tolerance of the difference between the computed inference result and the immediately preceding computed inference result.

Then, the fuzzy-inference execution unit 2 carries out the fuzzy-inference execution to compute the inference result. This inference result is inputted to the inference result register 114 and the absoluter 115 and the input data are inputted to the memory 119 and the input data register 113. When the input data register 113 and the inference result register 114 are of master-slave type, the data stored in a master are copied to a slave before the next input data are written into the master. Accordingly, the outputs from the input data register 113 and the inference result register 114 are the input data and the inference result in the immediately preceding inference.

The absoluter 115 computes the absolute value of the difference between the two inputs. Since the inference is performed in a simulation, the variation of the input data is constant, and the absolute value indicates the variation of the inference results.

The comparator 117 compares the variation of the inference results with the threshold value in the threshold value register 116. When the variation of the inference results is larger than the threshold value, the comparator 117 outputs an enable signal.

Receiving the enable signal from the comparator 117, the memory 118 writes therein the input data employed for the present fuzzy-inference execution and the memory 119 writes therein the input data employed for the immediately preceding fuzzy-inference execution.

Through the above process, the result verification unit 3n allows check of the input data which cause the inference result of large variation, and further allows re-creating of the situation by checking the input data stored in the memories 118 and 119.

The fuzzy development-support device of the twelfth preferred embodiment observes the variation of the inference results, and stores the input data when the variation of the inference results is relatively large, thereby ensuring a later analysis in occurrence of an unexpected variation of the inference results.

Furthermore, the enable signal can be used not only as a write control signal which controls writing into the memories 118 and 119, but also as an inference stop signal. Still, the inference results as well as the input data may be written into the memories 118 and 119.

Figure 52:
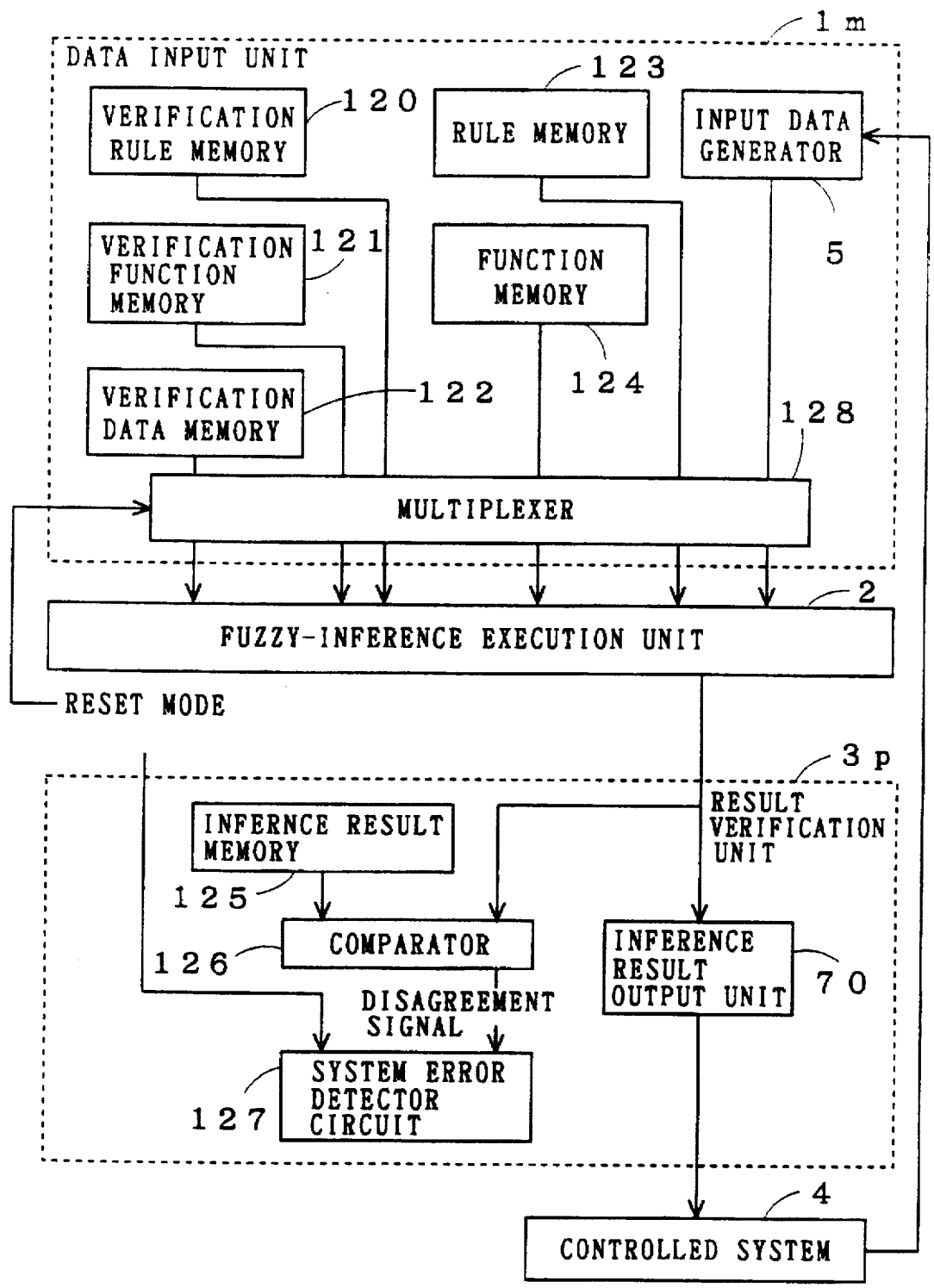
FIG. 52 is a block diagram showing a configuration of a fuzzy development-support device in accordance with a thirteenth preferred embodiment of the present invention.
Figure 53:
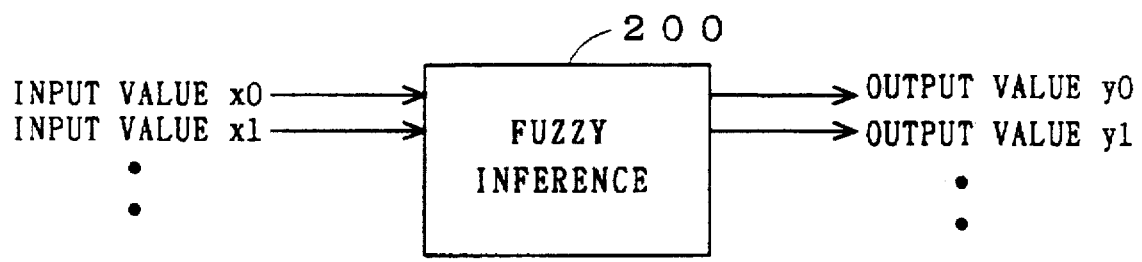
FIG. 53 is a concept view of fuzzy logic.
Figure 54:
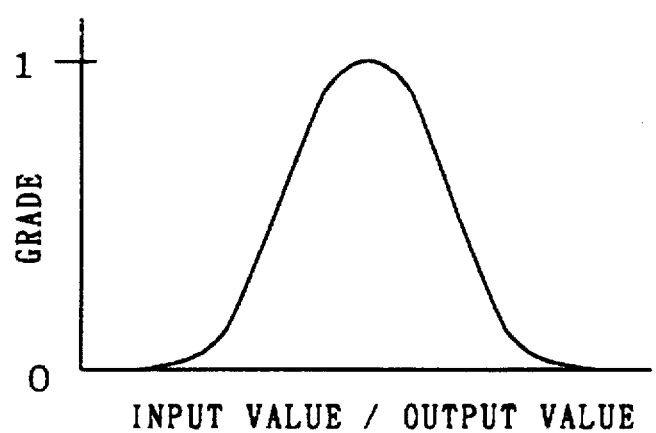
FIG. 54 is a concept view of membership function.
Figure 55:
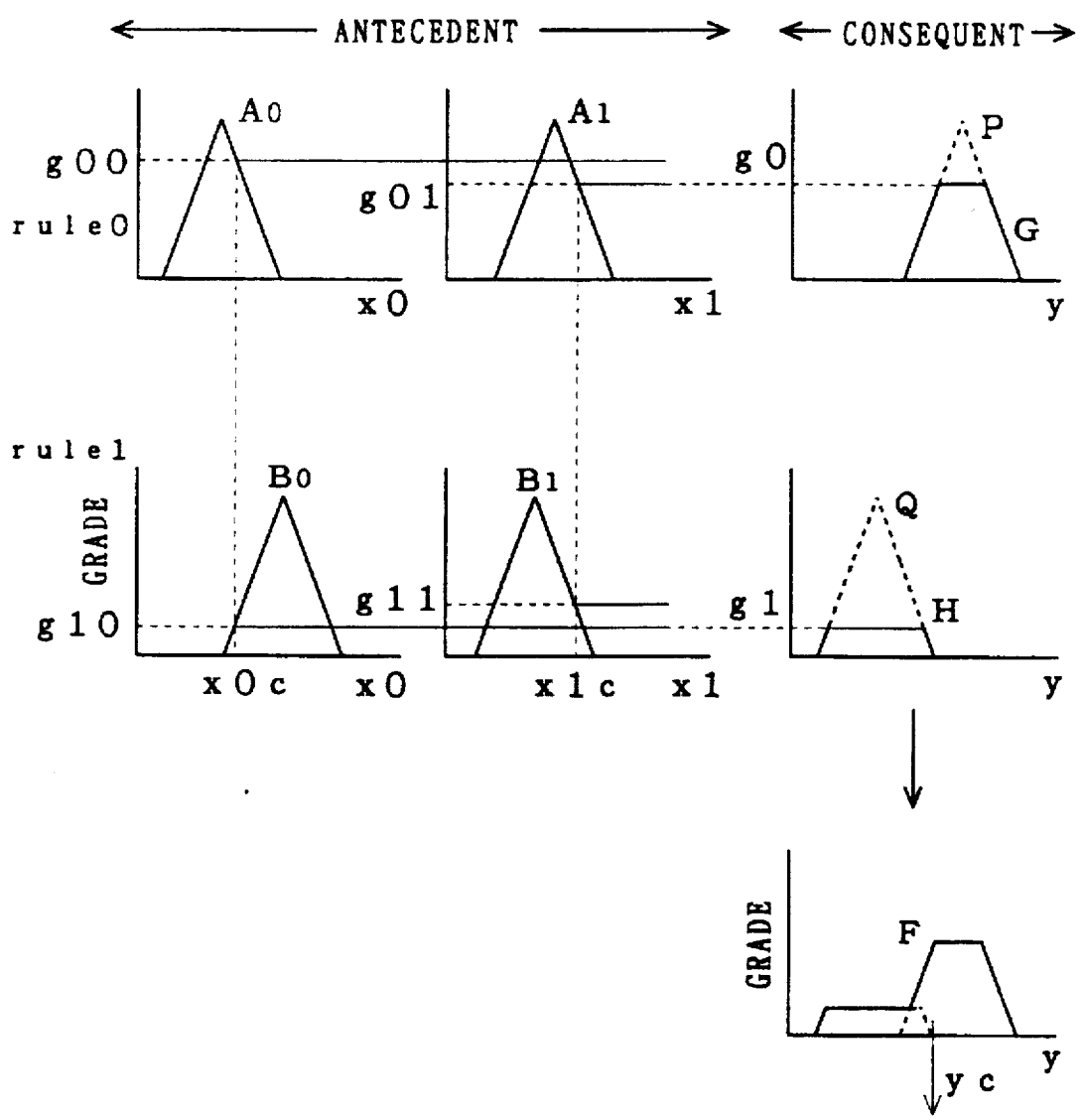
FIG. 55 shows a procedure of fuzzy-inference method by the minimum-maximum centroid method.
Figure 56A:
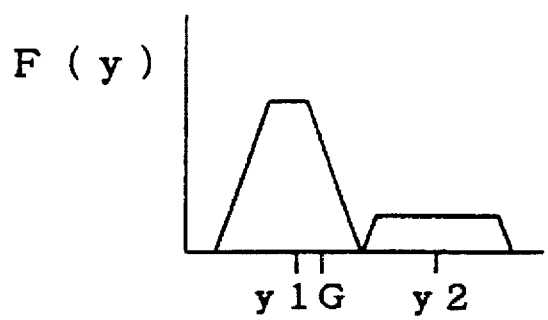
FIGS. 56A and 56B show the fuzzy-inference method by the minimum-maximum centroid method.
Figure 56B:
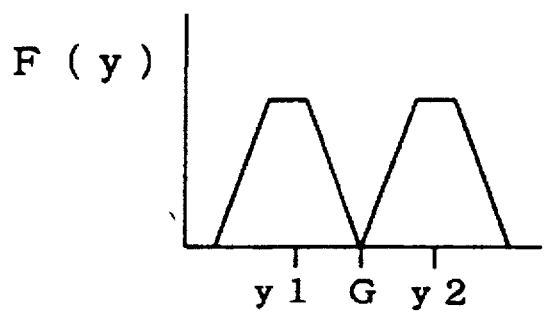
Figure 57:
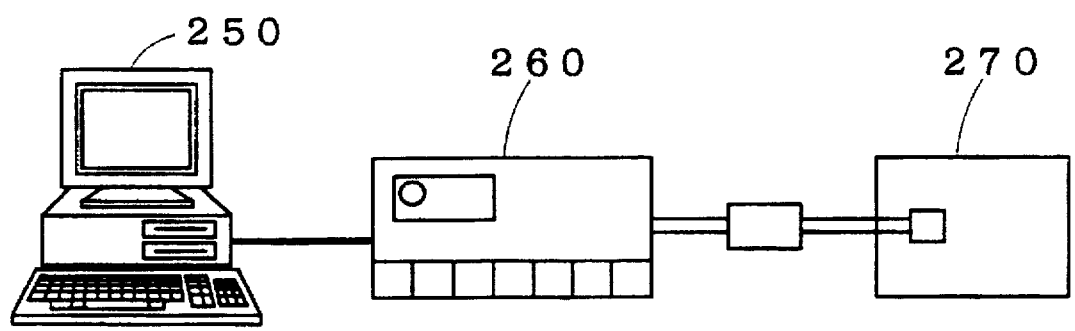
FIG. 57 shows a configuration of a fuzzy development-support device in the background art.
Figure 58:
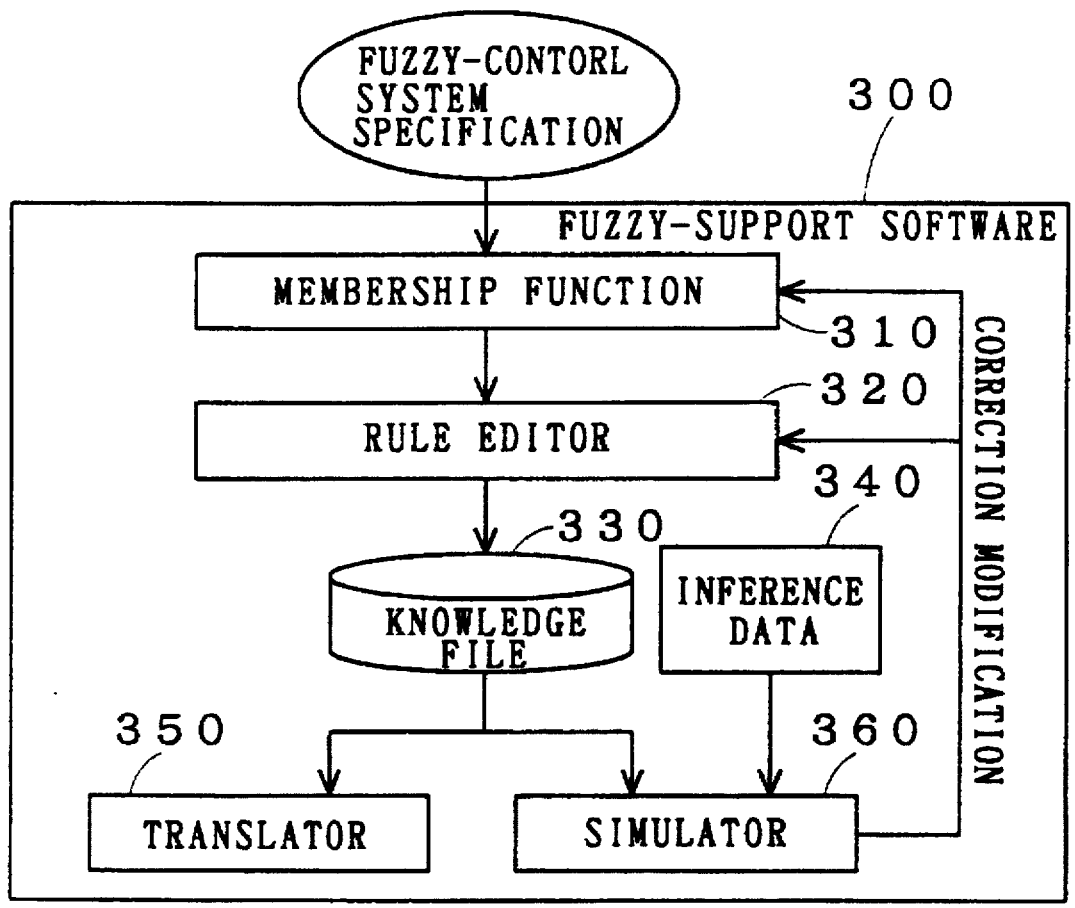
FIG. 58 is a block diagram showing a configuration of a fuzzy development-support device in the prior art.

The Thirteenth Preferred Embodiment:

A fuzzy development-support device in accordance with the thirteenth preferred embodiment of the present invention will be discussed. FIG. 52 is a block diagram showing a configuration of the fuzzy development-support device comprising a data input unit 1m, a fuzzy-inference execution unit 2 and a result verification unit 3p of the thirteenth preferred embodiment. The data input unit 1m of FIG. 52 includes a verification rule memory 120 for storing fuzzy rules for verification, a verification function memory 121 for storing membership functions for the verification fuzzy rules, a verification data memory 122 for storing input data for verification, a rule memory 123 for storing fuzzy rules set by the operator, a function memory 124 for storing membership functions set by the operator and a multiplexer 128 for performing a switch operation between the outputs from the verification rule memory 120, the verification function memory 121 and the verification data memory 122 and the output from the rule memory 123, the function memory 124 and an input data generator 5. The input data generator 5 of FIG. 52 is the same as that of the conventional art.

The result verification unit 3p of FIG. 52 includes an inference result memory 125 for storing inference result for verification, a comparator 126 for verifying the inference result and a system error detector circuit 127 for detecting system error according to a disagreement signal outputted from the comparator 126. An inference result output unit 70 is the same as that of the result verification unit 3a of the sixth preferred embodiment.

An operation of the fuzzy development-support system will be discussed. The fuzzy development-support device operates in two operation modes. One is a reset mode and another is an execution mode.

The reset mode is established immediately after a system reset. The execution mode where a normal fuzzy inference is executed is established after completing the reset mode.

At first, the system reset puts the device into the reset mode. In the reset mode, the multiplexer 128 selects the data stored in the verification rule memory 120, the verification function memory 121 and the verification data memory 122 to be outputted from the data input unit 1m. Thus, the fuzzy rules, the membership functions and the input data for verification are outputted. The fuzzy-inference execution unit 2 executes the fuzzy inference and outputs the inference result to the result verification unit 3p.

At this time, the verification inference result stored in the inference result memory 125 is applied to the comparator 126. The comparator 126 compares the inference result with the verification inference result. When these inference results are in disagreement, the comparator outputs the disagreement signal to the system error detector circuit 127. The system error detector circuit 127 outputs an error detection signal when both of a reset mode signal and the disagreement signal are applied thereto. By the system error detection signal, it is judged that the fuzzy development-support device has a failure, and then the operation of the fuzzy development-support device is stopped. Without the system error detection signal, it is judged the fuzzy development-support device has no failure, and the operation of the fuzzy development-support device goes into the execution mode.

In the execution mode, the multiplexer 128 performs a switch operation so that fuzzy rules and membership functions should be set in the rule memory 123 and the function memory 124, respectively, in the data input unit 1m. Input data are set in the data generator 5. The fuzzy-inference execution unit 2 executes the fuzzy inference and outputs the inference result to the result verification unit 3p.

In the result verification unit 3, the inference result is outputted to the controlled system 4 as a control signal through the inference result output unit 70. At this time, the reset mode signal is not applied therein, and the fuzzy development-support device keeps on operating, without a stop.

Thus, a test to check if the fuzzy development-support device has a failure is performed in the reset mode before performing the fuzzy control in the execution mode.

The fuzzy development-support device of the thirteenth preferred embodiment can detect a failure within the device, if any, immediately after a system reset by employing the verification rule memory, the verification function memory and the verification data memory. That allows prompt detection of a failure even caused by a fuse of a signal line before operating the device, thereby improving the device reliability.

Furthermore, instead of providing a dedicated memory for storing the input data for verification, the input data generator may supply the verification input data in common with the input data to produce the same effect.

While the invention has been shown and described in detail, the foregoing description is in all aspects illustrative and not restrictive. It is therefore understood that numerous modifications and variations can be devised without departing the scope of the invention.

We claim:

1. A fuzzy development-support device, comprising:
   data input means for generating input data, fuzzy rules and membership functions for said fuzzy rules to be used in a fuzzy inference; and
   inference execution means for executing said fuzzy inference with said input data, said fuzzy rules and said membership functions generated in said data input means, wherein
   said data input means includes:
   input/output setting means for setting a variable for said input data and a variable for an inference result used for said fuzzy rule;
   expected value waveform setting means for setting an unexpected value waveform representing a relation between said input data and said inference result as an expected value of an output from said inference execution means, and fixed points on said expected value waveform;
   first fuzzy rule generator means for generating a fuzzy rule base by using said variable of said input data and said variable of said inference result;

second fuzzy rule generator means for generating a plurality of said fuzzy rules as much as the number of fixed points by using said fuzzy rule base generated in said first fuzzy rule generator means and said fixed points provided by said expected value waveform setting means;

first membership function generator means for generating a membership function base; and second membership function generator means for generating a plurality of membership functions for said plurality of fuzzy rules generated in said second fuzzy rule generator means by using said membership function base generated in said first membership function generator means and said fixed points provided by said expected waveform setting means.

2. The fuzzy development-support device of claim 1, wherein
said data input means further includes
comparator means for comparing a first inference result outputted from said inference execution means with a second inference result represented by said expected value waveform; and
membership function modifier means for modifying said plurality of membership functions according to a comparison result of said comparator means.

3. The fuzzy development-support device of claim 2, wherein
said data input means further includes display means for displaying said expected value waveform provided by said expected value waveform setting means and said first inference result outputted from said inference execution means on the same coordinate system.

4. The fuzzy development-support device of claim 3, wherein
said data input means further includes evaluation means for evaluating a difference between said second inference result represented by said expected value waveform provided by said expected value waveform setting means and said first inference result outputted from said inference execution means.

5. The fuzzy development-support device of claim 2, wherein
said data input means further includes
verification input data generator means for generating verification input data for verification of said fuzzy rules; and
input limitation means for selectively supplying said inference execution means with said verification input data within a prescribed range generated in said verification input data generator means.

6. The fuzzy development-support device of claim 2, wherein
said data input means further includes expected value waveform correction means for altering or adding said fixed points provided by said expected value setting means.

7. A fuzzy development-support device, comprising:
data input means for generating input data, fuzzy rules and membership functions for said fuzzy rules to be used in a fuzzy inference;
inference execution means for executing said fuzzy inference with said input data, said fuzzy rules and said membership functions generated in said data input means and outputting an inference result; and
result verification means for verifying said inference result including a fuzzy-inference execution process done by said inference execution means, wherein each of said membership functions generated in said data input means includes an antecedent membership function corresponding to an antecedent of said fuzzy rule and a consequent membership function corresponding to a consequent of said fuzzy rule, and said result verification means includes
a memory for storing grades of said consequent membership functions computed during execution of said fuzzy inference by consequent membership function of the same shape; and
accumulator means for accumulating said grades of said fuzzy rules computed during execution of said fuzzy inference by consequent membership function and outputting an accumulated value to said memory.

8. The fuzzy development-support device of claim 7, wherein
said result verification means further includes
a comparator for comparing said accumulated value stored in said memory with a prescribed value; and
extractor means for extracting said fuzzy rules according to a comparison result outputted from said comparator.

9. A fuzzy development-support device, comprising:
data input means for generating input data, fuzzy rules, and membership functions for said fuzzy rules to be used in a fuzzy inference;
inference execution means for executing said fuzzy inference with said input data, said fuzzy rules and said membership functions generated in said data input means and outputting an inference result; and
result verification means for verifying said inference result including a fuzzy-inference execution process done by said inference execution means, wherein said result verification means includes a least recently used system memory for storing said input data used for said fuzzy inference performed in said inference execution means.

10. A fuzzy development-support device, comprising:
data input means for generating input data, fuzzy rules, and membership functions for said fuzzy rules to be used in a fuzzy inference;
inference execution means for executing said fuzzy inference with said input data, said fuzzy rules and said membership functions generated in said data input means and outputting an inference result; and
result verification means for verifying said inference result including a fuzzy-inference execution process done by said inference execution means, wherein said result verification means includes a First In First Out-system memory for storing said input data used for said fuzzy inference performed in said inference execution means.

11. A fuzzy development-support device, comprising:
data input means for generating input data, fuzzy rules and membership functions for said fuzzy rules to be used in a fuzzy inference;
inference execution means for executing said fuzzy inference with said input data, said fuzzy rules and said membership functions generated in said data input means to output an inference result; and
result verification means for verifying said inference result including a fuzzy-inference execution process done by said inference execution means, wherein
said result verification means includes inference verification means for verifying said inference result by checking said plurality of inference results and a variation ratio of said inference results obtained by using said input data which cause said inference result.

12. The fuzzy development-support device of claim 11, wherein said result verification means includes
verification means for verifying said fuzzy inference by comparing the variance of said inference results with a prescribed data; and
a memory for storing said input data depending on a comparison result of said verification means.

13. The fuzzy development-support device of claim 11, wherein said result verification means includes
extractor means for extracting said input data when the variation ratio of said inference results is zero; and
a memory for storing said input data extracted by said extractor means.

14. A fuzzy development-support device, comprising:

data input means for generating input data, fuzzy rules and membership functions for said fuzzy rules to be used in a fuzzy inference;

inference execution means for executing said fuzzy inference with said input data, said fuzzy rules and said membership functions generated in said data input means to output an inference result; and result verification means for verifying said inference result including a fuzzy-inference execution process done by said inference execution means, wherein
said result verification means verifies said inference result by checking a variation ratio of said inference results and a variation ratio of said input data.

15. The fuzzy development-support device of claim 14, wherein said result verification means includes
verification means for verifying said fuzzy inference by comparing the variance of said inference results with a prescribed data; and
a memory for storing said input data depending on a comparison result of said verification means.

16. The fuzzy development-support device of claim 14, wherein said result verification means includes
extractor means for extracting said input data when the variation ratio of said inference results is zero; and
a memory for storing said input data extracted by said extractor means.

17. A fuzzy development-support device, comprising:

data input means for generating input data, fuzzy rules and membership functions for said fuzzy rules to be used in a fuzzy inference;

inference execution means for executing said fuzzy inference with said input data, said fuzzy rules and said membership functions generated in said data input means and outputting an inference result; and result verification means for verifying said inference result including a fuzzy-inference execution process executed by said inference execution means, wherein
said data input means includes generator means for generating verification input data and verification fuzzy rules for verifying said fuzzy inference before executing said fuzzy inference in said inference execution means, and
said result verification means includes verification means, which stores an expected value of said inference result to be outputted from said inference execution means in response to said input data generated in said generator means, for comparing said inference result obtained by said fuzzy inference using said verification fuzzy rule in said inference execution means with said expected value of said inference result stored therein to verify whether said fuzzy inference is executed correctly.

* * * * *